United States Patent
Wilson et al.

(10) Patent No.: US 11,727,249 B2
(45) Date of Patent: Aug. 15, 2023

(54) METHODS FOR CONSTRUCTING AND APPLYING SYNAPTIC NETWORKS

(71) Applicant: NARA LOGICS, INC., Boston, MA (US)

(72) Inventors: Nathan R. Wilson, Cambridge, MA (US); Sahil Zubair, Boston, MA (US); Denise Ichinco, Somerville, MA (US); Raymond J. Plante, Boston, MA (US); Jana B. Eggers, Boston, MA (US)

(73) Assignee: NARA LOGICS, INC., Cambridge, MA (US)

( * ) Notice: Subject to any disclaimer, the term of this patent is extended or adjusted under 35 U.S.C. 154(b) by 0 days.

(21) Appl. No.: 17/526,369

(22) Filed: Nov. 15, 2021

(65) Prior Publication Data

US 2022/0076098 A1     Mar. 10, 2022

Related U.S. Application Data

(63) Continuation of application No. 17/035,344, filed on Sep. 28, 2020, now abandoned, which is a
(Continued)

(51) Int. Cl.
*G06N 3/00*       (2023.01)
*G06Q 30/00*      (2023.01)
(Continued)

(52) U.S. Cl.
CPC ............... *G06N 3/042* (2023.01); *G06N 3/02* (2013.01); *G06Q 30/02* (2013.01);
(Continued)

(58) Field of Classification Search
CPC .......... G06N 3/02; G06Q 3/042; G06Q 30/02; G06Q 30/0269; G06Q 30/0282;
(Continued)

(56) References Cited

U.S. PATENT DOCUMENTS

| | | |
|---|---|---|
| 5,819,245 A | 10/1998 | Peterson et al. |
| 6,012,051 A | 1/2000 | Sammon, Jr. et al. |

(Continued)

FOREIGN PATENT DOCUMENTS

| | | |
|---|---|---|
| CN | 101971175 | 2/2011 |
| EP | 2207348 | 7/2010 |

(Continued)

OTHER PUBLICATIONS

Yildirim, H. (2011). Scalable reachability indexing for very large graphs (Order No. 3514789). Available from ProQuest Dissertations & Theses Global. (1022175652). Retrieved from https://www.proquest.com/dissertations-theses/scalable-reachability-indexing-very-large-graphs/docview/1022175652/se-2 (Year: 2011).*

(Continued)

*Primary Examiner* — Arielle E Weiner
(74) *Attorney, Agent, or Firm* — Gardella Grace P.A.

(57) ABSTRACT

In selected embodiments a recommendation generator builds a network of interrelationships between venues, reviewers and users based on attributes and reviewer and user reviews of the venues. Each interrelationship or link may be positive or negative and may accumulate with other links (or anti-links) to provide nodal links the strength of which are based on commonality of attributes among the linked nodes and/or common preferences that one node, such as a reviewer, expresses for other nodes, such as venues. The links may be first order (based on a direct relationship between, for instance, a reviewer and a venue) or higher order (based on, for instance, the fact that two venue are both liked by a given reviewer). The recommendation engine in certain embodiments determines recommended venues based on user attributes and venue preferences by aggregating the link matrices and determining the venues which are most strongly coupled to the user.

20 Claims, 36 Drawing Sheets

Related U.S. Application Data continuation of application No. 15/419,517, filed on Jan. 30, 2017, now Pat. No. 10,789,526, which is a continuation of application No. 15/170,574, filed on Jun. 1, 2016, now abandoned, and a continuation-in-part of application No. 14/930,166, filed on Nov. 2, 2015, now Pat. No. 10,423,880, which is a continuation of application No. 14/537,319, filed on Nov. 10, 2014, now Pat. No. 9,208,443, which is a continuation of application No. 14/267,464, filed on May 1, 2014, now Pat. No. 8,909,583, which is a continuation of application No. 13/919,301, filed on Jun. 17, 2013, now Pat. No. 8,756,187, which is a continuation of application No. 13/416,945, filed on Mar. 9, 2012, now Pat. No. 8,515,893, which is a continuation of application No. 13/247,289, filed on Sep. 28, 2011, now Pat. No. 8,170,971.

(60) Provisional application No. 62/169,399, filed on Jun. 1, 2015.

(51) Int. Cl.

| | |
|---|---|
| *H04L 67/00* | (2022.01) |
| *G06N 3/042* | (2023.01) |
| *G06N 3/02* | (2006.01) |
| *H04L 67/125* | (2022.01) |
| *G06Q 30/02* | (2023.01) |
| *G06Q 30/0282* | (2023.01) |
| *H04L 67/306* | (2022.01) |
| *G06Q 30/0251* | (2023.01) |
| *H04L 67/04* | (2022.01) |
| *H04L 67/01* | (2022.01) |
| *H04L 67/53* | (2022.01) |
| *H04L 67/50* | (2022.01) |
| *H04L 67/568* | (2022.01) |
| *G06N 3/084* | (2023.01) |
| *G06N 3/082* | (2023.01) |

(52) U.S. Cl.
CPC ..... *G06Q 30/0269* (2013.01); *G06Q 30/0282* (2013.01); *H04L 67/01* (2022.05); *H04L 67/04* (2013.01); *H04L 67/125* (2013.01); *H04L 67/306* (2013.01); *H04L 67/53* (2022.05); *H04L 67/535* (2022.05); *H04L 67/568* (2022.05); *G06N 3/082* (2013.01); *G06N 3/084* (2013.01)

(58) Field of Classification Search
CPC ........ G06Q 3/083; G06Q 3/084; H04L 67/01; H04L 67/53; H04L 67/535; H04L 67/568; H04L 67/04; H04L 67/125; H04L 67/306
USPC .......................................................... 706/11
See application file for complete search history.

(56) References Cited

U.S. PATENT DOCUMENTS

| | | | |
|---|---|---|---|
| 6,041,311 | A | 3/2000 | Chisenko et al. |
| 6,112,186 | A | 8/2000 | Bergh et al. |
| 6,247,001 | B1 | 6/2001 | Tresp et al. |
| 6,266,668 | B1 | 7/2001 | Vanderveldt et al. |
| 6,404,424 | B1 | 6/2002 | Davis |
| 6,408,288 | B1 | 6/2002 | Ariyoshi |
| 6,412,012 | B1 | 6/2002 | Bieganski et al. |
| 6,438,579 | B1 | 8/2002 | Hosken |
| 6,460,060 | B1 | 10/2002 | Maddalozzo, Jr. et al. |
| 6,487,541 | B1 | 11/2002 | Aggarwal et al. |
| 6,556,211 | B2 | 4/2003 | Davis |
| 6,631,369 | B1 | 10/2003 | Meyerzon et al. |
| 6,757,691 | B1 | 6/2004 | Welsh et al. |
| 6,775,664 | B2 | 8/2004 | Lang et al. |
| 6,782,375 | B2 | 8/2004 | Abdel-Moneim et al. |
| 6,865,565 | B2 | 3/2005 | Rainsberger et al. |
| 6,988,109 | B2 | 1/2006 | Stanley et al. |
| 7,069,256 | B1 | 6/2006 | Campos |
| 7,080,052 | B2 | 7/2006 | Busche |
| 7,102,067 | B2 | 9/2006 | Gang et al. |
| 7,113,917 | B2 | 9/2006 | Jacobi et al. |
| 7,155,401 | B1 | 12/2006 | Cragun et al. |
| 7,328,216 | B2 | 2/2008 | Hofmann et al. |
| 7,366,707 | B2 | 4/2008 | de Lacharriere et al. |
| 7,389,201 | B2 | 6/2008 | Chickering et al. |
| 7,392,231 | B2 | 6/2008 | Basak et al. |
| 7,412,042 | B2 | 8/2008 | Henry |
| 7,437,368 | B1 | 10/2008 | Kolluri et al. |
| 7,492,971 | B2 | 2/2009 | Sakuma et al. |
| 7,505,962 | B2 | 3/2009 | Shariff et al. |
| 7,542,951 | B1 | 6/2009 | Chakrabarti et al. |
| 7,584,159 | B1 | 9/2009 | Chakrabarti et al. |
| 7,624,095 | B2 | 11/2009 | Majumder |
| 7,657,493 | B2 | 2/2010 | Meijer et al. |
| 7,657,523 | B2 | 2/2010 | Ebanks |
| 7,660,459 | B2 | 2/2010 | Busche |
| 7,734,609 | B2 | 6/2010 | Manfredi et al. |
| 7,743,067 | B2 | 6/2010 | Ducheneaut et al. |
| 7,756,753 | B1 | 7/2010 | McFarland |
| 7,788,293 | B2 | 8/2010 | Pasztor et al. |
| 7,792,761 | B2 | 9/2010 | Murakami et al. |
| 7,813,965 | B1 | 10/2010 | Robinson et al. |
| 7,840,569 | B2 | 11/2010 | Meyerzon et al. |
| 7,885,986 | B2 | 2/2011 | Anderson et al. |
| 7,890,871 | B2 | 2/2011 | Etkin |
| 7,895,140 | B2 | 2/2011 | Nagashima |
| 7,904,530 | B2 | 3/2011 | Partridge et al. |
| 7,908,183 | B2 | 3/2011 | Jacobi et al. |
| 7,953,673 | B2 | 5/2011 | Augusto et al. |
| 7,958,066 | B2 | 6/2011 | Pinckney et al. |
| 7,958,079 | B2 | 6/2011 | Fogel et al. |
| 7,966,282 | B2 | 6/2011 | Pinckney et al. |
| 7,966,578 | B2 | 6/2011 | Tolmasky et al. |
| 7,979,370 | B1 | 7/2011 | Ershov |
| 7,991,841 | B2 | 8/2011 | Anderson et al. |
| 7,996,255 | B1 | 8/2011 | Shenoy et al. |
| 8,010,470 | B2 | 8/2011 | Jackson |
| 8,019,707 | B2 | 9/2011 | Shani et al. |
| 8,019,743 | B2 | 9/2011 | Ebanks |
| 8,032,425 | B2 | 10/2011 | Yi |
| 8,032,480 | B2 | 10/2011 | Pinckney et al. |
| 8,032,481 | B2 | 10/2011 | Pinckney et al. |
| 8,090,625 | B2 | 1/2012 | Yi |
| 8,091,032 | B2 | 1/2012 | Fischer |
| 8,095,153 | B2 | 1/2012 | Jenkins et al. |
| 8,095,432 | B1 | 1/2012 | Berman et al. |
| 8,108,414 | B2 | 1/2012 | Stackpole |
| 8,108,501 | B2 | 1/2012 | Birnie et al. |
| 8,145,661 | B1 | 3/2012 | Billman et al. |
| 8,166,013 | B2 | 4/2012 | Bandaru et al. |
| 8,170,971 | B1 | 5/2012 | Wilson et al. |
| 8,185,487 | B2 | 5/2012 | Tuzhilin et al. |
| 8,234,150 | B1 | 7/2012 | Pickton et al. |
| 8,234,151 | B1 | 7/2012 | Pickton et al. |
| 8,234,688 | B2 | 7/2012 | Grandison et al. |
| 8,244,721 | B2 | 8/2012 | Morris et al. |
| 8,249,941 | B2 | 8/2012 | Saul et al. |
| 8,250,096 | B2 | 8/2012 | Su et al. |
| 8,271,352 | B2 | 9/2012 | Lifson |
| 8,290,964 | B1 | 10/2012 | Guha |
| 8,315,953 | B1 | 11/2012 | Hansen et al. |
| 8,316,000 | B2 | 11/2012 | Srivastava et al. |
| 8,333,316 | B2 | 12/2012 | Heath et al. |
| 8,341,111 | B2 | 12/2012 | Patil et al. |
| 8,364,528 | B2 | 1/2013 | Selinger et al. |
| 8,380,639 | B2 | 2/2013 | Aleong et al. |
| 8,386,406 | B2 | 2/2013 | Bolivar et al. |
| 8,417,698 | B2 | 4/2013 | Zoo |
| 8,423,323 | B2 | 4/2013 | Bonabeau |
| 8,429,106 | B2* | 4/2013 | Downs ............... G06F 40/42 |
| | | | 706/21 |

(56) References Cited

U.S. PATENT DOCUMENTS

| | | |
|---|---|---|
| 8,429,160 B2 | 4/2013 | Osann, Jr. |
| 8,442,891 B2 | 5/2013 | Mendelsohn |
| 8,447,760 B1 | 5/2013 | Tong et al. |
| 8,452,865 B1 | 5/2013 | Heller et al. |
| 8,468,155 B2 | 6/2013 | Sureka |
| 8,484,142 B2 | 7/2013 | Pinckney et al. |
| 8,484,226 B2 | 7/2013 | Elliott-McCrea et al. |
| 8,489,515 B2 | 7/2013 | Mathur |
| 8,494,897 B1 | 7/2013 | Dawson |
| 8,494,946 B2 | 7/2013 | Lortscher, Jr. |
| 8,515,893 B2 | 8/2013 | Wilson et al. |
| 8,539,359 B2 | 9/2013 | Rapaport et al. |
| RE44,559 E | 10/2013 | Flinn et al. |
| 8,572,129 B1* | 10/2013 | Lee ............ G06Q 50/01 707/798 |
| 8,583,524 B2 | 11/2013 | Selinger et al. |
| 8,612,134 B2 | 12/2013 | Zheng et al. |
| 8,620,822 B2 | 12/2013 | Wiseman et al. |
| 8,621,563 B2 | 12/2013 | Sathish |
| 8,635,167 B2 | 1/2014 | Buckwalter et al. |
| 8,644,688 B2 | 2/2014 | Fishman et al. |
| 8,661,050 B2 | 2/2014 | Varshavsky |
| 8,666,844 B2 | 3/2014 | Shaya et al. |
| 8,732,101 B1 | 5/2014 | Wilson et al. |
| 8,756,187 B2 | 6/2014 | Wilson et al. |
| 8,909,583 B2 | 12/2014 | Wilson et al. |
| 8,930,204 B1 | 1/2015 | Igoe et al. |
| 8,972,314 B2 | 3/2015 | Pinckney et al. |
| 8,972,394 B1 | 3/2015 | Tong et al. |
| 8,977,612 B1 | 3/2015 | Tong et al. |
| 9,009,088 B2 | 4/2015 | Wilson et al. |
| 9,037,531 B2 | 5/2015 | Pinckney et al. |
| 9,159,034 B2 | 10/2015 | Pinckney et al. |
| 9,183,504 B2 | 11/2015 | Moore et al. |
| 9,208,443 B2 | 12/2015 | Wilson et al. |
| 10,423,880 B2 | 9/2019 | Wilson et al. |
| 10,789,526 B2 | 9/2020 | Wilson et al. |
| 2002/0055890 A1 | 5/2002 | Foley |
| 2002/0116458 A1 | 8/2002 | Bricklin et al. |
| 2003/0025694 A1 | 2/2003 | Davis |
| 2003/0061607 A1 | 3/2003 | Hunter et al. |
| 2004/0044677 A1 | 3/2004 | Huper-Graff et al. |
| 2004/0172267 A1 | 9/2004 | Patel et al. |
| 2005/0120052 A1 | 6/2005 | Miller et al. |
| 2005/0243784 A1 | 11/2005 | Fitzgerald et al. |
| 2006/0106655 A1 | 5/2006 | Lettovsky et al. |
| 2006/0229932 A1 | 10/2006 | Zollo et al. |
| 2007/0050235 A1* | 3/2007 | Ouimet ............ G06Q 30/0201 705/7.29 |
| 2007/0060114 A1 | 3/2007 | Ramer et al. |
| 2007/0244747 A1 | 10/2007 | Nikovski |
| 2008/0010258 A1 | 1/2008 | Sureka |
| 2008/0045236 A1 | 2/2008 | Nahon et al. |
| 2008/0059284 A1 | 3/2008 | Solotorevsky et al. |
| 2008/0059455 A1 | 3/2008 | Canoy et al. |
| 2008/0097821 A1 | 4/2008 | Chickering et al. |
| 2008/0183678 A1 | 7/2008 | Weston et al. |
| 2008/0189330 A1* | 8/2008 | Hoos ............ G06F 16/68 |
| 2008/0214204 A1 | 9/2008 | Ramer et al. |
| 2008/0215610 A1 | 9/2008 | De Lacharriere et al. |
| 2008/0222064 A1 | 9/2008 | Larimer |
| 2008/0228947 A1 | 9/2008 | Markus et al. |
| 2008/0319935 A1 | 12/2008 | Chandak |
| 2009/0076997 A1* | 3/2009 | Ducheneaut ........ G06Q 30/02 706/47 |
| 2009/0106040 A1 | 4/2009 | Jones |
| 2009/0119258 A1 | 5/2009 | Petty |
| 2009/0119268 A1 | 5/2009 | Bandaru et al. |
| 2009/0210246 A1 | 8/2009 | Patel et al. |
| 2009/0210475 A1 | 8/2009 | Gadanho et al. |
| 2009/0216563 A1 | 8/2009 | Sandoval et al. |
| 2009/0216626 A1 | 8/2009 | Lund |
| 2009/0222322 A1 | 9/2009 | Andersen et al. |
| 2009/0234876 A1 | 9/2009 | Schigel et al. |
| 2009/0240676 A1 | 9/2009 | Gruen et al. |
| 2009/0287687 A1 | 11/2009 | Martire et al. |
| 2009/0300008 A1 | 12/2009 | Hangartner et al. |
| 2009/0307238 A1 | 12/2009 | Sanguinetti et al. |
| 2009/0319338 A1 | 12/2009 | Parks et al. |
| 2009/0327181 A1 | 12/2009 | Lee et al. |
| 2010/0030569 A1 | 2/2010 | Okano et al. |
| 2010/0030578 A1 | 2/2010 | Siddique et al. |
| 2010/0058224 A1 | 3/2010 | Chai et al. |
| 2010/0076951 A1 | 3/2010 | Lyle et al. |
| 2010/0076968 A1 | 3/2010 | Boyns et al. |
| 2010/0082516 A1 | 4/2010 | Basu et al. |
| 2010/0088649 A1 | 4/2010 | Kemp |
| 2010/0110935 A1 | 5/2010 | Tamassia et al. |
| 2010/0145770 A1 | 6/2010 | Hanson et al. |
| 2010/0145771 A1 | 6/2010 | Fligler et al. |
| 2010/0169160 A1 | 7/2010 | Wu et al. |
| 2010/0217730 A1 | 7/2010 | Wu et al. |
| 2010/0210364 A1 | 8/2010 | Fork et al. |
| 2010/0223093 A1 | 9/2010 | Hubbard |
| 2010/0250337 A1 | 9/2010 | Kassaei |
| 2010/0262556 A1 | 10/2010 | Shaya et al. |
| 2010/0262658 A1 | 10/2010 | Mesnage |
| 2010/0268574 A1 | 10/2010 | Butcher et al. |
| 2010/0268661 A1 | 10/2010 | Levy et al. |
| 2010/0287282 A1 | 11/2010 | MacLaughlin |
| 2010/0293026 A1 | 11/2010 | Vojnovic et al. |
| 2010/0312644 A1 | 12/2010 | Borgs et al. |
| 2010/0312724 A1 | 12/2010 | Pinckney et al. |
| 2010/0325205 A1 | 12/2010 | Murphy et al. |
| 2011/0016001 A1 | 1/2011 | Schieffelin |
| 2011/0071969 A1 | 3/2011 | Doctor et al. |
| 2011/0087661 A1 | 4/2011 | Quick et al. |
| 2011/0099122 A1 | 4/2011 | Bright et al. |
| 2011/0105143 A1 | 5/2011 | Harple et al. |
| 2011/0112976 A1 | 5/2011 | Ryan et al. |
| 2011/0153528 A1 | 6/2011 | Bailey et al. |
| 2011/0169833 A1 | 7/2011 | Basak |
| 2011/0178839 A1 | 7/2011 | Adra |
| 2011/0201317 A1 | 8/2011 | Karandikar et al. |
| 2011/0207440 A1 | 8/2011 | Ruuspakka et al. |
| 2011/0208822 A1 | 8/2011 | Rathod |
| 2011/0213661 A1 | 9/2011 | Milana et al. |
| 2011/0238608 A1 | 9/2011 | Sathish |
| 2011/0270774 A1 | 11/2011 | Varshavsky et al. |
| 2011/0302117 A1 | 12/2011 | Pinckney et al. |
| 2011/0307327 A1 | 12/2011 | Bixby et al. |
| 2011/0307478 A1 | 12/2011 | Pinckney et al. |
| 2012/0005016 A1 | 1/2012 | Graff |
| 2012/0005201 A1 | 1/2012 | Ebanks |
| 2012/0030198 A1 | 2/2012 | Beck et al. |
| 2012/0066072 A1 | 3/2012 | Kanigsberg et al. |
| 2012/0089328 A1 | 4/2012 | Ellanti et al. |
| 2012/0089623 A1 | 4/2012 | Sobotka et al. |
| 2012/0095862 A1 | 4/2012 | Schiff et al. |
| 2012/0095863 A1 | 4/2012 | Schiff et al. |
| 2012/0109749 A1 | 5/2012 | Subramanian et al. |
| 2012/0130976 A1 | 5/2012 | Cone et al. |
| 2012/0136852 A1 | 5/2012 | Geller |
| 2012/0158720 A1 | 6/2012 | Luan et al. |
| 2012/0166232 A1 | 6/2012 | Neubardt |
| 2012/0166432 A1 | 6/2012 | Tseng |
| 2012/0166960 A1 | 6/2012 | Salles |
| 2012/0173324 A1 | 7/2012 | Vallery et al. |
| 2012/0185262 A1 | 7/2012 | Dalesandro et al. |
| 2012/0185481 A1 | 7/2012 | Bjork et al. |
| 2012/0190386 A1 | 7/2012 | Anderson |
| 2012/0221556 A1 | 8/2012 | Byrne et al. |
| 2012/0303415 A1 | 11/2012 | Edelson |
| 2012/0303569 A1 | 11/2012 | Tuzhilin et al. |
| 2012/0303676 A1 | 11/2012 | Tuzhilin et al. |
| 2012/0323725 A1 | 12/2012 | Johnston et al. |
| 2013/0013595 A1 | 1/2013 | Tseng et al. |
| 2013/0024449 A1 | 1/2013 | Chatterji et al. |
| 2013/0024456 A1 | 1/2013 | Goodson et al. |
| 2013/0024464 A1 | 1/2013 | Berner et al. |
| 2013/0024465 A1 | 1/2013 | Schiff et al. |
| 2013/0024471 A1 | 1/2013 | Mitrovic |
| 2013/0041896 A1 | 2/2013 | Ghani et al. |
| 2013/0054407 A1 | 2/2013 | Sabur |

(56) References Cited

U.S. PATENT DOCUMENTS

| | | |
|---|---|---|
| 2013/0054662 A1 | 2/2013 | Coimbra |
| 2013/0054698 A1 | 2/2013 | Lee et al. |
| 2013/0060744 A1 | 3/2013 | Roychoudhuri et al. |
| 2013/0066821 A1 | 3/2013 | Moore et al. |
| 2013/0066973 A1 | 3/2013 | Macadaan et al. |
| 2013/0073336 A1 | 3/2013 | Heath |
| 2013/0073422 A1 | 3/2013 | Moore et al. |
| 2013/0073473 A1 | 3/2013 | Heath |
| 2013/0080364 A1 | 3/2013 | Wilson et al. |
| 2013/0085844 A1 | 4/2013 | Neystadt et al. |
| 2013/0103667 A1 | 4/2013 | Minh |
| 2013/0117329 A1 | 5/2013 | Bank et al. |
| 2013/0124449 A1 | 5/2013 | Pinckney et al. |
| 2013/0124538 A1 | 5/2013 | Lee et al. |
| 2013/0138512 A1 | 5/2013 | Sandoval et al. |
| 2013/0159826 A1 | 6/2013 | Mason et al. |
| 2013/0173485 A1 | 7/2013 | Ruiz et al. |
| 2013/0198203 A1 | 8/2013 | Bates et al. |
| 2013/0218667 A1 | 8/2013 | Mohamed |
| 2013/0218713 A1 | 8/2013 | Gottfurcht et al. |
| 2013/0268468 A1 | 10/2013 | Mjayaraghavan et al. |
| 2013/0275511 A1 | 10/2013 | Wilson et al. |
| 2013/0290234 A1 | 10/2013 | Harris et al. |
| 2013/0304691 A1 | 11/2013 | Pinckney et al. |
| 2014/0032325 A1 | 1/2014 | Weiss et al. |
| 2014/0058990 A1 | 2/2014 | Benson et al. |
| 2014/0059213 A1 | 2/2014 | Ollikainen et al. |
| 2014/0067901 A1 | 3/2014 | Shaw et al. |
| 2014/0129371 A1 | 5/2014 | Wilson et al. |
| 2014/0164073 A1 | 6/2014 | Mosley et al. |
| 2014/0244562 A1 | 8/2014 | Wilson et al. |
| 2014/0279196 A1 | 9/2014 | Wilson et al. |
| 2014/0280108 A1 | 9/2014 | Dunn et al. |
| 2014/0280226 A1 | 9/2014 | Wilson et al. |
| 2014/0358836 A1 | 12/2014 | Moore et al. |
| 2015/0066830 A1 | 3/2015 | Wilson et al. |
| 2015/0127585 A1 | 5/2015 | Pinckney et al. |
| 2015/0127586 A1 | 5/2015 | Pinckney et al. |
| 2015/0127587 A1 | 5/2015 | Pinckney et al. |
| 2015/0127597 A1 | 5/2015 | Pinckney et al. |
| 2015/0127598 A1 | 5/2015 | Pinckney et al. |
| 2015/0142711 A1 | 5/2015 | Pinckney et al. |
| 2015/0186951 A1 | 7/2015 | Wilson et al. |
| 2015/0220835 A1 | 8/2015 | Wilson et al. |
| 2015/0220836 A1 | 8/2015 | Wilson et al. |
| 2015/0248651 A1 | 9/2015 | Akutagawa et al. |
| 2015/0278225 A1 | 10/2015 | Weiss et al. |
| 2016/0055417 A1 | 2/2016 | Wilson et al. |
| 2016/0350834 A1 | 12/2016 | Wilson et al. |
| 2017/0140262 A1 | 5/2017 | Wilson et al. |
| 2021/0117757 A1 | 4/2021 | Wilson et al. |
| 2022/0207575 A1 | 6/2022 | Wilson et al. |

FOREIGN PATENT DOCUMENTS

| | | |
|---|---|---|
| WO | 2000039725 | 7/2000 |
| WO | 2001033410 | 5/2001 |
| WO | 2001037193 | 5/2001 |
| WO | 2002097701 | 12/2002 |
| WO | 2009065071 | 5/2009 |
| WO | 2009111211 | 9/2009 |
| WO | 2013049829 | 4/2013 |

OTHER PUBLICATIONS

Denby, B. et al, Fast Triggering In High Energy Physics Experiments Using Hardware Neural Networks, IEEE Transactions On Neural Networks, vol. 14, Issue 5, Sep. 2003, pp. 1010-1027. (submitted in related U.S. Appl. No. 15/419,517).

Duda, R. et al, Pattern Classification, John Wiley & Sons, New York, 2nd Edition, 2001. (submitted in related U.S. Appl. No. 15/419,517).

Eichenbaum, H., The Cognitive Neuroscience Of Memory: An Introduction, Oxford University Press, New York, 2002. (submitted in related U.S. Appl. No. 15/419,517).

Fukushima, K. et al, A Self-Organizing Neural Network With A Function Of Associative Memory: Feedback Type Cognitron, Biological Cybernetics, vol. 28, Issue 4, Dec. 1978, pp. 201-208. (submitted in related U.S. Appl. No. 15/419,517).

Gadea, R. et al, Artificial Neural Network Implementation On A Single FPGA Of A Pipelined On-Line Backpropagation, Proceedings Of The 13th International Symposium On System Synthesis, Madrid, Spain, Sep. 2000, pp. 225-230. (submitted in related U.S. Appl. No. 15/419,517).

Grossberg, S., Adaptive Pattern Classification And Universal Recoding: I. Parallel Development And Coding Of Neural Feature Detectors, Biological Cybernetics, vol. 23, Issue 3, Sep. 1976, pp. 121-134. (submitted in related U.S. Appl. No. 15/419,517).

Grossberg, S., Adaptive Pattern Classification And Universal Recoding: II Feedback, Expectation, Olfaction, Illusions, Biological Cybernetics, vol. 23, Issue 4, Dec. 1976, pp. 187-202. (submitted in related U.S. Appl. No. 15/419,517).

Hecht-Nielsen, R., A Theory Of Thalamocortex, in R. Hecht-Nielsen and T. McKenna Editors, Computational Models For Neuroscience: Human Cortical Information Processing, pp. 85-124. (submitted in related U.S. Appl. No. 15/419,517).

Widrow B., et al, Statistical Efficiency Of Adaptive Algorithms, Neural Networks, vol. 16, Issues 5-6, Jun.-Jul. 2003, pp. 735-744. (submitted in related U.S. Appl. No. 15/419,517).

Widrow B et al, 30 Years Of Adaptive Neural Networks: Perception, Madaline, And Backpropagation, Proceedings Of The IEEE, vol. 78, No. 9, Sep. 1990, pp. 1415-1442. (submitted in related U.S. Appl. No. 15/419,517).

Nichols, K. R., A Reconfigurable Computing Architecture for Implementing Artificial Neural Networks on FPGA, Master's Thesis, The University of Guelph, Dec. 2003. (submitted in related U.S. Appl. No. 15/419,517).

Rosenblatt, F., The Perception: A Probabilistic Model For Information Storage And Organization In The Brain, Psychological Review, vol. 65(6), Nov. 1958, pp. 386-408. (submitted in related U.S. Appl. No. 15/419,517).

Kung, S.Y. et al, Biometric Authentication: A Machine Learning Approach. Prentice Hall PTR, Upper Saddle River, N.J., 2004. (submitted in related U.S. Appl. No. 15/419,517).

Extended European Search Reported issued in U.S. Appl. No. 15/419,517 dated Mar. 14, 2016. (submitted in related U.S. Appl. No. 15/419,517).

Non-Final Office Action issued in U.S. Appl. No. 15/419,517 dated Aug. 16, 2012. (submitted in related U.S. Appl. No. 15/419,517).

Non-Final Office Action issued in U.S. Appl. No. 15/419,517 dated Sep. 5, 2013. (submitted in related U.S. Appl. No. 15/419,517).

Non-Final Office Action issued in U.S. Appl. No. 15/419,517 dated Feb. 12, 2015. (submitted in related U.S. Appl. No. 15/419,517).

Non-Final Office Action issued in U.S. Appl. No. 15/419,517 dated Dec. 13, 2018. (submitted in related U.S. Appl. No. 15/419,517).

Non-Final Office Action issued in U.S. Appl. No. 15/419,517 dated May 16, 2018. (submitted in related U.S. Appl. No. 15/419,517).

Aciar, S. et al.; "Recommender System Based on Consumer Product Reviews"; 2006; IEEE/WIC/ACM International Conference on Web Intelligence; 5 pages (submitted in related U.S. Appl. No. 15/419,517).

Non-Final Office Action issued in U.S. Appl. No. 17/035,344 dated Aug. 19, 2019. (submitted in related U.S. Appl. No. 17/035,344).

Notice of Allowance issued in U.S. Appl. No. 17/035,344 dated Feb. 20, 2020. (submitted in related U.S. Appl. No. 17/035,344).

Non-Final Office Action issued in U.S. Appl. No. 17/035,344 dated May 16, 2018. (submitted in related U.S. Appl. No. 17/035,344).

ISR dated Feb. 12, 2014 in PCT/US13/57136, filed Aug. 28, 2013.(submitted in related U.S. Appl. No. 15/419,517).

Written Opinion dated Feb. 12, 2014, in PCT/US13/57136, filed Aug. 28, 2013 (submitted in related U.S. Appl. No. 15/419,517).

ISR dated Dec. 17, 2012 in PCT/US12/57780 (submitted in related U.S. Appl. No. 15/419,517).

(56) References Cited

OTHER PUBLICATIONS

Written Opinion issued in PCT/US12/57780 dated Dec. 17, 2012 (submitted in related U.S. Appl. No. 15/419,517).
Yu, Shijun., Contextualized and Personalized Location-based Services. BSc in Computer Science and Technology, Norther Jiaotong University, Chine et de nationalite chinoise, 2008. (submitted in related U.S. Appl. No. 15/419,517).
"Elements of Artificial Neural Networks", Mehrotra, 1998 MIT Press (submitted in related U.S. Appl. No. 15/419,517).
Koren, Yehuda et al.; "Matrix Factorization Techniques for Recommender Systems"; 2009; IEEE; pp. 30-37. (submitted in related U.S. Appl. No. 15/419,517).
Koren, Yehuda et al.; "Collaborative Filtering with Temporal Dynamics"; 2010; ACM; Communications of the ACM, vol. 53, No. 4; pp. 89-97. (submitted in related U.S. Appl. No. 15/419,517).
Ricci, Francesco et al.; "Recommender Systems Handbook"; Oct. 29, 2010; Springer; 847 pages, (submitted in related U.S. Appl. No. 15/419,517).
O'Dell, "Google Unveils Hotpot, a Recommendation Engine for Places," Mashable, Nov. 16, 2010, http://mashable.com/2010/11/15/google-hotpot/.3pp. (submitted in related U.S. Appl. No. 15/419,517).
Combined Chinese Office Action and Search Report dated Aug. 2, 2016 in Patent Application No. 2012280047476.X (submitted in related U.S. Appl. No. 15/419,517).
Chiang, I.R., & Nunez, M.A. (2007). Improving web-catalog design for easy product search. INFORMS Journal on Computing, 19(4), 510-519. doi:http://dx.doi.org/10.1287/ijoc.1060.0184 (Year: 2007) (submitted in related U.S. Appl. No. 15/419,517).
Non-Final Office Action issued in U.S. Appl. No. 17/035,344 dated Jun. 15, 2021.
Non-Final Office Action mailed in related U.S. Appl. No. 16/653,867, filed Jun. 21, 2022, 24 pages.
Notice of Allowance mailed in related U.S. Appl. No. 16/653,867 dated Dec. 21, 2022.
Non-Final Office Action mailed in related U.S. Appl. No. 16/653,867 dated Jun. 21, 2022, 24 pages.

\* cited by examiner

FIG. 3

| | Ratings (1-5 Stars) | | | | | | |
|---|---|---|---|---|---|---|---|
| | Reviewer 1 | Reviewer 2 | Reviewer 3 | Reviewer 4 | Reviewer 5 | Reviewer 6 | Reviewer 7 |
| Restaurant 1 | 2 | 4 | | 3 | | 2 | 3 |
| Restaurant 2 | | 2 | | 3 | | 2 | 3 |
| Restaurant 3 | 4 | 4 | 3 | 3 | 3 | 3 | |
| Restaurant 4 | 3 | 4 | 3 | | 3 | | |
| Restaurant 5 | 1 | | 1 | 4 | 5 | 1 | 1 |
| Restaurant 6 | | | 5 | 3 | 2 | | |
| Restaurant 7 | 1 | 5 | 5 | | | | 3 |
| Restaurant 8 | 4 | | | 4 | 4 | 3 | 2 |
| Restaurant 9 | | 1 | 1 | 2 | | 2 | 4 |
| Restaurant 10 | 3 | 4 | | 5 | 2 | | |
| Restaurant 11 | 1 | | 1 | | 1 | 3 | 4 |
| Restaurant 12 | 3 | 4 | 2 | 1 | 3 | 3 | 2 |

FIG. 4

| | Venue Attributes | | | | | | |
|---|---|---|---|---|---|---|---|
| | City | State | Price | Genre | Hours of Operation | Attire | Neighborhood |
| Restaurant 1 | Boston | MA | 1 | Japanese | xxxxx | Casual | 02163 |
| Restaurant 2 | Boston | MA | 3 | Italian | xxxxx | Casual | 02196 |
| Restaurant 3 | Boston | MA | 5 | American | xxxxx | Casual | 02199 |
| Restaurant 4 | Boston | MA | 5 | Japanese | xxxxx | Casual | 02163 |
| Restaurant 5 | Boston | MA | 7 | Italian | xxxxx | Casual | 02196 |
| Restaurant 6 | Boston | MA | 2 | American | xxxxx | Casual | 02199 |
| Restaurant 7 | Boston | MA | 9 | Japanese | xxxxx | Formal | 02163 |
| Restaurant 8 | Boston | MA | 2 | Italian | xxxxx | Formal | 02196 |
| Restaurant 9 | Boston | MA | 4 | American | xxxxx | Formal | 02199 |
| Restaurant 10 | Boston | MA | 6 | Japanese | xxxxx | Formal | 02163 |
| Restaurant 11 | Boston | MA | 8 | Italian | xxxxx | Formal | 02196 |
| Restaurant 12 | Boston | MA | 2 | American | xxxxx | Formal | 02199 |

Reviewer Attributes

| | Gender | Age | Profession Code | Education Code | Marital Status Code | # of Children | # of Reviews | Review Accuracy |
|---|---|---|---|---|---|---|---|---|
| Reviewer 1 | F | 42 | xxxxx | xxxxx | xxxxx | 1 | 13 | 8 |
| Reviewer 2 | F | 26 | xxxxx | xxxxx | xxxxx | 2 | 23 | 9 |
| Reviewer 3 | F | 40 | xxxxx | xxxxx | xxxxx | 3 | 24 | 9 |
| Reviewer 4 | F | 60 | xxxxx | xxxxx | xxxxx | 2 | 32 | 9 |
| Reviewer 5 | M | 21 | xxxxx | xxxxx | xxxxx | 1 | 26 | 6 |
| Reviewer 6 | M | 30 | xxxxx | xxxxx | xxxxx | 4 | 30 | 2 |
| Reviewer 7 | M | 57 | xxxxx | xxxxx | xxxxx | 3 | 27 | 1 |

FIG. 5

User Attributes

| | Gender | Age | Profession | Education | Marital Status | # of Children | Favorite Venue 1 | Favorite Venue 2 | Favorite Venue 3 | Favorite Venue 4 |
|---|---|---|---|---|---|---|---|---|---|---|
| User 1 | M | 40 | xxxxx | xxxxx | xxxxx | 1 | xxxxx | xxxxx | xxxxx | xxxxx |
| User 2 | M | 30 | xxxxx | xxxxx | xxxxx | 1 | xxxxx | xxxxx | xxxxx | xxxxx |
| User 3 | M | 33 | xxxxx | xxxxx | xxxxx | 1 | xxxxx | xxxxx | xxxxx | xxxxx |
| User 4 | M | 54 | xxxxx | xxxxx | xxxxx | 0 | xxxxx | xxxxx | xxxxx | xxxxx |
| User 5 | F | 35 | xxxxx | xxxxx | xxxxx | 3 | xxxxx | xxxxx | xxxxx | xxxxx |
| User 6 | F | 34 | xxxxx | xxxxx | xxxxx | 2 | xxxxx | xxxxx | xxxxx | xxxxx |
| User 7 | F | 41 | xxxxx | xxxxx | xxxxx | 2 | xxxxx | xxxxx | xxxxx | xxxxx |

FIG. 6

| | Content-based Venue Links | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | | | | | | | | | | | |
| Restaurant 2 | +0.25 (same attire) | | | | | | | | | | | |
| Restaurant 3 | +0.25 (same attire) | +0.25 (same attire) | | | | | | | | | | |
| Restaurant 4 | +1.25 (same neighborhood), +1 (same genre), +0.25 (same attire) | +0.25 (same attire) | +0.25 (same attire) | | | | | | | | | |
| Restaurant 5 | +0.25 (same attire) | +1.25 (same neighborhood), +1 (same genre), +0.25 (same attire) | +0.25 (same attire) | +0.25 (same attire) | | | | | | | | |
| Restaurant 6 | +0.25 (same attire) | +0.25 (same attire) | +1.25 (same neighborhood), +1 (same genre), +0.25 (same attire) | +0.25 (same attire) | +0.25 (same attire) | | | | | | | |
| Restaurant 7 | +1.25 (same neighborhood), +1 (same genre) | | | +1.25 (same neighborhood), +1 (same genre) | | | | | | | | |

| | R1 | R2 | R3 | R4 | R5 | R6 | R7 | R8 | R9 | R10 | R11 | R12 |
|---|---|---|---|---|---|---|---|---|---|---|---|---|
| Restaurant 8 | +1.25 (same neighborhood), +1 (same genre) | | | | +1.25 (same neighborhood), +1 (same genre) | | | | +0.25 (same attire) | | | |
| Restaurant 9 | | +1.25 (same neighborhood), +1 (same genre) | | +0.25 (same attire) | | | +1.25 (same neighborhood), +1 (same genre), +0.25 (same attire) | +0.25 (same attire) | | +0.25 (same attire) | | |
| Restaurant 10 | +1.25 (same neighborhood), +1 (same genre) | | +1.25 (same neighborhood), +1 (same genre) | | | +0.25 (same attire) | +0.25 (same attire) | | +1.25 (same neighborhood), +1 (same genre), +0.25 (same attire) | | +0.25 (same attire) | |
| Restaurant 11 | | +1.25 (same neighborhood), +1 (same genre) | | | +1.25 (same neighborhood), +1 (same genre) | | | +0.25 (same attire) | +0.25 (same attire) | +0.25 (same attire) | | +0.25 (same attire) |
| Restaurant 12 | | | | +1.25 (same neighborhood), +1 (same genre) | | | +1.25 (same neighborhood), +1 (same genre) | | | +1.25 (same neighborhood), +1 (same genre), +0.25 (same attire) | +0.25 (same attire) | +0.25 (same attire) |

| Collaborative Venue Links | | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | | | | | | | | | | | |
| Restaurant 2 | | | | | | | | | | | | |
| Restaurant 3 | +1 (both rated 4 by Reviewer 2) | | | | | | | | | | | |
| Restaurant 4 | | | +1 (rated 4 by Reviewer 2) | | | | | | | | | |
| Restaurant 5 | | | -0.75 (opposite affinity expressed by Reviewer 1) | | | | | | | | | |
| Restaurant 6 | | | | | -1.00 (strongly opposite affinity expressed by Reviewer 3) | | | | | | | |
| Restaurant 7 | | | +1 (both rated 4 by Reviewer 2); -0.75 (opposite affinity expressed by Reviewer 1) | +1 (both rated 4 by Reviewer 2) | -1.00 (strongly opposite affinity expressed by Reviewer 3) | +1.5 (both rated 5 by Reviewer 3) | | | | | | |
| Restaurant 8 | +1 (both rated 4 by Reviewer 2) | | +1 (both rated 4 by Reviewer 1) | | +1 (both rated 4 by Reviewer 4), +1.25 (both rated 4 or 5 by Reviewer 5) | | -0.75 (opposite affinity expressed by Reviewer 1) | | | | | |

FIG. 8A

| | | | | | | | | | | | |
|---|---|---|---|---|---|---|---|---|---|---|---|
| Restaurant 9 | -0.75 (opposite affinity expressed by Reviewer 2) | | | | | | -1.00 (strongly opposite affinity expressed by Reviewer 3) | | | | |
| Restaurant 10 | +1 (rated 4 by Reviewer 2) | | -0.75 (opposite affinity expressed by Reviewer 2) | -0.75 (opposite affinity expressed by Reviewer 2) +1 (rated 4 by Reviewer 2) | -0.75 (opposite affinity expressed by Reviewer 7) | | | -0.75 (opposite affinity expressed by Reviewer 3); +1.25 (both rated 4/5 by Reviewer 2) | | | |
| Restaurant 11 | | | -0.75 (opposite affinity expressed by Reviewer 1) | | +1.25 (both rated 4 or 5 by Reviewer 4); -1.00 (strongly opposite affinity expressed by Reviewer 5) | | -1.00 (strongly opposite affinity expressed by Reviewer 3) | +1.25 (both rated 4 or 5 by Reviewer 4); -0.75 (opposite affinity expressed by Reviewer 1); -0.75 (opposite affinity expressed by Reviewer 5) | +1 (both rated 4 by Reviewer 7); -0.75 (opposite affinity expressed by Reviewer 7) | -0.75 (opposite affinity expressed by Reviewer 2) | |
| Restaurant 12 | +1 (both rated 4 by Reviewer 2) | | +1 (both rated 4 by Reviewer 2) | +1 (both rated 4 by Reviewer 2) | -0.75 (opposite affinity expressed by Reviewer 4) | | | +1.25 (both rated 4 or 5 by Reviewer 2) | -0.75 (opposite affinity expressed by Reviewer 4) | | +1 (both rated 4 by Reviewer 2); -1.00 (strongly opposite affinity expressed by Reviewer 4) |

FIG. 8B

| | Recommendation Generation for American Restaurant based on User Affinity for Restaurant 7 | | | | | | |
|---|---|---|---|---|---|---|---|
| | Content-based link strength 901 | Weighting factor 902 | Collaborative link strength 903 | Weighting factor 904 | Content - collaborative link strength 905 | Weighting factor 906 | Overall link strength 907 |
| Restaurant 3 | 0 | 0.35 | 0.25 | 0.4 | 0.5 | 0.25 | 0.225 |
| Restaurant 6 | 0 | 0.35 | 1.5 | 0.4 | 0.7 | 0.25 | 0.775 |
| Restaurant 9 | 0.25 | 0.35 | -1 | 0.4 | 0.4 | 0.25 | -0.2125 |
| Restaurant 12 | 0.25 | 0.35 | 1.25 | 0.4 | 0.8 | 0.25 | 0.7875 |

FIG. 9

| Connection Growth from Collaborative Venue Links for Restaurant 8 | | | | | | | | | | | |
|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | | | | | | | | | | | |
| Restaurant 2 | | | | | | | | | | | | |
| Restaurant 3 | | | | | | | | | | | | |
| Restaurant 4 | | | | | | | | | | | | |
| Restaurant 5 | | | +0.25 (both positively linked to Restaurant 8) | | | | | | | | | |
| Restaurant 6 | | | | | | | | | | | | |
| Restaurant 7 | | | | | | | | | | | | |
| Restaurant 8 | | | | | | | | | | | | |
| Restaurant 9 | | | | | | | | | | | | |
| Restaurant 10 | | | | | | | | | | | | |
| Restaurant 11 | | | | | | | | | | | | |
| Restaurant 12 | | | | | | +0.15 (both negatively linked to Restaurant 8) | | | | +0.05 (both negatively linked to Restaurant 8, but substantially different magnitude) | | |

FIG. 10

| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
|---|---|---|---|---|---|---|---|---|---|---|---|---|
| Restaurant 1 | | | | | | | | | | | | |
| Restaurant 2 | 8.28 | | | | | | | | | | | |
| Restaurant 3 | -2.02 | 14.16 | | | | | | | | | | |
| Restaurant 4 | 10.05 | 11.54 | -0.18 | | | | | | | | | |
| Restaurant 5 | -1.71 | 3.52 | 4.68 | 8.33 | | | | | | | | |
| Restaurant 6 | 2.97 | 4.36 | 13.24 | 13.49 | 2.38 | | | | | | | |
| Restaurant 7 | 3.40 | -1.65 | 1.70 | -0.53 | -0.45 | 3.28 | | | | | | |
| Restaurant 8 | 5.38 | 3.33 | 9.03 | 6.59 | 11.68 | -4.11 | 0.68 | | | | | |
| Restaurant 9 | 11.60 | 2.92 | 12.75 | 2.22 | 11.22 | 5.97 | -1.01 | 8.77 | | | | |
| Restaurant 10 | 14.43 | 11.49 | 3.69 | 3.26 | 6.67 | 7.11 | 9.87 | 8.36 | 12.87 | | | |
| Restaurant 11 | 12.33 | 9.08 | 4.70 | 6.24 | -0.09 | 12.05 | 8.00 | 5.23 | -1.34 | 14.86 | | |
| Restaurant 12 | 6.21 | 0.36 | -4.03 | 8.13 | 14.89 | 6.66 | 5.04 | 3.52 | 11.85 | 6.70 | 12.26 | |

Normalization of Collaborative Venue Links: Pre-Normalization Data

FIG. 11

| Normalization of Collaborative Venue Links: Post- Normalization Data | | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | | | | | | | | | | | |
| Restaurant 2 | 3.28 | | | | | | | | | | | |
| Restaurant 3 | -7.02 | 9.16 | | | | | | | | | | |
| Restaurant 4 | 5.05 | 6.54 | -5.18 | | | | | | | | | |
| Restaurant 5 | -6.71 | -1.48 | -0.32 | 3.33 | | | | | | | | |
| Restaurant 6 | -2.03 | -0.64 | 8.24 | 8.49 | -2.62 | | | | | | | |
| Restaurant 7 | -1.60 | -6.65 | -3.30 | -5.53 | -5.45 | -1.72 | | | | | | |
| Restaurant 8 | 0.38 | -1.67 | 4.03 | 1.59 | 6.68 | -9.11 | -4.32 | | | | | |
| Restaurant 9 | 6.60 | -2.08 | 7.75 | -2.78 | 6.22 | 0.97 | -6.01 | 3.77 | | | | |
| Restaurant 10 | 9.43 | 6.49 | -1.31 | -1.74 | 1.67 | 2.11 | 4.87 | 3.36 | 7.87 | | | |
| Restaurant 11 | 7.33 | 4.68 | -0.30 | 1.24 | -5.09 | 7.05 | 3.00 | 0.23 | -6.34 | 9.86 | | |
| Restaurant 12 | 1.21 | -4.64 | -9.03 | 3.13 | 9.89 | 1.66 | 0.04 | -1.48 | 6.85 | 1.70 | 7.26 | |

FIG. 12

| | Connection Creep from Restaurant 10 | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | +0.5 | | | | | | | | | | |
| Restaurant 2 | | | | | | | | | | | | |
| Restaurant 3 | | | | | | | | | | | | |
| Restaurant 4 | | | | | | | | | | | | |
| Restaurant 5 | | | | | | | | | | | | |
| Restaurant 6 | | | | | | | | | | | | |
| Restaurant 7 | | | | | | | | | | | | |
| Restaurant 8 | | | | | | | | | | | | |
| Restaurant 9 | | | | | | | | | | | | |
| Restaurant 10 | -1.5 | | | | | | +0.5 | +0.5 | (No Change Because Above Threshold) | | | |
| Restaurant 11 | | | | | | | | | | | | |
| Restaurant 12 | | | | | | | | | | | | |

FIG. 13

Fig. 16
| | Node Type | Example 1 | Example 2 | Description |
|---|---|---|---|---|
| 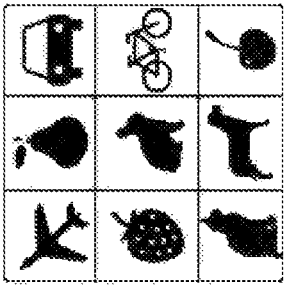 | Item | The restaurant "PRINT" in New York | The movie "Forrest Gump" | Individual things a person might encounter |
|  | Attribute | Chic | Sentimental | Properties that distinguish items from each other |
| 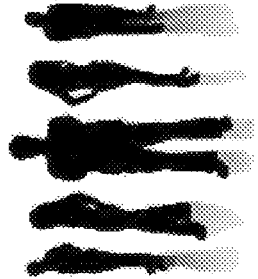 | Person | A user of a restaurant website | A professional movie reviewer | Human beings who referee subjective taste |
300 →
302 →
304 →

*Fig. 17*

| | Connection | Example | Sample Event | Result |
|---|---|---|---|---|
| 600 → | Person-Item | Online review | Roger Ebert gives the movie, "The Usual Suspects" "2 thumbs up" | Connection amplified between "Roger Ebert" and the movie |
| 602 → | Attribute-Item | Grape variety of a specific wine | The varietal of the wine, "Henri Jayer Richebourg Grand Cru" is labeled in a database as "Pinot Noir" | Connection made between the specific wine and the node for the varietal, "Pinot Noir" |
| 604 → | Item-Item | Two items often found together on the same page | A page about "Romantic restaurants in New York" includes "Bouley" and "Daniel" | Connection amplified between the two restaurants |

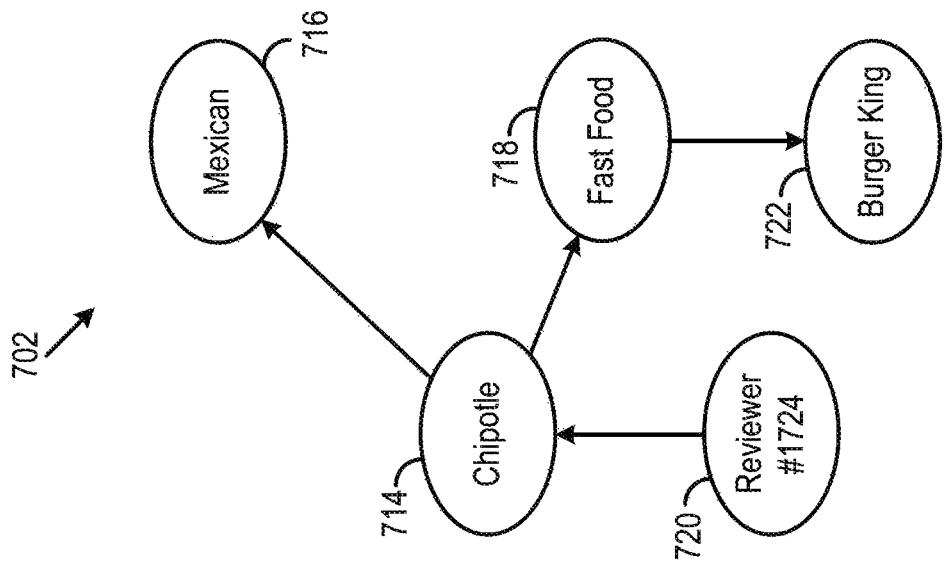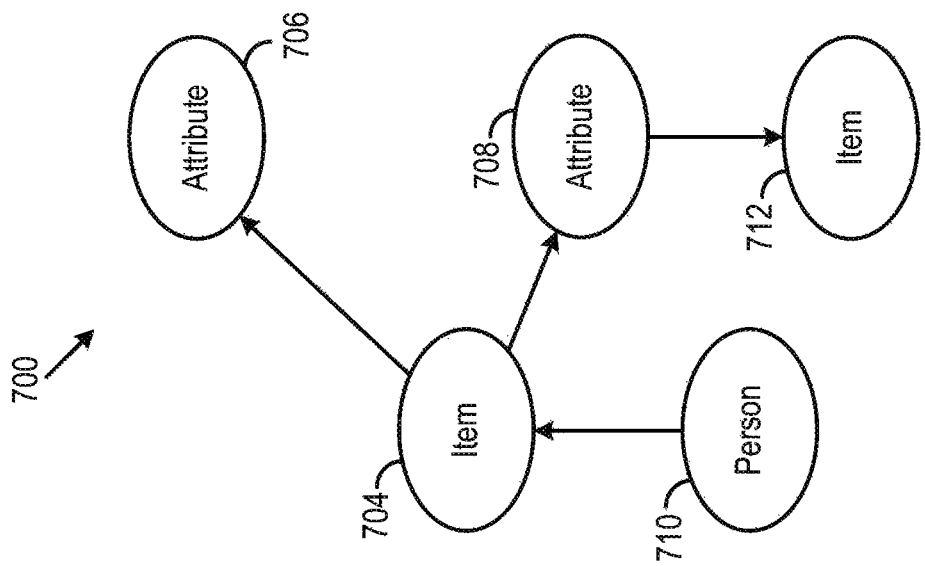
Fig. 18

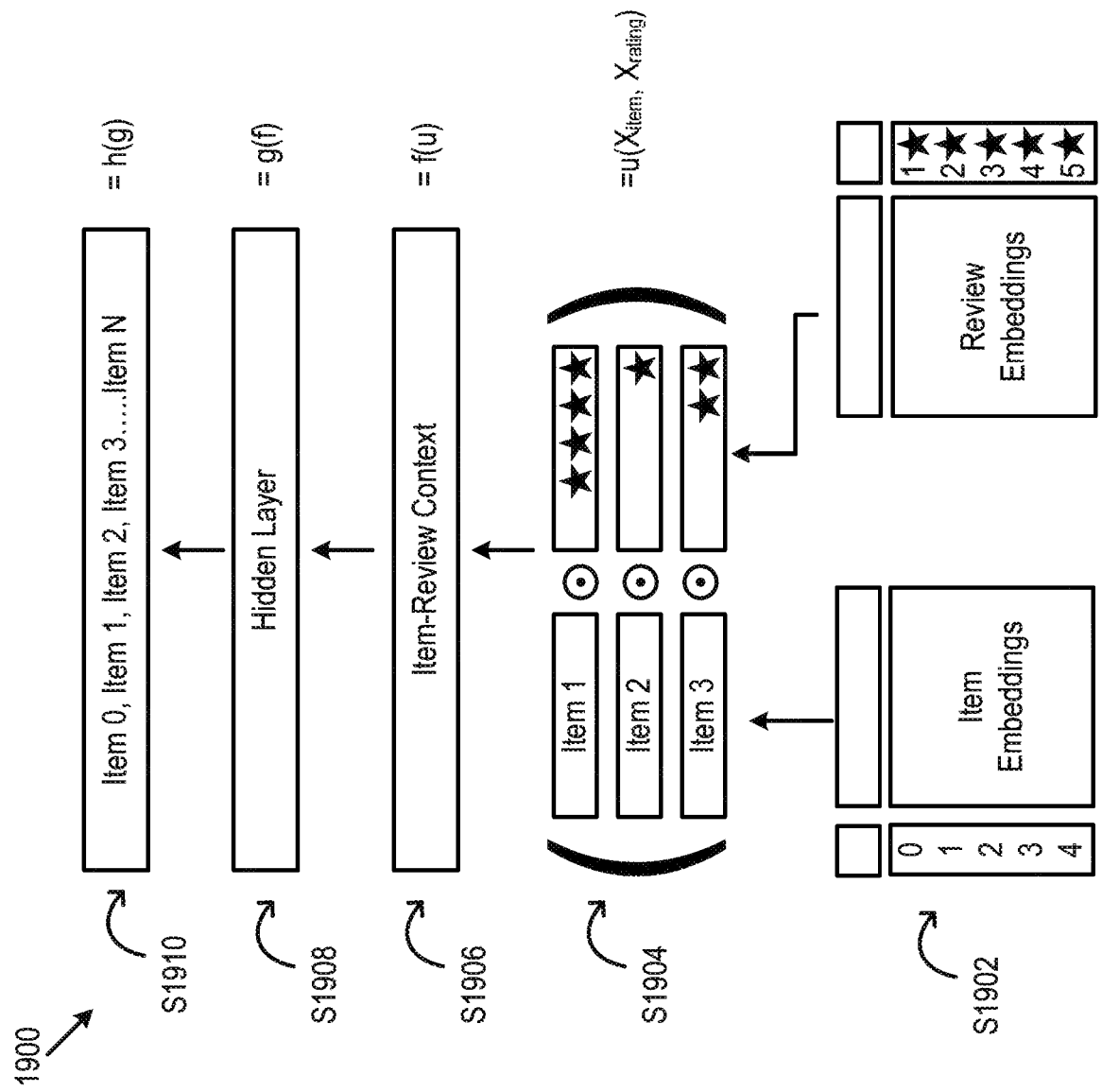

| | |
|---|---|
| Four Minutes | 4.990 |
| Lord of the Rings: The Return of the King | 4.800 |
| Star Wars: Episode 4 | 4.775 |
| Lord of the Rings: The Fellowship of the Ring | 4.695 |
| Rejs | 4.550 |

*Fig. 31B*

| Shawshank Redemption | 4.995 |
|---|---|
| Godfather | 4.900 |
| Yojimbo | 4.875 |
| Usual Suspects | 4.780 |
| Schindler's List | 4.650 |

*Fig. 31C*

| Star Wars: Episode 4 | 4.998 |
|---|---|
| Star Wars: Episode 6 | 4.865 |
| Lord of the Rings: The Fellowship of the Ring | 4.720 |
| Lord of the Rings: The Return of the King | 4.718 |
| The Hobbit: The Battle of the Five Armies | 4.614 |

*Fig. 31D*

METHODS FOR CONSTRUCTING AND APPLYING SYNAPTIC NETWORKS

CROSS-REFERENCE TO RELATED APPLICATIONS

The present application is a continuation of U.S. application Ser. No. 17/035,344 filed Sep. 28, 2020, which is a continuation of U.S. application Ser. No. 15/419,517 filed Jan. 30, 2017, now U.S. Pat. No. 10,789,526, which is a continuation application of U.S. application Ser. No. 15/170,574 filed Jun. 1, 2016, which claims the benefit of U.S. Provisional Application No. 62/169,399, filed Jun. 1, 2015 and is a continuation-in-part of U.S. application Ser. No. 14/930,166, filed Nov. 2, 2015, now U.S. Pat. No. 10,423,880, which is a continuation of U.S. application Ser. No. 14/537,319, filed Nov. 10, 2014, now U.S. Pat. No. 9,208,433, which is a continuation of U.S. application Ser. No. 14/267,464, filed May 1, 2014, now U.S. Pat. No. 8,909,583, which is a continuation of U.S. application Ser. No. 13/919,301, filed Jun. 17, 2013, now U.S. Pat. No. 8,756,187, which is a continuation of U.S. application Ser. No. 13/416,945, filed Mar. 9, 2012, now U.S. Pat. No. 8,515,893, which is a continuation of U.S. application Ser. No. 13/247,289, filed Sep. 28, 2011, now U.S. Pat. No. 8,170,971, the entire contents of each of which are incorporated herein by reference.

BACKGROUND

Search engines may output lists of hyperlinks for web pages that include information of interest. Some search engines base the determination of corresponding hyperlinks on a search query entered by the user. The goal of the search engine is to return links for high quality, relevant sites based on the search query. Most commonly, search engines accomplish this by matching the terms in the search query to a database of stored web pages or web page content. Web pages that include the terms in the search query are considered "hits" and are included in the list of hyperlinks presented to the user.

To increase efficacy of the search, a search engine may rank the list of hits or hyperlinks according to the relevance or quality. For example, the search engine may assign a grade or rank to each hit, and the score may be assigned to correspond to the relevance or importance of the web page. Conventional methods of determining importance or relevance are based on the content of each web page including the link structure of the web page.

Many conventional search engines utilize an indexing system for identifying web pages available on the Internet. The indexing system identifies words in the pages and creates an index of those words. The system responds to user queries by analyzing the index and identifying the pages that are most relevant to the user's query.

The relevance ranking or determination can be executed in various ways. The citation of one site or page by other sites or pages is sometimes used as one measure of relevance. Web page metadata is also sometimes used in a determination of relevance.

Neural networks have also been used in the field of Internet searching. It is assumed, for purposes of this description, that the reader is familiar with how neural networks operate. A neural network can consist of three basic aspects—a neuron or node, definitions of how the neurons or nodes are interconnected or related to each other, and the manner in which that topology is updated over time.

SUMMARY

In selected embodiments a recommendation generator builds a network of interrelationships among venues, reviewers and users based on their attributes and reviewer and user reviews of the venues. Each interrelationship or link may be positive or negative and may accumulate with other links (or anti-links) to provide nodal links the strength of which are based on commonality of attributes among the linked nodes and/or common preferences that one node, such as a reviewer, expresses for other nodes, such as venues. The links may be first order (based on a direct relationship between, for instance, a reviewer and a venue) or higher order (based on, for instance, the fact that two venues are both liked by a given reviewer). The recommendation engine in certain embodiments determines recommended venues based on user attributes and venue preferences by aggregating the link matrices and determining the venues which are most strongly coupled to the user. The system architecture in various embodiments may permit efficient, localized updating of the neural network in response to alteration of the attributes of various nodes.

The details of one or more implementations are set forth in the accompanying drawings and description below. Other features, objects, and advantages will be apparent from the description and drawings, and from the claims.

BRIEF DESCRIPTION OF FIGURES

FIG. 3 is chart including reviewer ratings according to one example.

FIG. 4 is a chart including venue attributes according to one example.

FIG. 5 is a chart including reviewer attributes according to one example FIG. 6 is a chart including user attributes according to one example.

FIGS. 7A and 7B show a matrix of content-based venue links according to one example.

FIGS. 8A and 8B show a matrix of collaborative venue link according to one example.

FIG. 9 is a chart illustrating a recommendation generation according to one example.

FIG. 10 is a chart illustrating a connection grown according to one example.

FIG. 11 is a chart illustrating pre-normalization matrix data according to a second example.

FIG. 12 is a chart illustrating post-normalization matrix data according to a second example.

FIG. 13 is a chart illustrating connection creep according to a second example.

FIG. 16 is an exemplary table showing types of nodes in a synaptic network, according to one example.

FIG. 17 is an exemplary table showing types of node connections in a synaptic network, according to one example.

FIG. 18 is an exemplary diagram of nodal connections in a synaptic network, according to one example.

FIG. 30A is an exemplary flowchart of a distributed representation recommendation process, according to one example.

FIG. 31B is an exemplary diagram of recommendation results, according to one example.

FIG. 31C is an exemplary diagram of recommendation results, according to one example.

FIG. 31D an exemplary diagram of recommendation results, according to one example.

Like reference symbols in various drawing indicate like elements.

DETAILED DESCRIPTION OF ILLUSTRATIVE IMPLEMENTATIONS

Overview of Selected Embodiments

Figure 1A:
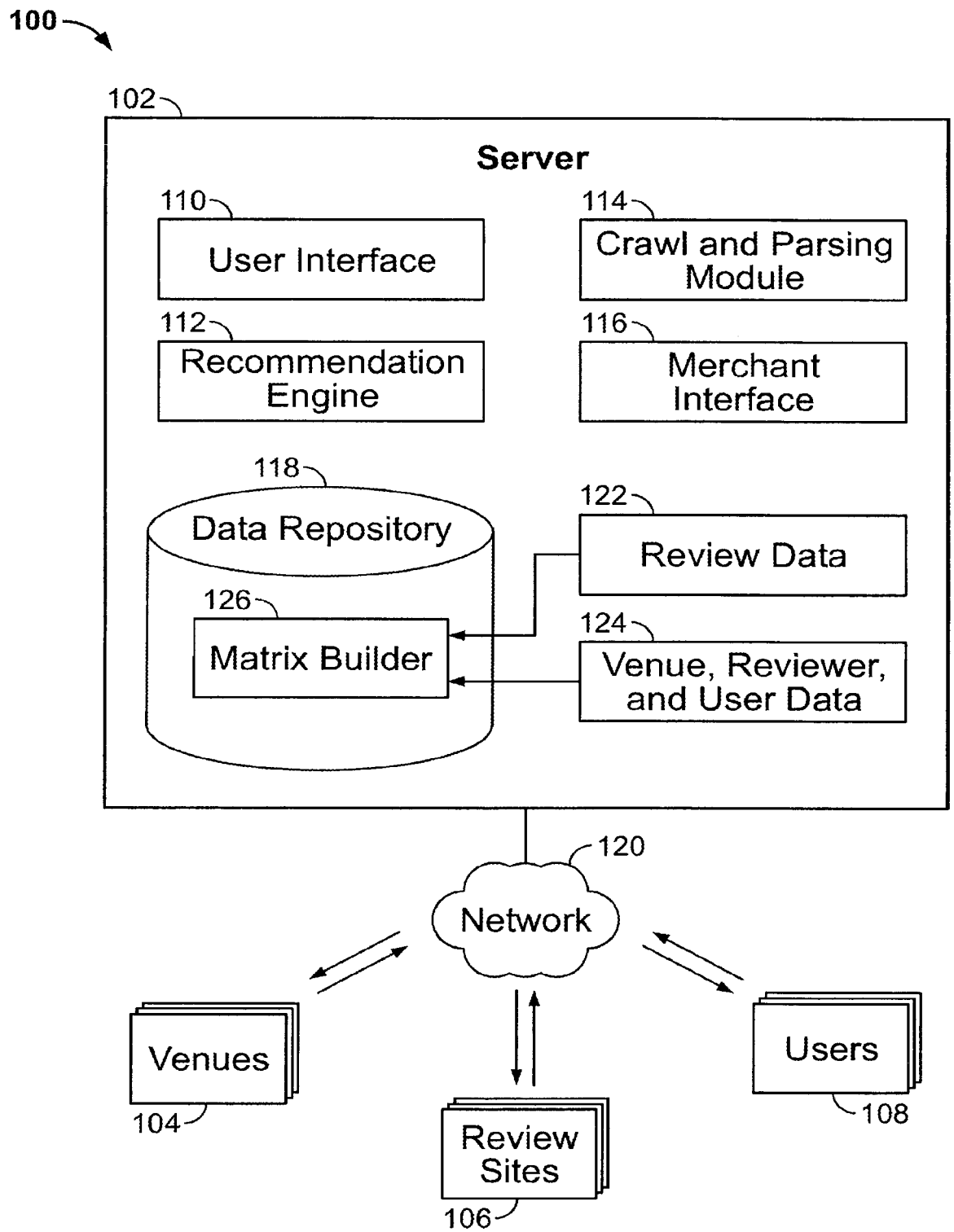
FIG. 1A is a block diagram of an environment for developing and utilizing a network of interrelated nodes.

In certain implementations a recommendation engine may generate recommendations based on attributes and data associated with venues, users, reviewers and reviews. The system may harvest reviews generated by various reviewing entities parse those reviews into an organized database of review data. That data may include attributes of the venue (such as a restaurant) and the rating or assessment provided by the reviewer. The system may also gather or generate data concerning the attributes of reviewer, such as gender, age, profession, marital status, review frequency and review accuracy. The system, in one implementation, also gathers data concerning the attributes of user, such as gender, age, profession, marital status, and affinity (whether positive or negative) for certain venues.

The exemplary system may generate a neural network of interrelationships based on venue attributes and reviewer attributes. For instance, venues may be linked by common features such as price, genre, attire, location, or affinity expressed by the same reviewer. Reviewers may be linked by personal characteristics or common affinities for certain venues. Reviewers and venues may be linked by common attributes of reviewers with a given affinity for a specific venue or common venue attributes for venues liked by a given reviewer.

The system may create interrelationships between and amongst venues and reviewers of different species. For instance, interrelated venues may include restaurants, theaters, events and institutions. Interrelated reviewers may include periodicals and individual reviewers.

Each link may incrementally strengthen or weaken the overall interrelationship between two venues, a venue and a reviewer, or two reviewers. Each link may affect neighboring links, either by causing the neighboring links to strengthen or weaken based on the magnitude of the origin link. When two reference nodes (e.g. venues) are each connected to a common node (e.g., a venue), the system can generate an additional link or interrelationship between the two reference nodes.

The interrelationships can be broadly categorized as collaborative and content-based. Collaborative relationships are a function of affinities expressed by a given reviewer. Stated another way, collaborative links are usually between things a given user likes, often irrespective of why the user likes them. Content-based relationships are a function of the features held in common among venues in a given subset. Stated another way, content-based links are usually between things within a group which have common features. Hybrids of these approaches may also be used, for example, a link may identify venues among those liked by a given reviewer which have features in common.

The neural network of interrelationships grows dynamically as further review, reviewer and venue data is added. The system may continuously analyze the data to add positive or negative collaborative links, content links, or content-collaborative links. The system may create new derivative links, normalize the data to adjust for data skew, and adjust links based on neighboring link values.

In various implementations the system may generate recommendations based on user attributes and data associated with a recommendation request. The system may provide a plurality of recommendations based overall link strengths that factor in collaborative and content-based interrelationships. The recommendations may include venues complementary to that specifically requested, for instance, in response to a user request for a restaurant recommendation the system may generate a theater or night club recommendation as well.

Exemplary System Architecture

FIG. 1A illustrates an exemplary network architecture for a server-based recommendation generation system 100. It will be understood that some or all of the functionality described herein may be relocated to a client device application (such as a smart phone application) based on the client device's communication, data storage and computational capabilities.

The server 102 hosts a plurality of engines and modules. In this application the user interface module 110 resides on the server 102 and serves web pages or suitable content to a client side application. The crawl and parsing module 114 executes the web crawling and source data collection operations described below. The recommendation engine 112 accesses the matrices of interrelationships and generates the recommendations according to the techniques described herein. The merchant interface 116 provides the functionality describe below concerning venue operators' interaction with the server and accessing projections and reports generated thereby.

The data repository 118 stores the matrices of interrelationships. The repository includes a matrix builder 126 which builds the data structures reflecting the nodal interrelationships based on review data 122 which is collected from review sites 106 by the crawl and parsing module 114. The matrix builder also incorporates venue, reviewer and user data 124 collected from users 108, venues 104 and other web pages (by the crawl and parsing module 114).

The network 120 includes in certain embodiments the Internet or world-wide web. The network may also comprise proprietary and semi-propriety networks such as cellular data networks, intranets, VPNs, or extranets.

Those skilled in the art will understand that the techniques described herein may be implemented in various system and database topologies and consistent with various computational methodologies. Topologies and methodologies suitable for aspects of various embodiments are described in K. R. Nichols, A Reconfigurable Computing Architecture for Implementing Artificial Neural Networks on FPGA, Master's Thesis, The University of Guelph, December 2003; F. Rosenblatt, The Perception: A Probabilistic Model For Information Storage And Organization In The Brain, Psychol. Rev., 65(6):386-408, 1958; K. Steinbuch and U. A. W. Piske; Learning Matrices and their Applications. IEEE Trans. Electron. Computers; 12:846-862, 1963; J. A Bamden, High-level Reasoning, Computational Challenges for Connectionism, and the Composit solution. Appl. Intell., 5(2):103-135, April 1995; B. Denby, P. Garcia, B. Granado, C. Kiesling, J. C. Prevotet and A. Wassatch, Fast Triggering in High Energy Physics Experiments Using Hardware Neural Networks, IEEE Trans. On Neural Networks, 14(5):1010-1027, September 2003; R. O. Duda, P. E. Hart, and D. G. Stork. Pattern Classification. John Wiley & Sons, New York, 2nd edition, 2001; H. Eichenbaum, The Cognitive Neuroscience of Memory: An Introduction, Oxford University Press, New York, 2002; K. Fukushima, Cognitron: A Self-Organizing Multilayered Neural Network, Biol. Cybern, 20(3-4): 127-136, 5 Nov. 1975; K. Fukushima and S. Miyake. A Self-Organizing Neural Network With A Function Of Associative Memory: Feedback Type Cognitron, Biol. Cybern., 28(4): 201-208, 3 Mar. 1978; J. M. Fuster. Cortex and Mind: Unifying Cognition. Oxford University Press, New York, 2002; R. Gadea, J. Cerda, F. Ballesterand A. Mocholi, Artificial Neural Network Implementation On A Single FPGA Of A Pipelined On-Line Backpropagation, ISSS 2000, Madrid, Spain, September 2000; S. Grossberg, Adaptive Pattern Classification And Universal Recoding: I. Parallel Development And Coding Of Neural Feature Detectors. Biol. Cybern., 23(3):121-134, 30 Jul. 1976; S. Grossberg, Adaptive Pattern Classification And Universal Recoding: IL Feedback, Expectation, Olfaction, Illusions, Biol. Cybern., 23(4):187-202, 30 Aug. 1976; S. Haykin. Neural Networks: A Comprehensive Foundation. Prentice Hall, Upper Saddle River, N.J., 2nd edition, 1999; R. Hecht-Nielsen, Neurocomputing, Addison Wesley, Reading, Mass., 1989; R. Hecht-Nielsen, A Theory Of Thalamocortex, in R. Hecht-Nielsen and T. McKenna, editors, Computational Models for Neuroscience: Human Cortical Information; S. Y. Kung, M. W. and S. H. Lin., Biometric Authentication: A Machine Learning Approach. Prentice Hall PTR, Upper Saddle River, N.J., 2005; B. Widrow and M. Kamenetsky, On The Efficiency Of Adaptive Algorithms, In S. Haykin and B. Widrow, editors, Least-Mean-Square Adaptive Filters, John Wiley & Sons, New York, 2003; B. Widrow and M. Kamenetsky, Statistical Efficiency Of Adaptive Algorithms, Neural Netw., 16(5-6):735-744, June-July 2003; B. Widrow and M. A. Lehr, 30 Years Of Adaptive Neural Networks: Perception, Madaline, and backpropagation, Proc. IEEE, 78(9): 1415-1442, September 1990; U.S. Pat. No. 7,840,569, entitled "Enterprise relevancy ranking using a neural network," which is incorporated herein by reference; U.S. Pat. No. 7,895,140, entitled "Neural Network Learning Device, Method, And Program," which is incorporated herein by reference; and U.S. Pat. No. 7,979,370, entitled "Neural Network For Electronic Search Applications," which is incorporated herein by reference.

Node/Venue Types

The nodes in the neural network in one implementation are venues such as restaurants, theaters, night clubs, hotels, concerts and other events. However, due to the flexibility of the systems and methodologies described herein they may be applied in a variety of other manners. Nodes in the network may be sub-venue items such as specific mend items or specific rooms inside a hotel. The nodes may also be style consumables such as clothing, furniture or wine or rather content such as music, books, magazines, TV shows, or movies. The nodes are optionally set to be services such as mechanics, barbers, transportation, doctors, dentists, landscape architects, interior designers, or nanny services. In other implementations the nodes may neighborhoods or cities in which to live, colleges to apply to, careers that are a good fit, or grocery stores. In still other applications the nodes may be associated with social aspects such as friends and activities the user might like. The nodes in other embodiments are medical conditions or treatments.

The techniques described herein may also be used for fraud detection by providing predictions of what a user is unlikely to do, which in turn is more likely to be associated with fraudulent use of a credit card (for instance). The techniques may also be used for marketing/co-branding opportunities by predicting brand affinity even across disparate categories. The techniques may also be applied to actuarial/risk assessment applications by analyzing co-occurrences between a user's fine-scale likes and dislikes, which can be utilized as indicators of risk. The techniques may also be used to predict financial market behavior or trends by aggregating markets into "group users" and predicting behavior of that group user as described hereinbelow. In a similar vein predictions on mass human behavior can be achieved with respect to geographic movement (migratory patterns) and thereby census and demographic projections over time may be generated for use by retailers, real estate developers, and others. Moreover, the techniques may be used to gauge affinity for certain types of media (such a television shows) or media channels (cable or web).

As will be appreciated from the following description, in each such implementation the nodal attributes, reviewer attributes and the interrelationships will be selected to correspond in part to the factors which are causally associated with reviewer's preferences for certain nodes. For instance, in a system designed to provide career suggestions the nodal attributes may include skills associated with each profession and user attributes may include aptitude scores or survey questionnaire results.

Hereinbelow the system 100 is described in connection with exemplary systems in which the nodes are venues such as restaurants, hotels or theaters. For convenience the term "venue" is used to refer to neural network nodes. It should be understood that the term "venue" in the following sections is used broadly to refer to any entity or item that is interrelated in the network with other network nodes such as users and/or reviewers.

Identification of Venue Reviews

A user's or reviewer's affinity (again, positive or negative) for a venue is derived from both evaluations and assessments of venues, such as reviews or ratings, and implicit data sources such as ant trails. Individuals may publish ratings on social webpages, review forums and websites or blogs. Ratings may also be published by votes placed via "Like" or "Ding" buttons disposed on various websites. As one example, user reviews of restaurants can be found at menuism.com, dine.com, opentable.com, google.com, reviewsahoy.com, and realeats.com. An individual's affinity for certain venues can also be discerned from their spending habits or purchase history, data of which can be gleaned from financial transaction records such as credit card statements. An individual's web browsing history or ant trail can also provide insight into affinity for certain venues, as discerned from cookies or the various reviews an individual generates across multiple forums, including but not limited to websites associated with each venue. An individual's website navigation bookmarks and browsing history also reflect browsing behavior and may likewise be mined for source data. The geographic position of an individual over time, such as derived from cellular GPS data, can likewise be correlated with venues and thereby generate data reflective of venue affinity. This approach may provide dwell time data as well, which can be used to sort or arrange the data. Magazine subscriptions information may also be used as indicators of an individual's affinity for given venues (as that term is broadly used herein). An individual's professional licenses can also be used as data sources for affinity for venues, including but not limited to organizations.

The foregoing sources of data concerning venue affinity can be prioritized based on factors germane to the strength of the correlation between the data and the affinity of interest. Data or sites that refer to a greater number of venues might be more probative since such sites are more likely to compare, contrast or rank venues. Similarly, sites that specify a greater number of properties, such as in structured fields, for each venue or reviewer tend to be more effective or probative. Sites with a greater number of reviews per venue and/or reviews per reviewer are, on balance, to include more reliable affinity. The inclusion of "related items," "also viewed," or "people who purchased this also purchased" fields or boxes can also be considered as indicators that the site's data will be strongly correlated to actual affinities. In a similar vein, a site's inclusion of geographically proximate recommendations, recommendations based on social networking, and recommendations based of complementary venues (e.g. hotel and restaurant) may be indicative of more reliable data. The behavior of the more effective or accurate reviewers also can be analyzed to differentiate various data sources, for example, by determining where those reviewers tend to post reviews. The existence of grouping structures, such as data structures associated with a plurality of socially networked individuals, can also be used as a metric to grade or rate the potential value of the site's data. Blogs may also be crawled to determine which reviews or ratings sites are the most commonly referenced.

In one embodiment, numeric values are associated with some or all of the foregoing variables and weights are assigned to each variable based on the system designer's estimation of the relative strength of correlation between the variable and the predictive value of the review data on the site. For instance, the density of the best reviewers on a site may be weighted more heavily than the number of venues referenced on a site. The resulted weighted numerical grades can be used to prioritize harvesting operations.

Harvesting Venue Reviews and Reviewer Data

The reviews may be harvested using web crawling techniques such as those described in U.S. Pat. No. 6,631,369, entitled "Method and System for Incremental Web Crawling" and assigned to IBM Corporation, which is incorporated herein by reference. According to that technique, in an initial crawl, the crawler creates a first full index for the document store after which incremental crawls are executed.

Alternatively or in addition, the system 100 may target cached web pages served by commercial search engines. A suitable protocol for rebuilding content sites from search engine caches is as follows. First, a complete venue listing for a category by crawling a directory such as a Yellow Pages or other suitable directory. For each item in the directory, the system 100 runs a series of search queries in various search engines, each query restricted to results for the content site of interest, such as dine.com. The search results are parsed and the URLs for the relevant cached pages are retrieved. The cached pages are then retrieved and stored in a repository, after which they are parsed based on the name, city, phone number, and other data fields associated with a venue of interest. In this manner the cached review page for the venue of interest may be identified. This process is optionally repeated across search engines and across multiple venues, targeting the sites prioritized as set forth in the preceding section, to collect the desired array of source data.

The data may optionally be validated by checking parsed venue or reviewer content for blank fields. Venue or reviewer content may also be checked against unique identification information (a venue phone number or a reviewer email address or screen name) to ensure sure that it corresponds to the target venue or reviewer.

After validation, the pages may be parsed to extract the data of interest. Parser code may be used to segregate out the structured fields of interest, the reviews, and other information of interest as described above. The extracted data may be uploaded in database tables or files to be analyzed for computing personalization. Techniques such as those taught in U.S. Pat. No. 7,788,293, entitled "Generating Structured Information" assigned to Google Inc., the contents of which are herein incorporated by reference, may be used for this purpose.

The same approaches can be used to harvest data concerning reviewers or users (discussed in more detail below). The data is preferentially in a structured format on a public site and is predictive of personality and affinities. The data sources may be prioritized or ranked as set forth in the preceding section, such as according to the number of reviews, given by the reviewer, the citation of a reviewer's reviews on other sites and the alignment of a reviewer's reviews with overall ratings generated by the system 100 (as discussed below) and third party review sites from which data is harvested. The reviewer data is then selectively crawled and parsed as explained above.

The crawl and parser module 114 may be configured to coordinate the crawling and digestion of certain web or network nodes. Due to practical limitations the entire World Wide Web cannot be crawled and parsed simultaneously. The crawling and parsing process may be coordinated across different content-gathering computers or agents. Multiple remote crawling engines (at remote network nodes) may be deployed, each of which can check data sources (such as web pages or cached web pages) for the properties described above and recruit crawling and parsing nodes in the event rich data sources are located. The remote crawling nodes can coordinate their crawling based on real-time breaking news events, or optimize content gathering in response to shifts in mass user behavior as reflected in the data matrices described herein.

Figure 1B:
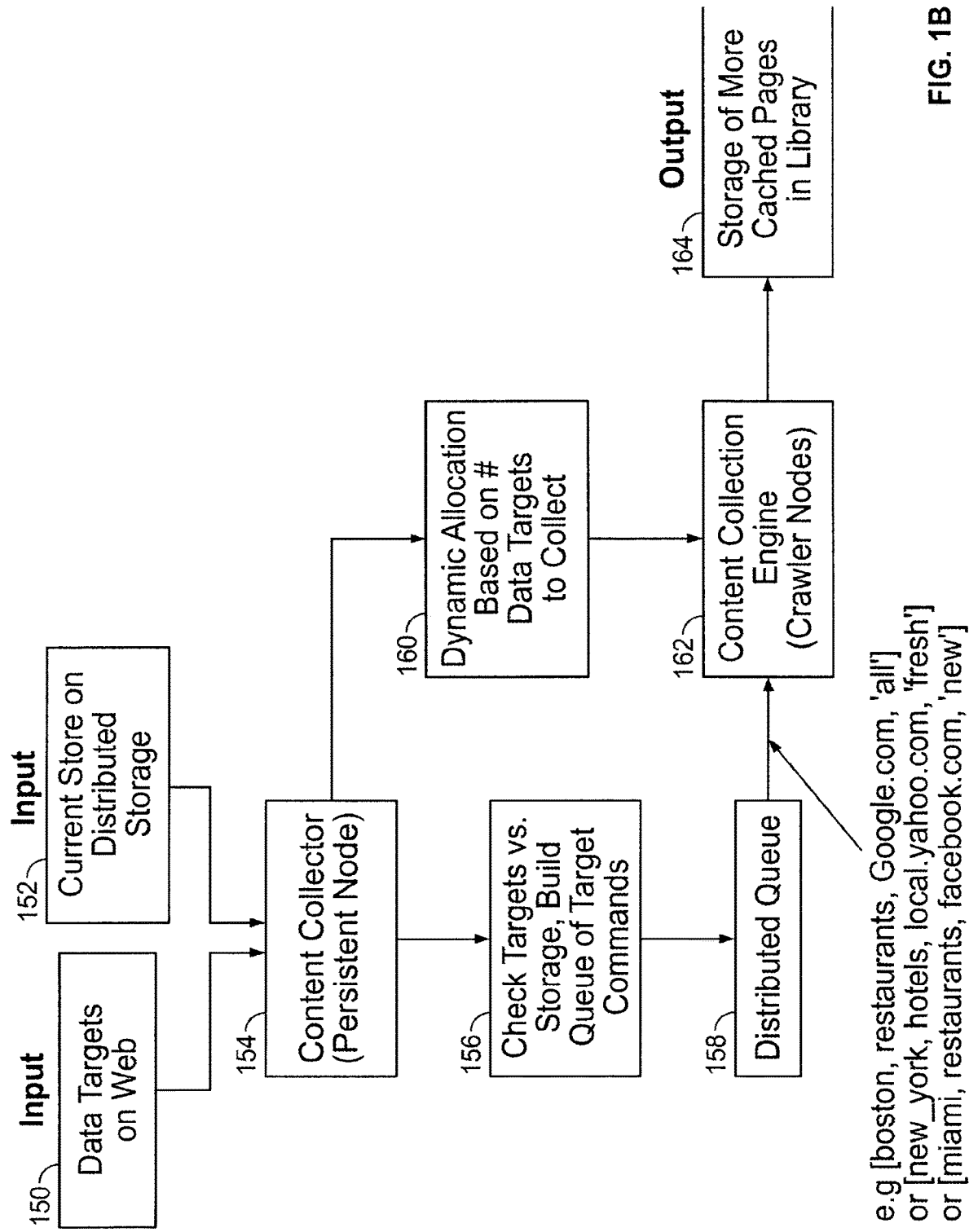
FIG. 1B is a diagram of a process flow executed by an exemplary content collection system.
Figure 1C:
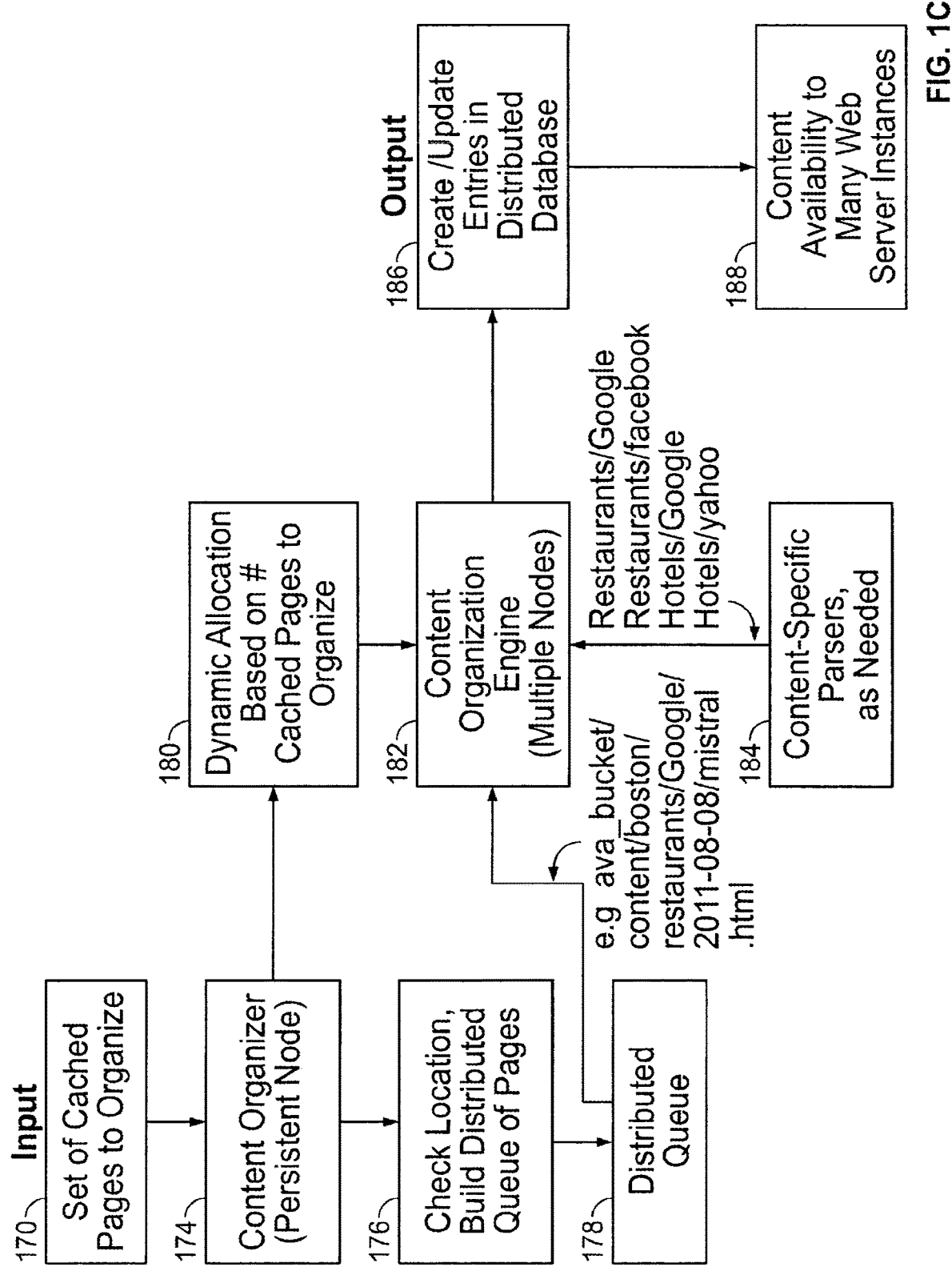
FIG. 1C is a diagram of a process flow executed by an exemplary content organization system.

Examples of content collection and content organization systems and process flows are shown in FIGS. 1B and 1C. FIG. 1B illustrates the process executed by the content collection system, which may include the crawl and parsing module 114. At box 150 the crawl and parsing module 114 identifies subject matter targets, such as rock-climbing, are needed in the neural network. The targets may also take the form of specific URLs or collections thereof. At box 152 the module 114 identifies the current content, in the form of previously collected web pages (or representations thereof), that already resides within the system's storage network. At step 154 the content collector, which in one embodiment takes the form of a persistent system network node, determines from a comparison and analysis of the two inputs which subject matter or URLs are to be gathered by the module 114. At box 156, the content collector verifies the addresses and content of the target sites containing the subject matter which is to be collected and creates a queue of items to be crawled and parsed by the module 114. As an example, the distributed queue's first entry might be [Boston, restaurants, google.com, 'all' which corresponds to a request that the crawler nodes collect all cached pages associated with google.com's reviews of any Boston area restaurant. The content collector may also dynamically allocate certain queue items to specific crawling nodes based on their relative priority (160). At step 162 the content collection engine, which includes a distributed array of crawler nodes, receives or accesses the distributed queue (158) and dynamically assigned collection commands from the content collector. The content collection engine, under the control of crawl and parsing module 114, collects cached web pages as discussed above. The output (164) is a library of cached web content which is parsed according to the methods described herein.

FIG. 1C shows an exemplary process executed by the content organizer, which may comprise the matrix builder 126. At step 174 the content organizer receives or accesses the library of cached pages (170) to be parsed and added to the network. The content organizer may be a persistent system network node in various embodiments. The content organizer may check location and build a distributed queue of pages (176). The content organization engine (see step 182) may include a distributed array of parsing nodes that accesses the distributed queue of parsing assignments (178) and receives assignments which are dynamically assigned (180), optionally to specific crawling nodes or crawling nodes having certain attributes such as bandwidth or throughput. The content organization engine also accesses an array of site-specific parsers (184) which are specially designed to parse data as it is presented on certain sites. For instance, because Google.com may present its hotel data in a format different than restaurants, a parser engine specific to Google's hotel pages is presented to the content organization engine for use in parsing corresponding cached web pages. Other examples, as shown in FIG. 1C include a parser specific to Facebook.com's venue or event pages. This architecture may facilitate modification of parser engines as sites alter the manner in which they present data. For example, Local.yahoo.com may alter the data format of its hotel pages, in response to which a single parser engine can be updated. The output (186) of the content organization engine (182) is used by the matrix builder 126 to create additional nodes and matrices of interrelationships as described herein. The resulting matrices and databases of web content are presented for simultaneous access by multiple instances of web servers (188) which present the user interface described below or which communicate with mobile device client applications as discussed herein.

Collection of User Data

Upon creation of an account or in response to another triggering event such as a request for a new recommendation the system 100 may require a user to input various data including gender, age, marital status, children ages, children gender, third parties with whom the user is socially networked, hobbies, interests, favorite venue information (in one or more venue categories), preferred or non-preferred reviewing entities (if any).

The user is then asked to list favorite or preferred venues. As an example, the user may list favorite restaurants. The system 100 asks for alternative favorites in the event the restaurant is not included within the neural network.

The system 100 optionally may crawl the web for additional information concerning the user and then parse and validate the data according to the methods described above. This supplemental data may be added to the user's profile, data from which will be used in various operations as set forth below.

Creating Nodal Interrelationships

Nodes in the data network represent venues, venue properties, users, user properties, reviewers, reviewer properties, and the like. Links or links represent relations between those nodes. The number of links between two items might therefore grow as data on two items grows. The strength of each link denotes the affinity between the two connected items, such as similarity of star rating (in a review of a venue), number of attributes held in common. Links can be either positive or negative in sign.

Figure 2:
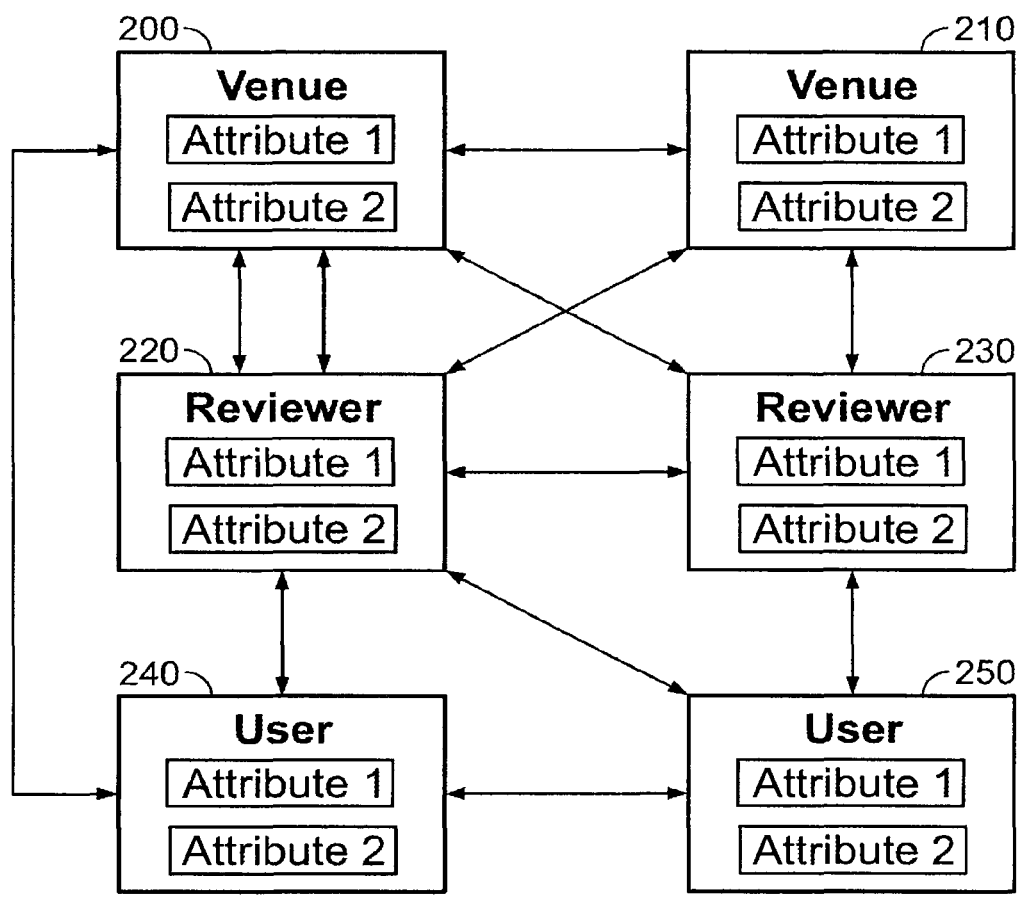
FIG. 2 is a diagram showing the interrelationships between venues, reviewers and users.

Links can be associated to designate affinity between and amongst, venues, properties of venues, users, reviewers, content sources, or any combination thereof. For instance, as shown in FIG. 2, two venues 200, 210 may be interrelated in that they have several attributes in common, namely that they are both Italian restaurants in the same neighborhood. Reviewers 220, 230 are related in that they likewise have multiple attributed in common. Users 240, 250 are likewise interrelated by shared attributes. Reviewer 220 is interrelated with both venues 200 and 210 in that Reviewer delivered a review to both venues and that in turn creates an additional relationship between venues 200 and 210 (namely, they were reviewed by the same reviewer. User 250 is related to both Reviewers 220 and 230 via shared attributes and User 240 is related only to Reviewer 220 via the shared attributes. Reviewers 220 and 230 are thus interrelated also in that they share attributes of User 240. User 240 is also directly linked to Venue 200 by virtue of the fact that the user has expressed an affinity for that specific venue. Reviewers 220 and 230 thus have a second order relationship with Venue 200 through User 240.

This data architecture permits links, or interrelationships, to be adjusted independently from one another. Links touching the same node can be adjusted for one partner node but not others. Links on the same node can be "scaled" together to maintain relative values of each of their partners while changing the overall drive/influence to that node.

In selected embodiments, subtractive or "anti-related" links can weaken relationships from one node onto another. Subtractive nodes also can be added to the network to normalize the total positive timbre of local nodes where the average link values are too strongly positive. Subtractive nodes also can serve to mediate competition between nodes to influence one another, as the strength of the link dictates the effect one node will have on the other. Subtractive nodes can help sharpen, or focus, the positive influence cast by a given node.

Links can in various implementations be sorted according to priority of influence over (or strength of link to) their downstream node. Links may interact and influence one another, where the addition of one changes the strength or presence of another, in a manner that is restricted or targeted to other links on the same node.

Links from reviewer nodes can be normalized based on how positive or negative they are. In other words, if a given reviewer is an "easy grader" his or her reviews may be lessened in magnitude to normalize the reviews to a statistic goal or mean. Links from reviewer nodes may also be normalized to lessen the influence of those links where, for instance, a reviewer has an extraordinarily high number of reviews (each of which creates a link) and thus that single reviewer's opinion would unduly influence the data network if not scaled appropriately. Conversely, the strength of a reviewer link may be scaled upwards based on measured or perceived effectiveness or accuracy of the reviewer. This may be executed, for instance, through rankings or ratings of reviewers or statistical feedback whereby accuracy or predictiveness of reviewers is measured.

Weighting or normalization may also be used to alter a link's strength based on the number of attributes held in common. For instance, the system 100 may be configured to give each additional link of a given type a linearly or exponentially decreasing affect, such as where a substantial number of interrelated reviewers given a venue a similar review. Links between nodes which are hyper-connected may likewise be scaled downward to reduce the effect that one of the two nodes has on the extended network. The converse—giving cumulative links escalating effect or increasing link strength for under-connected nodes—may also be implemented with the opposite effects.

Links may also be weighted based on the predictiveness of the reviewer. For instance, reviewers may be graded based on number of reviews, number of citations on other web sites, or ratings of reviewers on third party sites crawled by the system. The links created based on each reviewer's reviews may accordingly be scaled linearly or non-linearly according to the relative grade of the reviewer. Reviews provided by more highly rated reviewers may be assigned correspondingly higher values or strengths.

Reviewers may be weighted on a user-specific basis as well. For example, the neural network of links may be reweighted based on the fact that the user requesting a recommendation has affinities or attributes held in common with certain reviewers. Reviewers' ratings may be correspondingly weighted more heavily or more lightly in correspondence to the link between the user and the various reviewers.

Reviewers may optionally be pruned from the network if they have below a threshold level of relevance as measured by a corresponding grade or effectiveness. As noted elsewhere herein, the grades of reviewers may be based on ratings of reviewers at third party sites and/or feedback of users of the system 100 concerning agreement or disagreement with recommendations which were calculated in part based on a given reviewer's review. If a reviewer is pruned from the system, the remaining reviewer's weightings may be adjusted upwards to maintain normalization.

The links in the neural network may be bidirectional (as shown in the figures) or unidirectional. In certain circumstances, the predictiveness of a link may be asymmetrical or unidirectional. For example, it may be the case that almost everyone who likes restaurant A likes restaurant B, but very few who like restaurant B also like restaurant A. In that case the links associated with affinity for restaurant A may unidirectionally point to (be linked to) restaurant B but the converse would not be true—node B would not have a positive link to restaurant A based on this data point. For simplicity of illustration the figures address the simpler scenario wherein all data points are symmetrical but in various implementations some or all of the links are unidirectional or have asymmetric strengths (such as +1.5 in one direction and +0.5 or −0.5 in the other direction).

The data network may be refined based on an active feedback loop from concerning the effectiveness of the recommendations provided by the system 100. Links can be refined (in either direction) based on feedback for how effective the recommendation was. One measure of the effectiveness of the recommendation is whether funds were spent by the user based on the recommendation, which in turn might be measured via data provided by partners such as financial transaction card issuers. Another measure may be feedback provided by the user in response to a query or survey concerning the recommendation or venue in question. Yet another measure of recommendation effectiveness is a user's browsing behavior and the fact that the user left a positive review for the recommended venue on a third party site (which review is collected and parsed as set forth above). Still another technique to assess effectiveness of a recommendation is geographic dwell time at a physical location associated with a venue as measured by mobile device GPS data, for instance.

It should be noted that not only first order connections are updated based on feedback. Rather, in various implementations second and higher order connections are optionally updated based on feedback. For instance, when a reviewer's ranking or grade is updated the second order connection between two restaurants which are both liked by the reviewer is updated or correspondingly modified as well.

Mismatch between the recommendation and the user's evaluation can drive a reduction or weakening of the links between the associated nodes and the converse could also be executed. In response to positive feedback between a reviewer node's recommendation the links between that node and neighboring nodes may be strengthened. Similarly, links created by the reviewer's reviews may be assigned a greater strength.

The nodal structure facilitates computations and scaling of the network. As will be seen, the nodal network creates a natural look-up table that is convenient to search and operate over. The nodal structure with inter-node links of varying types provides a convenient way to update the structure as new pieces of information are added, and in certain embodiments this is executed without losing the original information as in traditional databases that represent affinity as single number weights between items. The data in various embodiments is represented as indexed rows of databases, linked lists, or distributed files.

The matrix of interrelationships or links can be broadly categorized as content-based interrelationships, collaborative interrelationships and content-collaborative interrelationships. The first type, content-based links, are in certain embodiments premised on venue attributes for multiple venues reviewed by same reviewer. The content-based links establish interrelationships between venues based on shared attributes. The strength of the link (or anti-link) is dependent on the number of things held in common, comparative ratings and other factors as described herein.

Collaborative venue interrelationships associate venues that are liked by same reviewer, often without any dependency or relation to the reason(s) why the reviewer likes the venue. The strength of the link (or anti-link) is dependent on reviewer rating, proximity on same list, and other factors described herein. Collaborative links arise when two venues co-occur, for example, in the same person's list of favorite or preferred venues, on the same "top 10" or other grouping lists on ranking or recommendation sites, or on the same search engine search results. Proximity within the list may be used as a variable to control link strength. Ant trails may also be used to create collaborative links by tracking people's surfing behavior and linking venues a given user often visits, independent of spiderwebbing. In this way, restaurant A may be deemed interrelated to museum B if many tracked users visit both of those sites. The user's dwell time at each site or the fact that a user left a rating or review may also factor into whether a link is created. In certain embodiments, this tracking is accomplished without the use of cookies, rather by collecting from the web data concerning the user's activities on rating and review sites according to the techniques described elsewhere herein.

Content-collaborative interrelationships or links arise from common (or anti-common) reviewer attributes for reviewers who liked (or disliked) the same venue. The venue attributes may be analyzed for common or anti-common features and links may be established between either a specific venue and reviewer attributes or between venue attributes and reviewer attributes. The strength of link may depend on the incidence of an attribute among reviewers giving venue a certain grade or similar comparative ratings.

The exemplary architecture illustrated in FIGS. 3-12 facilitates in certain embodiments dynamic updating and adapting of the network. For example, when a new restaurant or review is added to the network, those nodes each create first, second and higher order links which are added to the network. The affected links can be updated by a relatively computationally simple (and non-resource intensive) addition or other arithmetic operation and the neural network need not be substantially entirely recalculated or reformed.

Generating Recommendations

Either the system or users may trigger the recommendation engine. The users may do so by entering through a web portal, client application or electronic message a request that a recommendation be generated based on provided venue attributes such as type, geography or price. The system 100 may access a user profile to collect data from the user profile such as other venues liked, gender, profession, or age. The system 100 may also automatically generate recommendations for inclusion in electronic messages, such as text messages or email messages, sent to targeted users or for presentation on a web portal or client application accessed by users.

The recommendation engine responsively identifies the venues with strongest links according to the following protocols in selected embodiments. Based on the identified "liked venue(s)" the system 100 identifies the top N venues that have strongest link value to the identified venue and which have the specified venue attributes. Alternatively or in addition, based on highest rated venue(s) having specified attributes the system 100 identifies the top N venues that have strongest link value to that the identified venue. Still another alternative which can be used alone or in combination with the foregoing is to, based on the highest rates venue(s) having specified attributes and being recommended by friends or selected reviewers, identify the top N venues that have strongest link value to that the identified venue. The recommendation engine may also generate recommendations based on the user's attributes, for instance by identifying the top N venues that have strongest link to user attributes.

In certain embodiments, a plurality of these techniques are used and resulting venue recommendations are weighted based on empirical observations concerning the predictiveness or accuracy of each protocol. The weight factors may be simple coefficients or first, second or higher order equations.

In the case of recommendations provided for a group of users, these same techniques may be used but with the modification that the user attributes are selected to match the group, either by direct user input or by arithmetic blending or averaging the user attribute values to arrive at a composite group user profile.

Recommendations may also be provided based on real-time location information, such as that provided by smartphone GPS data. As described more fully below, the system 100 may send an electronic message or alert either including a recommendation based in part on the location and/or time or prompting the user to access an interface to receive the recommendation. For instance, if a user is known to be proximate to a theater shortly before a show which the recommendation engine ranks highly for that particular user the system 100 may generate an electronic alert to the user including the recommendation, a hyperlink to the system 100 web portal, or a link to active a client recommendation application which can launch the interface described herein.

Alerts or recommendations may be accompanied by, and be generated based on, promotional offers related to the venues. For instance, an electronic notification may contain a recommendation along with a promotional discount offer for the related potential booking or reservation. Recommendations presented in the interface (or via electronic messages) may also be selected based in part on promotional status. That is to say, the recommendation engine may strengthen links nodes associated with promotional offers and thus the engine will factor in promotional offers when determining nodes to recommend (i.e. those most strongly linked to nodes associated with the user or a recommendation request).

Users' feedback concerning recommended venues and the associated "take rates" may likewise be factored in by the recommendation engine. For example, the link strengths may be increased for venues for which users more frequently make reservations based on the recommendations, consistent with the techniques taught herein.

Example

FIGS. 3-12 illustrate one simplified implementation of the recommendation engine described herein. Those skilled in the art will understand that this example can be extended to incorporate any or all of the additional features described herein. Selected of these substitutions and extensions will be mentioned below and those explanations are not intended to be limiting.

FIG. 3 shows an exemplary matrix of reviewer ratings. Reviewer 1 has provided reviews for nine out of the twelve restaurants, the ratings spanning from one star to five, five being the highest. Reviewers 2-7 have likewise each provided ratings for a different subset of the twelve restaurants. In other embodiments the venues could be venues of different types, such as four restaurants, four night clubs and four theaters. The ratings may use a wider numerical or alphabetic scale, integer or non-integer.

FIG. 4 shows the corresponding matrix of attributes for the venues of FIG. 3. In this example each restaurant is in Boston, Mass. and the price varies on a ten point scale. Attire is assigned alphabetic codes (formal and casual), although numeric codes are used in certain embodiments. Zip codes are used as neighborhood values in this example. The hours of operations is assigned a code selected from a predetermined library of operational hours and in other embodiments the hours of operation is provided various fields, one for each day of the week.

FIG. 5 shows the reviewer attributes for Reviewers 1-7, as shown in FIG. 3. In this example, reviewer attributes are limited to gender, age, profession, education, marital status, number of children, number of reviews, and review accuracy. The codes may be selected from predetermined libraries. The number of reviews is based on the data collected as described above. The review accuracy may be calculated based on the feedback control data as discussed above. Alternatively, a composite reviewer grade may be used which optionally factors in number of reviews, citations of reviews on other sites, number sites hosting reviews and/or consistency of recommendation with positive user feedback.

FIG. 6 is a chart showing an array of user attributes for seven users. The methodology is similar to that set forth above for reviewers but additional or different data fields are used for the users. In this embodiment, each user is asked for four favorite venues. In other embodiments, a list of preferred venues in various different venue categories is included in the user profile. This user data, as noted above, may be input by each user and/or collected from web data sources in the manner set forth above.

FIG. 7A and FIG. 7B illustrate an array of content-based venue links based on the venue attributes of FIG. 4. Restaurant 4 has one link with Restaurant 2 associated with common attire. The value of the link, +0.25, is less than the other links such that it has a lesser impact on the recommendation, as will be seen. In other words, the link is relatively weak. Restaurant 4 has three links with Restaurant 1, +1.25 associated with the common neighborhood, +1 based on the common genre and +0.25 based on the same attire. The net value of the content-based links between links Restaurant 4 and Restaurant 1 is +2.50. This matrix could optionally include links associated with a plurality of additional venue attributes and could also include anti-links, or negative links, associated with anti-common properties as will be illustrated in connection with FIG. 8.

FIG. 8A and FIG. 8B illustrate a matrix of collaborative venue links based on the reviews set forth in FIG. 3. Taking as an example the association between Restaurant 7 and Restaurant 3, there is a +1 link associated with the fact that Reviewer 2 rated both of these restaurants as four star. Restaurants 6 and 7 are given a stronger positive link based on common positive reviews because Reviewer 3 rated both restaurants as five star. Returning to the link between Restaurant 7 and 3, an anti-link of −0.75 is assigned based on the opposite affinity for these restaurants expressed by Reviewer 1 (who gave the Restaurant 3 four stars and Restaurant 7 one star). A higher negative magnitude could be used where a review rated restaurants in a more strongly opposite manner (i.e. one star and five star) as shown in the link between Restaurant 11 and Restaurant 5. There a −1.00 anti-link is shown based on the one star/five star ratings of Reviewer 5. As noted above, a greater array of different links could be assigned based on commonalities or anti-commonalities— these are merely representative. A matrix of content-collaborative interrelationships (not shown) may reflect links arising from common or anti-common features between each venue and each reviewer. For example, reviewers may have a characteristic called "genre affinity" and when that matches the venue genre a link of predetermined strength may be created. Additionally, the content-collaborative matrix may show links between affinity for a venue and reviewer attributes. In that example, common attributes among reviewers who rated a venue highly are linked to the venue. For instance, reviewers aged 31-35 may disproportionately rate a venue poorly, in which case an anti-link is created between the venue and the reviewer attribute "age 31-35."

FIG. 9 shows illustrative outputs of the recommendation engine based on a query for a recommendation for an American restaurant and a user affinity for Restaurant 7 (taken from the subject user's profile of FIG. 6). In other embodiments more inputs may be used, such as venue attributes and other preferred venues. In this example the recommendation is a blending of the content-based link strength 901, collaborative link strength 903, and content-collaborative link strength 905. Each link strength is assigned a distinct weighting factor 902, 904, 906, although in other embodiments the blending equation is a second order or higher order equation rather than a first order sum of products. The values in the "Restaurant 3" row in FIG. 9 derive from the fact that Restaurant 3 and Restaurant 7 have no link shown in FIG. 7. The same is true for Restaurant 6/7, while Restaurants 9/7 and 12/7 show a +0.25 link. Similarly, the matrix in FIG. 9 shows the cumulative link strengths in column 907 for restaurant links 3/7, 6/7, 9/7 and 12/7, respectively. The content-collaborative link strengths are based on the content-collaborative link matrix (not shown). The weighting factors 902, 904, 906 are constant but may be set to vary according to the predictiveness or accuracy of each type of link (based on feedback control as discussed above). The resulting recommendation values reflect the overall link strength 907 between each restaurant and restaurant 7 as shown above. Second order relationships could also be included in the link matrices used to calculate overall link strength. For example, Restaurant 8 is liked by both Reviewer 4 and Reviewer 5. Those reviewers, in turn, both like Restaurant 5. Restaurant 5 could be assigned a direct +0.25 link to Restaurant 8 based on this second order relationship. That link could operate in the matrix independently of the nodes associated with Reviewer 4 or Reviewer 5.

An alternative form of second order relationship is shown in FIG. 10. FIG. 10 illustrates second order links arising, from collaborative venue links. As shown in FIG. 8, Restaurant 8 is positively linked to both Restaurant 3 and Restaurant 5, so a +0.25 link is created directly between Restaurants 3 and 5. Restaurants 12 and 7 are both negatively linked to Restaurant 8 so a +0.15 link is created to reflect the belief that this anti-link is weaker than the positive link previously mentioned. In a similar vein, an even weaker second order link is established between Restaurants 11 and 12 because while both are negatively linked to Restaurant 8 the links are substantially different in magnitude.

These second order relationships can be added directly to the related matrices or otherwise computationally combined when calculating overall link strength between two nodes.

FIG. 11 shows an arbitrary set of link values in a more complex system that factors in a wider variety of links (such as second order links) across the same nodes. It can be seen that the values are strongly positive and few values are negative. This can be observed where the data has a skew associated with reviewer tendency to give generous ratings, for instance. If the data of FIG. 11 is content based it may have a skew different than parallel matrices for collaborative links or content-collaborative links. Accordingly, it may be useful to normalize the data of FIG. 11 to facilitate computational combination with links in the other matrices.

FIG. 12 shows the data after an exemplary correction operation. In this example, a constant value of five was subtracted from all data points. In other embodiments, the value subtracted may be selected such that the data set hits a common or desired mean or median.

In other embodiments normalization is accomplished by multiplication or division. For example, a certain percentage may be subtracted like a tax from affected links by multiplying the link strengths by (1–X), wherein X is a tax rate from 0 to 1. The tax rates in this approach may be progressive to accommodate the tendency of users and reviewers to aggregate toward a small number of more popular venues, which as discussed herein can cause those venues to cast too large a shadow or have an undue influence on the remainder of the neural network.

It should be noted that normalization can occur at local level or at the network level. At the local level, all links connected to certain nodes may be normalized or all links coming to or going from a certain node may be normalized (recalling that links may be unidirectional or asymmetric). Alternatively, normalization may occur at the data matrix level. For example, content-based link matrices may be normalized or other data subsets of network may be normalized.

FIG. 13 shows another form of higher order connection, connection creep. In this example the link between Restaurant 10 and Restaurant 1 in FIG. 12 is considered too high in that it might have an undue influence on the connected nodes. Accordingly, 1.5 of link strength is subtracted from link 10/1 and 0.5 is added to the less strongly positive links 10/2, 10/7 and 10/8. No portion of link 10/1's strength is reassigned to link 10/9 because it is already above a predetermined threshold above which links are not to have connection creep bonuses added or above which no higher order links should be added.

User Interface

Figure 14:
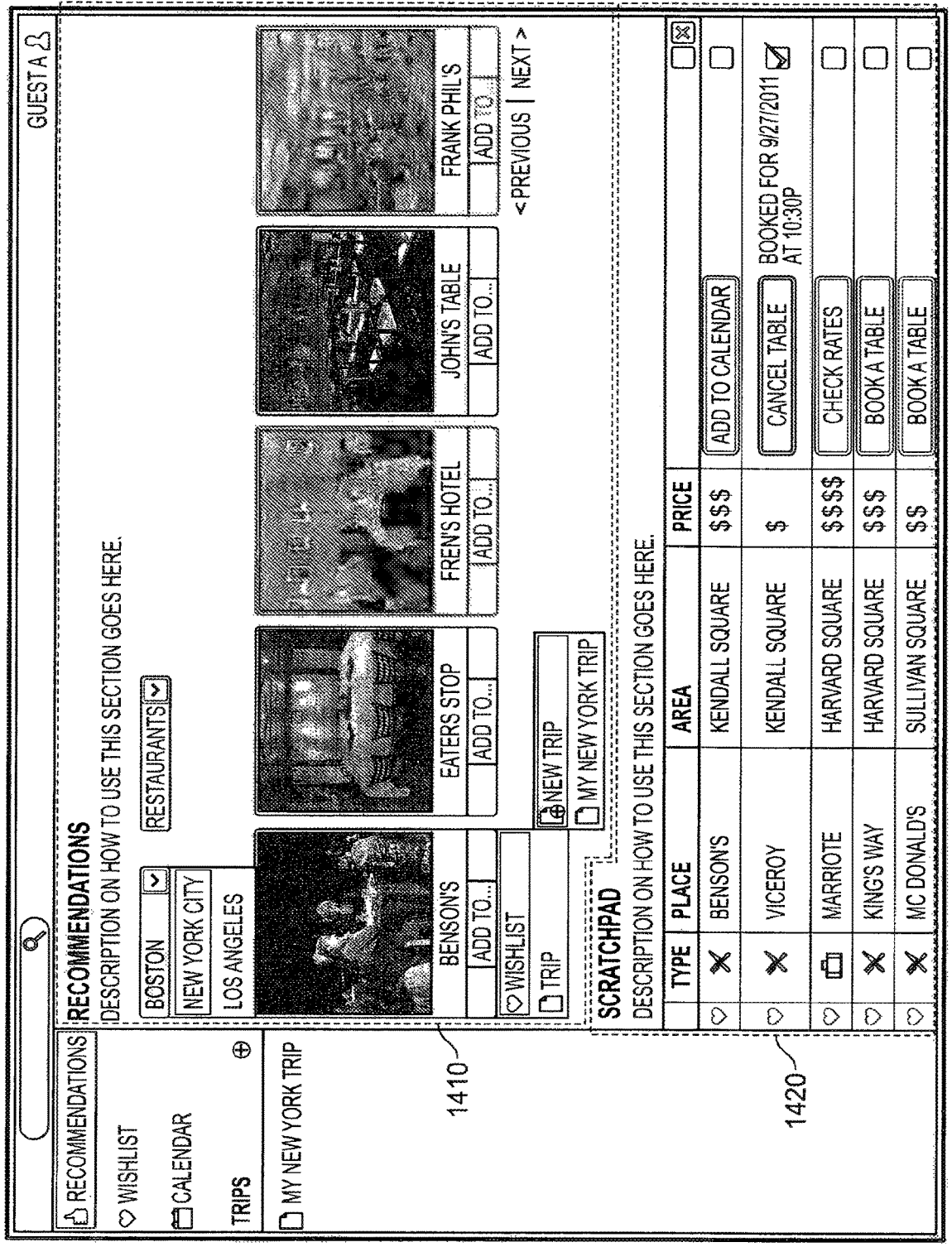
FIG. 14 is a user interface according to one example.

FIG. 14 is an exemplary user interface for deployment at a web portal or client device such as a desktop computer, smart phone, tablet PC, automotive multimedia interface or other mobile computing device. The server or local application provides an evolving personalized brand logo and personalized audio soundtrack to match the displayed itinerary. The sound track may persist and "travel" with the user as he or she navigates different functionalities or pages through the interface. The interface is also designed to provide bio-visual data feedback to the user. The system permits users to state their goals and intentions based on the feedback they have received from the system.

FIG. 14 is an overview page that provides users with an immediate perspective on options, a space for collection/comparison/pre-screening/deliberation, and the ability to immediately act. Specifically, the overview page has three distinct sections and functionalities.

First, at the recommendation panel 1410, a plurality of recommendations are presented. In preferred embodiments, there are five recommendations provided as shown in FIG. 14. In other embodiments, two to seven, three to six, four to six, four to eight, four to nine, or two to ten recommendations are provided. The number of recommendations may be on a per-venue basis so that five recommendations are provided for restaurants and a like number of hotels are recommended. Alternatively, a lesser number of complementary venue (e.g. hotel) recommendations are provided.

Second, the collection and comparison panel 1420 provides a place to compare and contrast recommendations of interest. The panel provides venue genre or type, the venue name, geographic area, and price. The panel also provides buttons to book a reservation or check availabilities or rates for the various venues. Buttons for adding the event to the Ava calendar (discussed below) are optionally provided adjacent each venue. Also provided are status identifiers indicating the current state of activities and/or bookings for each venue. Optionally, buttons may be provided to launch a window or image that depicts the venue on a map.

Third, the calendar panel (not shown) will feed or import a view of the user's personal Ava calendar and provide interactivity for immediate assessment of the user's schedule and available times. The calendar permits import of the user's other appointments and export of the Ava calendar items to any third party calendar systems such as Outlook, Google, and iCal.

These three panels are arranged down the page so that decision-making flows down the page from menu of options (top), to deliberation and comparison (middle), to arriving at a decision, and finally to scheduling/booking/publishing/sharing/taking action (bottom). This arrangement may in certain embodiments facilitate decision-making.

A user can directly book a recommendation at any of these three stages, or add to calendar at either of the first two stages. This arrangement may in certain embodiments enhance the likelihood that a user makes reservation or booking based on the recommendations.

Additional optional functionalities (not shown) include a transportation reservation interface. For example, the interface may present a transportation button that launches a booking or reservation portal which communicates with a third party transportation provider, such as a taxi service, and makes a reservation corresponding to a restaurant or other reservation. The interface may also permit the arrangement of transportation services between and amongst a plurality of other recommended events spanning one or more days.

In similar vein, booking functionality may be provided for a variety of complementary venues, services or activities. Examples include hotel rooms, airline reservations, movie tickets, theater tickets, museum tickets, music tickets, sporting events, product delivery (such as flowers or flowers), real estate services, or moving services (such as inter-city packing and transportation services).

The interface may selectively suggest alternative actions or venues based on a first booked venue or action. For instance, the booking of a restaurant reservation may prompt the generation of night club or theater recommendations. As another example, the booking of a real estate tour through a real estate agency may prompt a recommendation for moving services. Subsequent bookings may in turn generate additional recommendations complementary to the most recent booking, the earlier booking, or both.

These follow-on recommendations may be filtered and selected according to the techniques set forth above. In particular, the recommendations may be function of the user's profile, attributes, venue preferences, past booking behavior and/or previous feedback concerning certain venues. For instance, the recommendations may be filtered as set forth above according to the user's most recent reservations and the user's expressed preferences for given venues that are linked to potential secondary or tertiary recommendations.

Recommendations may also be provided based on real-time location information, such as that provided by smartphone GPS data. The system 100 may send an electronic message or alert either including a recommendation based in part on the location and/or time or prompting the user to access an interface to receive the recommendation. For instance, if a user is known to be proximate to a theater shortly before a show which the recommendation engine ranks highly for that particular user the system 100 may generate an electronic alert to the user including the recommendation, a hyperlink to the system web portal, or a link to activate a client recommendation application which can launch the interface described herein.

Alerts or recommendations may be accompanied by, and be generated based on, promotional offers related to the venues. For instance, an electronic notification may contain a recommendation along with a promotional discount offer for the related potential booking or reservation. Recommendations presented in the interface (or via electronic messages) may also be selected based in part on promotional status. That is to say, the recommendation engine may strengthen links nodes associated with promotional offers and thus the engine will factor in promotional offers when determining nodes to recommend (i.e. those most strongly linked to nodes associated with the user or a recommendation request).

Users' feedback concerning recommended venues and the associated "take rates" may likewise be factored in by the recommendation engine. For example, the link strengths may be increased for venues for which users more frequently make reservations based on the recommendations, consistent with the techniques taught herein.

Users may be provided a profile page or "my account" page that provides analytics on that data and any other data collected or contributed to provide perspective and insight into behavior. The page provides a feedback mechanism to the user that is "habit honing" in that analytics on self activity is provided in a visual format. For example, the page may present graphical trends of actions within customizable goal categories such as health (gym, yoga), family (museums, travel, dining), and errands (dentist, mechanic, groceries). Based on user defined goals, the overview page suggestions can be featured to highlight relevant activities to fill existing calendar time-slots.

The interface may also provide other prompts to facilitate action and hone habits. For example, the interface may provide cues and triggers embedded in mobile device applications to cue initiation of plans and transitions between scheduled events. For instance, the mobile client application may trigger chimes upon next scheduled event, music to reduce anxiety surrounding errands, tailored music transitions upon the occurrence of the next scheduled event, or visual (blinking LED) cues upon next scheduled events.

The interfaces described herein may be presented, as noted, through a variety of devices. Still additional devices are contemplated, including television screens, third party websites (through partnerships), in-store kiosks, or personal keychains or dongles.

Merchant Interface

The venues are operated by third parties which may comprise merchants such as restaurant owners, airlines, or hotel operators. The system 100 may be configured to provide merchants a visualization of users' behavior. For instance, merchants may be provided access to ant trail data patterns, including in real time. Merchants can "interact" with these patterns and request the system 100 to inject disruptive content such as promotional offers related to a user's present location and expressed preferences.

Merchants may also be provided anonymized profiles of the likes and dislikes of their customers (i.e. users who patronize their establishment). This can include reviews provided by reviewers and users who provide feedback (who also constitute reviewers).

Illustrative Implementation

One illustrative system implementation consistent with the foregoing teachings is discussed below. The discussion is generally organized into four sections: content collection, content organization, personalization and user interface.

The purpose of the Content Collection system is to perform 3 steps: 1) identify "objects" (venues, events, and other instances of interest to the user), 2) find/match electronic pages with deep information on those objects (object characteristics, reviews, associations with other objects), and 3) retrieve pages into the storage system.

The objects to be retrieved in this example constitute any set of web pages based on objects of interest. The objects may be selected based on category, filters for a particular category and the content sources that are targeted.

This type of retrieval can in turn be broken up into several Content Modes. Content Mode 1 is called "Global Grab." In this mode, the system seeks to identify and retrieve information on every object in a category (e.g., "all restaurants in San Diego"). In Content Mode 2, Keeping Current, the system seeks to focus the collection on either i) refreshing stale information on old objects, or ii) identifying new objects that just arose for old categories. In Content Mode 3, known as Intelligent Browsing, the system seeks to have the data search update itself dynamically based on its real-time discoveries, to "zoom in" and focus on specific trends and objects.

One type of Global Grab is spidering. This is a conventional method used by Internet search engines according to which the system downloads: the page of a content provider's site, scans that page for links to other pages on the site, and then downloads those pages. By repeating this process an entire site can be covered. The system can also implement paginated searches in which the system actively seeks, for example, page 1 of a term like "Restaurants," then page 2, and so on.

A second type of Global Grab is crawling. Sometimes it is desirable not to have to get pages directly from a content site, such as where the site blocks automated indexing. In this case one can replicate the structure of a site from the cache of a search engine, which crawl and cache every page as a "second copy" of the internet. Here, the system uses a search engine to search for the URL of interest. Usually, the URL will be included in the first result, along with a "Cached Page" link to the cached copy of the page. The system can then download the link listed in the "Cached Page," which is the same as the original page. The system can then scan that page for links to other pages on the site, and repeat the process for those pages.

A third type of Global Grab involves getting a list of all objects and then finding them within a site. This is a method designed to be more holistic than spidering, to ensure that every single object of a category is retrieved from a given site if available. First, a complete list of target objects is created, such as by crawling an Internet directory like Yellowpages.com for "restaurants in San Diego." Then the system will have the complete list of objects for which data is desired. The next step is to search for each of these objects in turn in a search engine, restricting the search to the pages from the target website. Different combinations of data extracted from the internet directory can be used to seed the search query, and usually the business name, metro name, and phone number are useful ways to lock onto the object on the target site.

The search engine will retrieve pages that match these search query parameters on the target site of interest. Usually one of the first few pages in the results is the correct match. By repeating this search engine and retrieval process for every object in the Internet directory, the system is likely to build a complete replica of the target site's data on that category.

A fourth type of Global Grab involves third-party crawlers. It is contemplated that third party services will crawl the web and make the results of those crawls available for purchase. In this case, the first step of the global grab methodology is simplified because the system can query the service for every page arising from a certain set of websites. If such third party services also make the pages available for retrieval then the speed of the crawl is increased.

Turning to Content Mode 2, Keeping Current, it is assumed that the system has completed a global grab and has data on all objects for a given category. The task then becomes staying current, or up to date, with the objects as their data changes. New objects can be introduced, such as when restaurants open. Old objects can become outdated, such as when restaurants close. Data on objects can change, such as if the hours of operation or menu items change. New and old objects can be identified by doing a crawl on global directories (which is fast) and then focusing in on any changes to the list of objects. Alternatively, the system can discard old data and then run a new global grab. Finally, the system can rely on "update notifications" which can be acquired in several forms: I) some websites focus on these changes, such as "listings of new restaurants" in local papers, ii) many content provider APIs will notify of openings and closings of sites, iii) URLs and webpage titles will often receive a "CLOSED" stamp which can be rapidly screened. Each datum collected by the system is tagged with an expiration date, based on the type of the data (events expire immediately, restaurants may need to be refreshed every few months to check for major changes). Data that has expired can have associated pages re-retrieved for freshness. The re-retrieval process is simplified because the URL is already known.

Content Mode 3, Intelligent Coordinated Retrieval, involves "eating nodes," or retrieval computers, that can coordinate their searches based on real-time events to optimize content gathering in response to mass user behavior. In this implementation the retrieval computers are given "write" access to the retrieval queue. If the retrieval computers identify a trend that is similar to their original target, but stronger, the retrieval computers can recruit other computers to look more deeply at this phenomenon by writing the new target (or a set of targets within a target area) onto the retrieval queue. Retrieval computers can also interact intelligently in the collection process by alerting each other if a lead turns out to be faulty, and is indicative of more faulty leads (for example, if a region of a site is covered with spam or stale data). In this case, the retrieval computer(s) can scan the queue and delete similar jots on the queue so that future computers don't devote resources to exploration of a lower value target area. In this way, different search nodes again inform one another about what they learn by virtue of the shared queue to help guide their collective search, Turning next to matching objects to content pages, whenever the system is gathering data from target websites on an object of interest, the system should ensure that the data on the target site is actually referring to the object of interest. This is especially true when attempting to cross-reference objects across different sites. The system optionally utilizes a "likelihood of match" score to make this determination, taking into account multiple variables. For example, if the system is trying to match a venue on two different sites, the fact that they have the same phone number or address may tend to indicate that they are the same venue. Numeric identifiers on consistent scales are particularly valuable for this purpose, such as phone numbers, UPC symbols, and latitude/longitude. Non-numeric identifiers (strings) such as addresses can also be used, and one can check the similarity of the two sites' addresses by taking a Hamming distance on the characters, or parsing, out each one's street number, street name, etc.

Data is cross-referenced across multiple sites by using data from one site to choose objects to find on another site, then use the steps discussed above to find new content pages from those objects on a different site.

A fleet of retrieval computers may be created by building each from scratch programmatically. Each computer is resurrected from a disk image, such as an Amazon Machine Image (AMI). The AMI is loaded as an elastic computing node on Amazon's EC2 (elastic cloud computing) or other service using standard libraries written in Java. The AMI is armed with everything that the computer will need, including a Java runtime environment, the capacity to communicate with a central version control repository such as Git, etc. The AMI is also armed with a startup script that runs when the EC2 node is born, and receives user parameters passed to the EC2 node at birth. The user parameters to the startup script tell it where to download the latest code instructions for the node, such as the URL of an S3 location, or the URL of a Git repository. The startup script is armed with the credentials to access the latest code instructions, and load the code onto the new EC2 node. Every EC2 node in the fleet downloads similar instructions, so they are all prepped around a common task. These instructions tell it how to connect to the message queue with the URLs to retrieve, and also how to go about the retrieval process. Each one then launches the downloaded code (runs the JAR file, etc) and thus begins working. Finally, each computer in the fleet is assigned its own IP address (via Amazon's Elastic IP system, etc) so that they can be throttled by content sites independently from the other nodes and work in parallel.

Tasks are distributed amongst the fleet of retrieval computers by using a list of URLs (usually long, millions) of pages that the system wants to retrieve. This list might be a text file, database table, or other simple serial storage system. The goal is to distribute those URLs among the many computers. This process is best implemented through a queue service that lives independently from all the retrieval computers. As an example, Amazon offers the Simple Queuing Service (SQS) in which every URL is stored as a string message on the queue. Thus, the queue retains a memory of which URLs still are to be crawled. Each computer in the fleet can query the queue for the next item to be crawled. The queue then assigns the item to a particular retrieval computer, and marks the item as "locked" so that other retrieval computers do not also try to work on the item. Meanwhile, the system monitors whether the retrieval computer completes the task in a timely manner. If the retrieval computer does not check back with the queue to say that the job is done, then the queue restores the item to "unlocked" so that other computers can perform the task. Once a computer checks back with the queue and informs it that the task has been completed the queue removes the item from the queue. Thus, a workflow is established that can be shared between an arbitrary number of retrieval computers where they can operate simultaneously to work through a list of retrieval tasks.

Pages are retrieved by all computers in the fleet. Each retrieval computer is already armed with a URL to retrieve by taking the message from the messaging queue. The computer then executes a function to stream the contents of the remote file (webpage, etc) into memory (in PHP, fileget_contents; in Java, urLopenStream( ); etc). The computer then saves this file to the global storage system (see below). With respect to rate of repetition, it should be noted that no single computer hits a given content source too rapidly. Therefore, each computer is "throttled" to only complete one page request every 0.1-10 seconds. The use of third party crawlers, discussed above, may obviate the need to throttle in this manner. Every page request is checked to determine if it succeeded, and if failure occurs, a longer interval is used before the next attempt. The system can implement different schedules for the interval rollback, such as an exponential rollback.

The global storage system may be a distributed storage platform (Amazon S3, etc). In the case of Amazon S3, data is stored in buckets that are accessible from any computer as a URL. Each retrieval computer stores the contents of the retrieved file in a repository folder on S3 (or other service) as a file path string which is also URL. The file can thus be retrieved at a later date by entering the storage system URL. Access to these repository folders are private so that they can only be accessed by the system's Content Collection and Content Organization systems.

Turning now to content organization, the aim is to take content collected from the Internet and organize it for access through the Interface. The input may be a hard drive directory of the latest set of collected web pages. The output may be the data uploaded to a large-scale (but highly organized) database. The output may be generated by repeating the following process: 1) find a page, 2) parse the page for info, 3) match the page to an object in the database, and 4) update the database.

Another computer fleet may be deployed to organize the content. As noted above in the case of retrieval computers, content organization computers may be replicated by building them from scratch programmatically. Each computer is resurrected from a disk image, such as an Amazon Machine Image (AMI). The AMI is loaded as an elastic computing node on Amazon's EC2 (elastic cloud computing) or other service using standard libraries written in Java. The AMI is armed with everything that the computer will need, including a Java runtime environment, the capacity to communicate with a central version control repository such as Git, etc. The AMI is also armed with a startup script that runs when the EC2 node is born, and receives user parameters passed to the EC2 node at birth. The user parameters to the startup script tell it where to download the latest code instructions for the node, such as the URL of an S3 location, or the URL of a Git repository. The startup script is armed with the credentials to access the latest code instructions, and load the code onto the new EC2 node. Every EC2 node in the fleet downloads similar instructions, so they are all prepped around a common task.

Every computer in the Content Organization fleet receives 2 pieces of information (which it is programmed to seek out using in its boot instructions): 1) the storage space location of the code instructions to be its brain, 2) the location address of the job queue where it will receive the material to be processed. The system controls the Content Organization fleet by creating, and managing the content organization process. The system defines the storage directory of all the pages that need to be organized. The system thus turns this directory into a list of jobs, where each job is a file to be processed. The system then creates a task queue (see below), loads that queue up with the tasks, and sets the properties of the queue to determine the time allotted for task completion before tasks are recalled and given to other computers.

The task queue may be implemented using Amazon Simple Queue Service (SOS) or some other service that is external to individual computers. The system loads up the job queue with a list of pages that need to be organized. Each item in the queue is a URL address in global storage space to a page that needs to be organized. The goal is to distribute those URLs among the many computers. The queue allows computers to take URLs, and retains a memory of which URLs still must be organized. Each computer in the fleet can query the queue for the next item to be crawled. The queue then assigns the item to the computer, and marks the item as "locked" so that other computers do not also try to work on the item. Meanwhile, the system monitors the queue to determine whether the computer completes the task in a timely manner. If the computer does not indicate to the queue that the task is done within the allotted time the queue restores the item to "unlocked" so that other computers can take the task. Once a computer checks back with the queue to say that it has completed the task, the queue removes the task from the queue. Thus, a workflow is established that can be shared between an arbitrary number of computers where they can operate simultaneously to work through a list of retrieval tasks.

The global storage system for the Content Collection fleet may be a distributed storage platform (Amazon S3, etc.). In the case of Amazon S3, data is stored in buckets that are accessible from any computer as a URL. Each retrieval computer stores the contents of the retrieved file in a repository folder on S3 (or other service) as a filepath string which is also URL. The file can thus be retrieved at a later date by entering the storage system URL. Access to these repository folders is restricted so that they can only be accessed by the system's Content Collection, and Content Organization systems.

The system may utilize the following global structure for document namespaces: date_retrieved/data_format/content_provider/city/category. For example: 2011-07-07/xml/google/boston/restaurants/. However, depending on the source of the crawl, the raw data files may not even be organized into this directory structure yet. In this case the crawl results should be sorted into files that are organized according to this structure.

To sorting raw crawl results, the system first inspects all the files retrieved during Content Collection and sort them according to the objects that they represent. One way to do so is inspect the URL of the crawl. The URL will disclose the content provider, the city/metro area, and category. For sites where this cannot be computed from the URL, the data can be extracted from elsewhere in the file (address field, etc.) The date of the crawl can be retrieved from the stored file's metadata. The crawl result file (or part of the crawl result file) that applies to the extracted object can then be saved in the directory structure described above. In this manner, all of the raw crawl results are placed in an organized directory structure to facilitate the subsequent organization to the database.

The queue is loaded by accessing the storage system directory where the sorted documents are located (see above). The system then spiders this directory to uncover the list of all files within that directory and its sub-directories. The system then creates a job queue (described above) to hold the list of files to parse. Next, the system uploads to the queue a list of file locations (URLs to the files), as an array of messages, to the queue. At this point the queue is loaded with a set of files to be parsed and organized.

Every time a computer in the fleet goes to the queue and retrieves a sorted page to organize, it first analyzes the following information from the URL: the "data format", which determines how to read the file's data; the "content provider", which determines which page parser to apply; and the "category", which determines what type of object to extract. The computer already has in its memory all of the different parsers that it downloaded when it was deployed. The computer picks one out based on the content provider and data format, and runs it on the file. Input is the file itself and the output is a data object in memory with values extracted from the file and stored in fields.

Every time a computer parses a file and stores its data object in memory, the data is next added to the database. First, the computer has to identify the object's location in the database. This is accomplished by selecting the database table (in Amazon, a domain) based on the category of the object, and locating the row of the object by using, in descending order: i) the unique id of the object from the content provider (for example, restaurant id on local.yahoo.com), ii) another unique numerical identifier, such as the phone number, and iii) name, address, and latitude/longitude fuzzy matching. If the determined entry does not already exist, the computer creates a new row. The computer then runs an update on that row, updating every attribute (field) in a single database hit for efficiency. This is repeated for every sorted page that the computers come across in the queue, until all of the sorted pages have been organized into the database.

Next, the system personalizes the content by generating a neural network architecture that connects objects in the world as nodes within a network. The system activates a subset of the nodes based on what is known about the user's affinities. The activations are followed through the network to deduce what else the user will like.

The neural network may be implemented as follows. Connections TO a node a stored as a list of {N1, W1, N2, W2, . . . } where the connected nodes N are paired with their weights W. This list is saved in the database in the same row as the other properties of the node. Optionally, a list of connections FROM the node can also be stored. Subsets of nodes to be activated are identified by user-provided data regarding likes and dislikes. Users may be required to answer regarding their "favorites" in different categories. Users may also provide feedback on recommendations that they are given, which can be either binary (approve or disapprove) or they can be continuous (e.g., 1 to 10, or −10 to 10). The system assembles a list of "positive activation nodes" and assign an activation level, which were either favorites (e.g., 10× activation) or feedback-driven (e.g., 1-10× activation). Similarly, the system assembles a list of "negative activation nodes" and assigns an activation level (e.g., −1× to −10×).

Connections are established by, for every node in the user's list, accessing in the database the set of common co-occurrences with that object on the web. The system retrieves this list of objects and builds connections from our node to those objects with five positive synapses each.

Connections also may be based on feature similarity. For every node in the user's list, the system identifies nodes with similar properties. For the category to be matched, the system takes the most salient properties (e.g., for a restaurant, price, cuisine and ambiance) and searches the database for other restaurants that match that feature set. Each match generates two positive synapses.

Connections also may be established based on cross-visitation. For every node in the user's list, the system identifies nodes that have been cross-visited by other users. These users can be users of the system (e.g., users of a subscription service associated with the system) or activity elsewhere on the Internet about which the system has data. This may be accomplished by indexing the reviews and responses to all nodes. The system identifies strong responses to the node of interest, identifies the users that furnished those responses, and identifies other nodes to which those users had similarly strong responses. The system can connect those nodes to our node of interest, with one positive synapse for every similar response.

Negative synapses can facilitate the recommendation process by factoring in what the user does not like and the things that are not like things that the user does like. Both of these associates involve negative synapses, which add richness to the representation. For example, the system can identify strong responses to the node of interest, identify users that made those responses, and identify other nodes to which those users had opposite strong responses. Alternatively, the system can identify nodes that the user did not like, identify other people who did not like that node, identify nodes that those people did like and positively link those nodes to our user's preferences.

Sometimes the network may exhibit "runaway connectivity" where something gets more connected, which then gives it an advantage in getting further connected (e.g., more co-occurrences) which in turn tends to generate even further connections. Therefore the system may normalize connectivity by inspecting the list of existing connections to a node, determining their total value (e.g., #connections N×average weight W), and in the event that total value exceeds some threshold, divide all of the connection weights by a constant value to bring them back into range. This may be repeated for all nodes. Normalization alternatively can be accomplished by dividing based on the N*W term going TO the node, dividing based on the N*W term coming FROM the node, dividing by the total N*W term across the network. The implementation for this may involve reading the list of node weights in the database, performing the normalization on those weights, and writing the new weights back to the database.

The addition of a new synapse connecting nodes can also immediately impact other connections. Upon adding the connection to the list, the other connections to that node can be "taxed" by an amount equal to the inverse of their proportion of the new connection's strength—that is, adding a +1 synapse then taxes the other 10 synapses already on that node by 1/10=0.1. When synapses become so weak that they are below a certain threshold (either through interaction taxing or through normalization), then they are removed (deleted from the list).

Connections from node to node can be constantly analyzed, updated and consolidated to take into account patterns that emerge between nodes. As a simple example, if A forms a strong link to B, and A forms a strong link to C, then a connection can be consolidated linking B and C. Such patterns can be searched for using specialized scripts that check the database entries for such patterns, and then write back consolidation changes to the affected nodes' lists.

The result of all of these processes is a rich information base that accurately links a huge variety of nodes to a user's established nodes of interest, with a significant dynamic range, and with substantial retrieval efficiency.

To retrieve the list of nodes related to a user, the system need only then "activate" the user's established nodes, and follow their connections to retrieve more nodes that if connected sufficiently strongly will also activate, and depending on the initial activation strength follow those connections to further nodes until the activation peters out with each connection hop depending on the connection strength. The connection strength is therefore the inverse of the resistance to the propagation of the activation through the network.

The total list of nodes that was effectively activated by this process (recommendation set) can then be stored in a list that is linked to the user in the database, for retrieval with a single database call whereupon the list can be cross-referenced against a set of presented results. Optionally, different sub-lists can be stored for different categories, or different presentation scenarios, caching the results for fast personalization.

The user interface may comprise i) a set of HTML files that define the look and feel of the web interface, with design elements styled using cascading style sheets (CSS), ii) a server-side set of scripts that dynamically generate those HTML files using a backend scripting language (PHP, etc) running on a web server (Apache, etc.), iii) a client-side set of scripts and interface libraries that allows rich user interaction within the browser (Javascript, j Query, etc.), and iv) a backend database that provides the data to the web application (Amazon SimpleDB, etc.).

The functionality of the user interface includes permitting the user to create an account and log in using secure credentials that are verified against an encrypted user table in our backend database. The interface also allows a user to browse objects and see whether they are recommended or not. The interface allows a user to filter those objects by city, by category, and then by a host of properties pertinent to those categories. The user can enter feedback on their recommendations by clicking on thumbs up/thumbs down or other feedback mechanisms. The interface allows a user to drag and drop recommendations onto a "being considered" area where they can be compared across different parameters using sortable headers, etc. The interface allows a user to drag an object onto their calendar in order to "action" it by going to the object at a certain time. The interface allows a user to build events, such as "My New York City Trip" where the user can create a group of restaurants, hotels, and other opportunities that have been recommended. The user can enter notes about their recommendations to remind themselves of various impressions, for example. The user can print out a copy of itineraries for their events, or email those itineraries to themselves. Their calendar is also synchronized with the global calendar on their smart phones, etc. The user can share their recommendations with others, or build events and share those with others.

The interface may be delivered via a scalable cloud architecture. Web servers run as Linux CPU nodes on Amazon's elastic cloud computing (EC2) system. Web servers receive independent IP addresses using Elastic IP or other IP address mediators. Web servers are monitored for load, and users are dynamically distributed among the servers. Excessive user load trips a threshold which leads to the creation of more EC2 nodes. When user load drops too low, that trips a threshold which leads to the delete of EC2 nodes to save cost.

A list of all recommended objects is pre-computed for the user. When the user requests objects via the interface, the system simply checks to IDs of those objects prior to presentation to see whether the objects appear on the recommended list or not. In another iteration, the personalization is computed in real time with no pre-cached list of recommended objects. In this example, as objects were going to be presented through the interface, they are run through the personalization engine at that moment to compute if they are recommended or not.

In some examples, the server and/or client device (e.g. desktop computer or smart phone) are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for Interaction with a user, the features in some instances are implemented on a computer having a display device such as an LCD (liquid crystal display) monitor or screen for displaying information to the user and, in the case of a desktop computer, a keyboard and a pointing device such as a mouse or a trackball by which the user provides input to the computer.

In various implementations, the client device is a smart phone such as that described in U.S. Pat. No. 7,966,578, entitled "Portable Multifunction Device, Method, and Graphical User Interface for Translating Displayed Content," assigned to Apple, Inc., which is incorporated herein by reference.

The server functionality described above is optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

Aspects of the present disclosure are also directed to systems and methods for generating recommendations of items for users based on learned relationships between nodes of a synaptic network where the nodes represent users, items, and attributes that describe the users and items. A synaptic network is a type of neural network which operates in a manner that mirrors how neurons, synapses, and neuron circuits operate on a cellular level. Once defined, the nodes of the synaptic network can be linked together using primary information from one or more data sources to initialize connections and provide structured and unstructured knowledge within the network. Structured learning proceeds iteratively throughout the synaptic network to refine weights and probabilities that connect nodes together while also discovering new latent connections. By activating input nodes, the system can retrieve other nodes that are similar to those nodes, in direct proportion to the weighted knowledge that underpins the nodal connections.

Synaptic Network Recommendation Model

Figure 15:
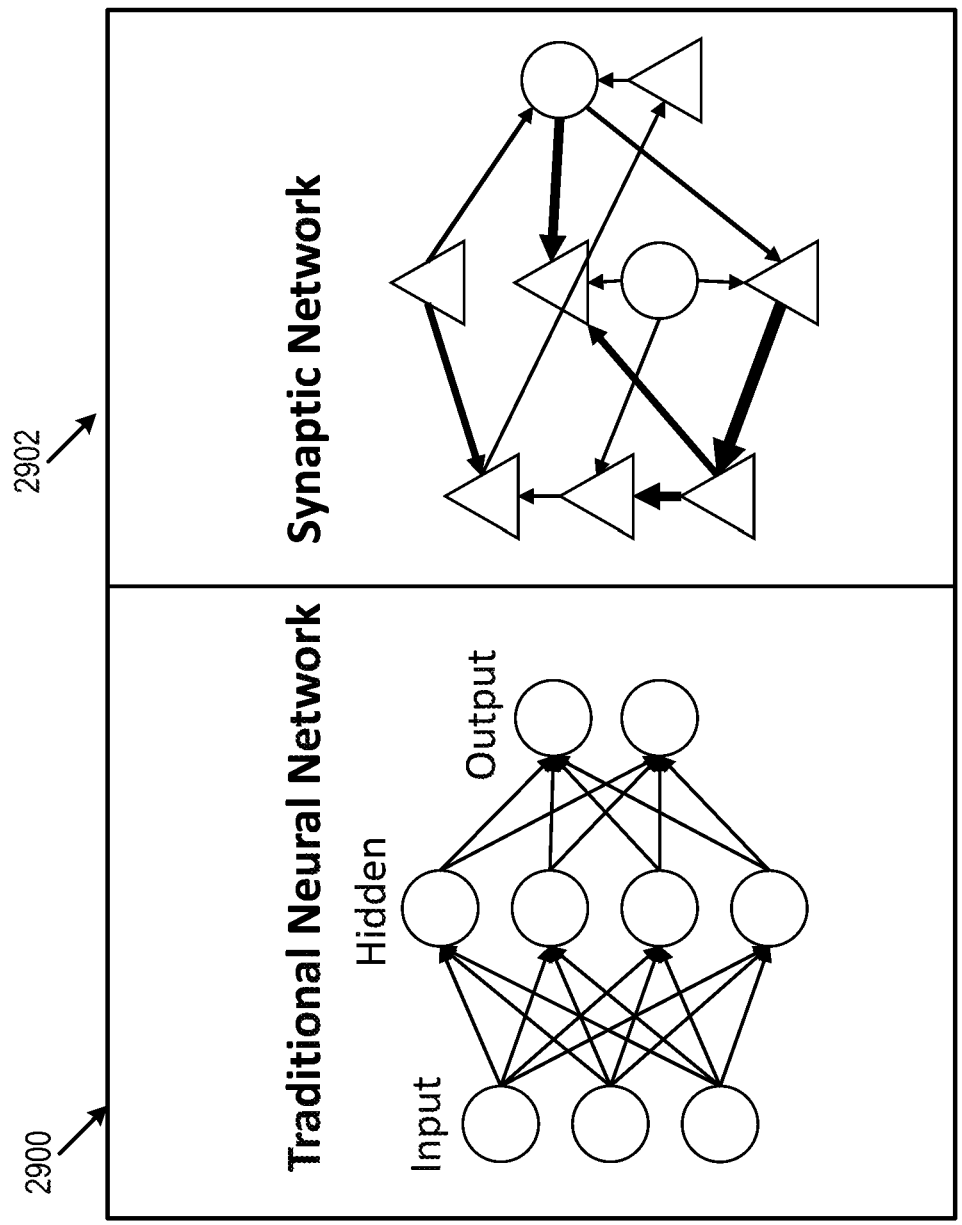
FIG. 15 is an exemplary diagram of a traditional neural network and a synaptic network, according to one example.

FIG. 15 is an exemplary diagram of a traditional neural network 2900 and a synaptic network 2902, according to one example. In the traditional neural network 2900, a majority of the processing occurs in "hidden nodes" that may not be explicitly identified apart from the preponderance of connections that they statistically recruit. In the synaptic network 2902 described in further detail herein, every node within the synaptic network 2902 represents an explicit object (for example, a specific wine) or feature (for example, the varietal of the wine), and similarities or differences between the nodes are encoded into the connections or relationships between these objects and features. Once connected, the nodes are able to produce recommendations. For example, a user's tastes can be expressed by activating the nodes for which the user likes or has an affinity and suppressing or inhibiting nodes for things which the user does not like or prefer, which in turn activates other similar nodes based on weighted connections that link the nodes together.

Table 1 illustrates differences in characteristics between the traditional neural networks and the synaptic networks described herein. Unlike previous traditional neural network implementations that abstract around the complexity of true synaptic learning rules, examples described herein provide at least one of a network having a highly recurrent structure, feedback dominant transmission, unsupervised learning style, bottom-up organization hierarchy, a local optimization level and synaptic learning rules. The network can include multiple nodes in which every node represents an item, attribute, or person (reviewer) having connections with other nodes that encode similarities and differences. The network can provide a probabilistic approach where each factor and connection in the knowledge graph can take on a continuous range of weights, and these weights are constantly being refined and nuanced by learning. In select examples, sparse coding is implemented to provide enhanced storage capacity and information retrieval.

TABLE 1

|  | Traditional Neural Networks | Synaptic Networks |
| --- | --- | --- |
| Structure | Sequential layers | Massively recurrent |
| Dominant transmission | Feedforward | Feedback |
| Learning style | Supervised | Unsupervised |
| Organization | Top-down | Bottom-up |
| Optimization level | Global | Local |
| Learning mechanism | Backpropagation/gradient descent | Synaptic learning rules |

For any network of relationships, the weights of the connections between nodes are a factor in determining an accuracy of the inferred relationships. To determine the connection weights, rather than supervised learning, the synaptic network 2902 uses synaptic learning rules at the cellular and local network level. The connection weights are determined in a bottom-up manner, which means when a connection is made or updated between two or more nodes, the connection is initially made or updated on a local level between the directly affected nodes, and then effect of the connection is subsequently propagated into higher levels of the nodal connections in the synaptic network 2902. In addition, the synaptic network may not rely on repetitive retraining because the results in the synaptic network 2902 emerge directly from the primary data harvested from one or more data sources and does not rely on "known" data to measure against in order to prepare for deployment of the network.

In addition, recommendations can be made with the synaptic network 2902 by activating only a subset of nodes within the synaptic network 2902, which corresponds to a principle that biological organisms can include collective properties of systems having large numbers of simple equivalent components. The synaptic network 2902 is massively recursive, which means that activation of a subset of the network can evolve through a state space to "resolve" the set of activated nodes that is most parsimonious with the input. In this way, an initial activation of a subset of nodes in the synaptic network 2902, followed by asynchronous parallel processing accurately yields an entire memory from any subset of sufficient size, which can be equivalent to activating the items that a user likes and surfacing new items as recommendations. Because of the recurrent structure of the synaptic network 2902, information can be cross-connected at multiple loci of relevance and can impact a recommendation decision at different stages and with different interactions. In addition, nodes within in the synaptic network 2902 produce decisions based on many probabilities weighed in parallel, and a system controlling the synaptic network 2902 reaches decisions based on consensus across the numerous factors represented by the synaptic network 2902, which may be more accurate than a decision that has been reached through piecemeal processing or sequential binary decisions. In addition, the connections between the nodes of the synaptic network 2902 are probabilistic, not "binary," and each factor and connection in the network 2902 can take on a continuous range of weights, and the weights are constantly refined and updated by synaptic learning rules.

The implementations of the synaptic network 2902 described herein also include sparse coding characteristics that provide efficiency in terms of storage capacity and also provide an explicit way to directly read out information encoded into the connections between the nodes. This explicit encoding is particularly useful for business applications or other implementations in which the reasons behind the recommendation or prediction are important to know. For example, traversing a graph where the nodes are labeled, and the weights between the labeled nodes and the result node are quantified may provide more meaningful results regarding reasons behind the recommendation or prediction. In addition, even while the final output recommendation is sparse, there can be a large amount of synaptic activity that drives the result due to a balanced interaction of node/connection excitation and inhibition. In some implementations, the synaptic network 2902 is able to evaluate multiple nodal associations in parallel.

Another advantage offered by the implementations of the synaptic network 2902 described herein is retraining issues can be bypassed by explicitly representing knowledge as the nodes themselves. For example, learning that a reviewer changed his or her mind about a restaurant, the system can simply update a single connection between the reviewer and the restaurant, and update adjacent connections according to the synaptic learning rules described further herein.

In certain implementations a recommendation engine may generate recommendations based on attributes and data associated with venues, users, reviewers and reviews. The system may harvest reviews generated by various reviewing entities and parse those reviews into an organized database of review data. That data may include attributes of the venue (such as a restaurant) and the rating or assessment provided by the reviewer. The system may also gather or generate data concerning the attributes of reviewer, such as gender, age, profession, marital status, review frequency and review accuracy. The system, in one implementation, also gathers data concerning the attributes of user, such as gender, age, profession, marital status, and affinity (whether positive or negative) for certain venues.

The neural network of interrelationships grows dynamically as further review, reviewer, attribute, and item data is added. The system may continuously analyze the data to add and/or modify weighted connections between the nodes of the synaptic network. The system may create new derivative links, normalize the data to adjust for data skew, and adjust links based on neighboring link values.

In various implementations the system may generate recommendations based on user attributes and data associated with a recommendation request. The system may provide a plurality of recommendations based overall connection strengths that factor in the synaptic learning rules and the synaptic retrieval rules discussed in further detail herein. The recommendations may include venues and other types of items complementary to that specifically requested, for instance, in response to a user request for a restaurant recommendation the system may generate a theater or night club recommendation as well.

Other aspects of the present disclosure are directed to generating recommendations for users through a neural recommender that uses a distributed representation model of items and reviews (feedback). In some implementations, the neural recommender can outperform alternating least squares (ALS) matrix factorization algorithms without requiring parameters that are proportional to the number of users. In addition, a hybrid of the distributed representation model can be implemented that incorporates a probabilistic network of items and their attributes, such as the synaptic network 2902. The hybridization allows explicit representations of attributes of items to be maintained, which enables recommendations to be made for items that have not received any reviews. This hybrid model can be implemented in situations where there are large amounts of feedback or in cold start conditions where many items have no reviews.

FIG. 16 is an exemplary table showing types of nodes in a synaptic network, according to one example. The nodes in the synaptic network can include items 300, attributes 302, or persons 304. The items 300 can be individual things a person may encounter, such as restaurants, movies, and the like. The system 100 extracts the items 300 from one or more primary data sources. In some implementations, the server 102 also includes a resolution engine that resolves, combines, and de-duplicates the items 300 extracted from the primary data sources.

In some examples, the items 300 of the synaptic network can be organized into one or more categorical domains based on the type of item 300. For example, the items 300 can include a venue categorical domain that includes restaurants, theaters, night clubs, hotels, concerts and other events. The items 300 in the synaptic network can also include sub-venue items such as specific mend items or specific rooms inside a hotel. The items 300 may also include other categorical domains such as style consumables such as clothing, furniture or wine or rather content such as music, books, magazines, TV shows, or movies. The items 300 can also be services such as mechanics, barbers, transportation, doctors, dentists, landscape architects, interior designers, or nanny services. In other implementations the items 300 may also include neighborhoods or cities in which to live, colleges to apply to, careers that are a good fit, or grocery stores. In still other applications the items 300 may be associated with social aspects such as friends and activities the user might like. In other embodiments, the items 300 may be medical conditions or treatments.

The attributes 302 are nodes of the synaptic network that include properties that distinguish the items 300 from one another. For example, a restaurant may have an attribute of "chic," or a movie may have an attribute of "sentimental." The system 100 identifies the attributes 302 and establishes connections between the attributes 302 and items 300 of the synaptic network based on the attributes 302 that are used to describe the items 300 in one or more primary data sources that can include websites, user reviews, and the like. The system 100 also standardizes the attributes 302 to converge on a controlled vocabulary of terms. The attributes 302 of the synaptic network can be connected to the items 300 across multiple categorical domains of the items 300 so that the system 100 can perform cross-category inference to link shared attributes 302 or people 304 who have common experiences with items 300 across different categorical domains.

The person nodes 304 are nodes of the synaptic network that include human beings who referee subjective taste for the items 300. Throughout the disclosure, the person nodes 304 can also be interchangeably referred to as users or reviewers. For example, a person can be a user of a restaurant website or a professional movie reviewer. The system 100 identifies patterns of transactions for each of the users 304 in order to link the users to the items 300 or attributes 302. For example, users 304 can be linked to items 300 through reviews of the items 300. The users 304 can also be linked to attributes 302 through answers to online quizzes, social media profiles, or adjectives used to describe the items 300 in written reviews.

FIG. 17 is an exemplary table showing types of node connections in a synaptic network, according to one example. The connections or links between the item nodes 300, attribute nodes 302, and person nodes 304 represent relationships between those nodes. The number of connections or connection strength between two nodes might therefore grow as data on two items grows. The strength of each connection denotes the affinity between the two connected nodes, such as similarity of star rating (in a review of an item) or a number of attributes held in common. The connections can be either positive or negative in sign and can have varying weights that represent the strength of the affinity between the connected nodes. The connection strengths between the nodes are based on an application of one or more synaptic learning rules to the nodal connections in the synaptic network as will be discussed in further detail herein.

In some implementations, the connections can include person-item connections 600, attribute-item connections 602, item-item connections 604, and person-attribute connections (not shown). Person-item connections 600 can represent a connection between a reviewer and an item, such as an online review of a movie by a movie reviewer. Attribute-item connections 602 represent specific properties or descriptive terms of attribute nodes 302. For example, an attribute of a specific wine can include a grape variety of the wine, such as Pinot Noir. Item-item connections 604 represent an amount of similarity between two items, such as two restaurants that are classified as "romantic" on a restaurant search website. Person-attribute connections represent an affinity of a person for a particular attribute. For example, a person who provides positive reviews for Italian restaurants and Italian wine can have a connection with an "Italian" attribute node. By connecting the item nodes 300, attribute nodes, and person nodes 304, item, attribute, and person classes of knowledge can be incorporated into a single recurrent network. For example, a specific movie can be connected to reviewers of that movie as well as attributes that define the movie, which in turn can connect the items to attributes and reviewers of other movies, books, etc.

FIG. 18 is an exemplary diagram of nodal connections in a synaptic network, according to one example. Regardless of the category of knowledge being described by the synaptic network, the nodes represent items 300, attributes 302, or persons 304. Graph 700 represents general nodal connections between items nodes 300, attribute nodes 302, and person nodes 304. For example, item 704 is connected to attributes 706 and 708 as well as person 710, and the attribute 708 is connected to item 712. Graph 702 represents a specific example of the graph 700. For example, item 714 corresponds to the restaurant Chipotle, which is linked to attribute 716 of Mexican and attribute 718 of fast food, which are both characteristics of types of foods served by Chipotle restaurants. Also, person node 720 corresponds to a reviewer #1724 who has provided a restaurant review for Chipotle, which may indicate that the reviewer #1724 has an affinity for the food served by Chipotle. The graph 702 also includes an item node 722 for Burger King, which is also connected to the attribute node 718 of fast food.

The synaptic network provides a general, domain-independent, representational infrastructure. For example, the synaptic network is extensible in that the attribute nodes 302 of the synaptic network can be connected to the item nodes 300 and person nodes 304 across multiple categorical domains of the items 300 so that the system 100 can perform cross-category inference to connect shared attributes 302 or persons 304 who have common experiences with items 300 across varied categorical domains. The synaptic network is also maintainable in that the database mechanic and learning rules applied by the system 100 to the synaptic network can be developed, modified, and maintained in one place within the server 102, such as in the data repository 118, but can be applied scalably to all categorical domains of the synaptic network. The synaptic network is also connectable so that lower-order feature extraction engines (e.g., document parsing, semantic analysis, image annotation) can be applied equivalently to the synaptic network across all of the categorical domains. Similarly, higher-order knowledge distillation and analysis functions can also be applied to all domains of the synaptic network.

Figure 19:
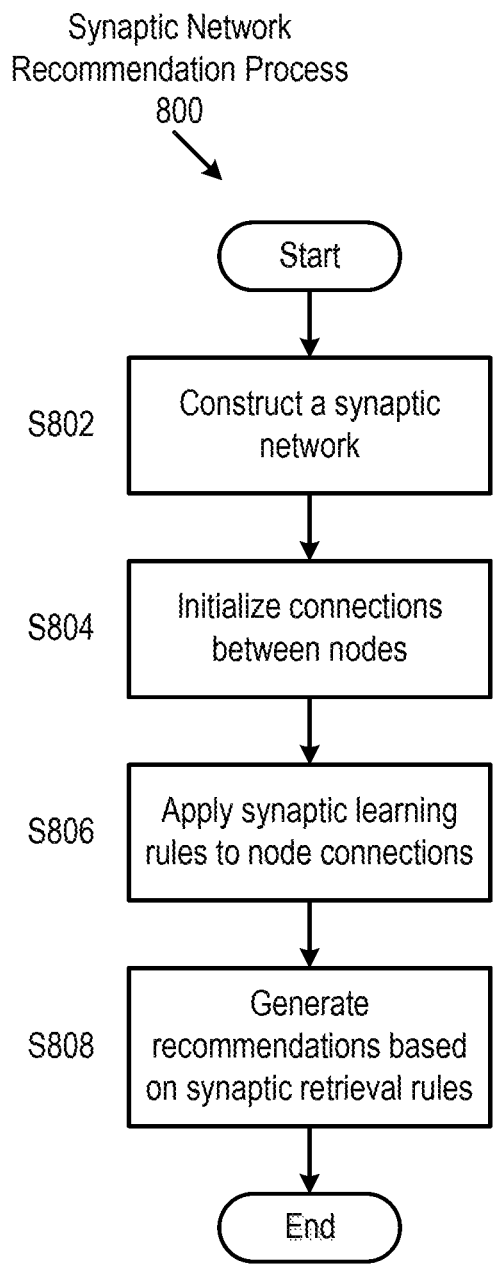
FIG. 19 is an exemplary flowchart of a synaptic network recommendation process, according to one example.

FIG. 19 is an exemplary flowchart of a synaptic network recommendation process 800, according to one example. In some implementations, the synaptic network recommendation process 800 is performed by the recommendation engine 112 of the server 102 but could also be performed by any processor of the system 100 that has processing circuitry configured to execute the processes described further herein.

At step S802, the system 100 constructs a synaptic network that includes defining item nodes 300, attribute nodes 302, and person nodes 304 from one or more primary data sources, such as webpages, review sites, social media pages, and the like. The data included in the synaptic network is collected by the content collection system and organized by the content organizer discussed previously herein.

At step S804, connections between the nodes of the synaptic network are initialized based on relationships between the item nodes 300, attribute nodes 302, and person nodes 304 that are identified from the primary data sources. For example, if a webpage for a restaurant indicates that the restaurant serves Italian food, then a connection can be initialized between an item node for the restaurant and an attribute node for "Italian." The item nodes 300, attribute nodes 302, and person nodes 304 are included in a single recurrent synaptic network graph and can be connected across multiple categorical domains. In addition, the connections between the nodes are explicit representations of the interrelationships between items, attributes, and people.

At step S806, the system 100 applies one or more synaptic learning rules to the connections between the nodes to modify the connections and connections strengths between the nodes of the synaptic network. In some implementations, the connection strengths between the nodes are weighted probabilities that represent an amount similarity or affinity between the nodes. The synaptic learning rules applied to the nodal connections correspond to ways in which neural circuits operate on a cellular level to capture information and represent the information for long-term storage and synthesis across time. The connection weights are determined in a bottom-up manner, which means when a connection is made or updated between two or more nodes, the connection is initially made or updated on a local level between the directly affected nodes, and then effect of the connection is subsequently propagated into higher levels of the nodal connections in the synaptic network. Details regarding the synaptic learning rules are discussed further herein.

In addition, when the synaptic learning rules are applied, the system also constructs inhibition nodes within the synaptic network to manage relative numbers of nodal activations among various categories and sub-categories within the synaptic network. The inhibition nodes are another type of node within the synaptic network in addition to the item nodes 300, attribute nodes 302, and person nodes 304. In some implementations, the system 100 generates the inhibition nodes with connections to other nodes within the synaptic network based on categorical groupings of the nodes. For example, an inhibition node may be generated for restaurants that have an attribute of "sushi," and another inhibition node may be generated for restaurants that have attributes of "fancy" and "sushi." The inhibition nodes act as control nodes to manage numbers of activations and connection strengths within the synaptic network. For example, if "fancy sushi" restaurants account for greater than a predetermined number of activations within the synaptic network compared to other types of restaurants, then the inhibition nodes can balance the number of activations within the synaptic network so that the connection strengths to "fancy sushi" restaurants do not dominate the recommendations generated by the recommendation engine. In one implementation, an inhibition node is generated for a particular category or sub-category of nodes if a number of activations is greater than a threshold. For example, the "fancy sushi" inhibition node may be generated when a number of activations related to fancy sushi restaurants represents greater than 10% of the total restaurant activations within the synaptic network.

At step S808, the system 100 generates recommendations for a user based on one or more synaptic retrieval rules. In some implementations, a user may input a recommendation request for a particular type of item at a user interface screen of a client device. By identifying one or more input nodes in the synaptic network applying the synaptic retrieval rules, other similar nodes can be identified in direct proportion to the connection weights associated with the nodal connections. To retrieve a recommendation for a user, the recommendation engine of the system 100 identifies one or more items that the user likes, and the recommendation engine also retrieves other items that they may possibly like by leveraging the relationships between attributes and historical people that are embedded in the connection weights of the synaptic network. For example, the recommendation engine identifies recommended items for the user by amplifying relationships between nodes for which the user has an affinity or likes and suppressing relationships between nodes associated with items or attributes that the user does not like.

In some implementations, the synaptic network can include one or more inhibition nodes that scale and sharpen the recommendation results to reduce spurious recommendation results, which produces a more sparse recommendation set. For example, inhibition nodes can receive their own connections, which can compete and be synthesized just like excitatory nodes. The synaptic retrieval rules implement both subtractive and division inhibition as will be discussed further herein.

In addition, to predict whether the user has an affinity for an item or whether an attribute accurately describes an item, the recommendation engine can determine a strength of the resulting activation, to determine a quality of the connection. The synaptic network can also be used to determine reasons for a match, which results from encoding knowledge into the nodes explicitly. Details regarding the synaptic retrieval rules are discussed further herein.

Figure 20:
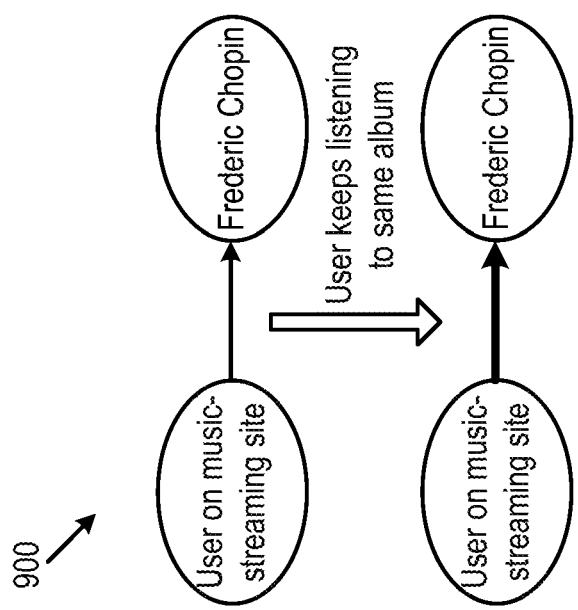
FIG. 20 is an exemplary diagram of a synaptic learning rule, according to one example.

FIGS. 20-25 are exemplary diagrams of synaptic learning rules applied at step S806 of the synaptic network recommendation process 800, according to one example. The system 100 can apply one, several, or all of the synaptic learning rules when determining the relationships between the nodes of the synaptic network. FIG. 20 is an exemplary diagram 900 of an association synaptic learning rule, according to one example. According to the association synaptic learning rule, connection strengths between two or more nodes can be strengthened when the nodes are activated within a predetermined period of time that indicates that the nodes are closely related in time as well as context. Throughout the disclosure, references to activation of nodes can indicate instances of the information represented by the nodes being extracted from webpages, review sites, social media profiles, and the like. For example, if a user repeatedly goes to a restaurant, then the user node and the restaurant node are repeatedly activated within a predetermined period of time, and the connection strength between the restaurant and the user is strengthened, which means that the connection weight between the restaurant and the user is increased. In a similar way, a connection strength between a user and composer Frederic Chopin is increased as the user repeatedly listens to a Frederic Chopin album on a music streaming website. Also, the connection strength between two restaurants can be increased if the two restaurants repeatedly appear on webpages together.

Figure 21:
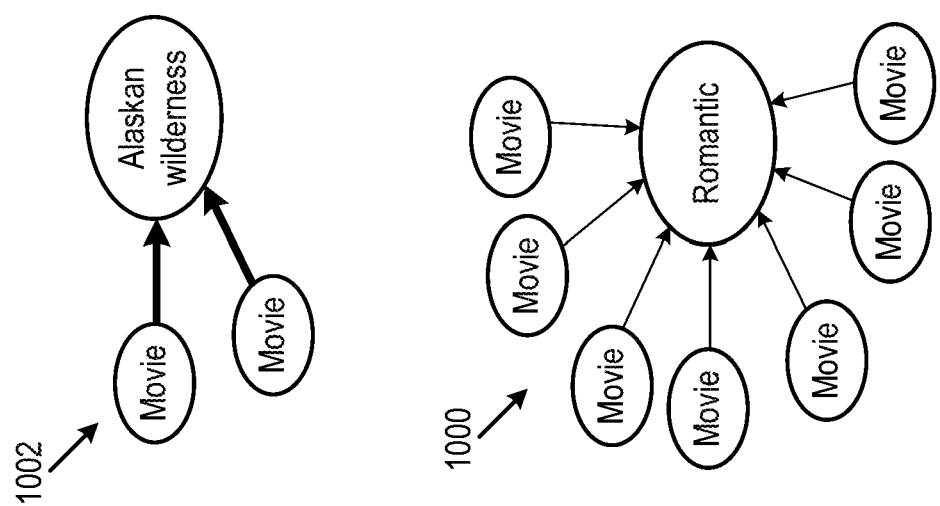
FIG. 21 is an exemplary diagram of a synaptic learning rule, according to one example.

FIG. 21 includes exemplary diagrams 1000 and 1002 that illustrate a synaptic learning rule where unitary connection strength is based on a number of nodes that are connected to a particular node, according to one example. In some implementations, when a node is connected to many partner nodes, the strength of each connection to the partner nodes is more weakly distributed than for a node that is connected to fewer partner nodes. For example, the diagram 1000 shows that an attribute node for "romantic" is connected to a larger number of movies than a number of movies connected to an attribute node of "Alaskan Wilderness" as shown by the diagram 1002. Therefore the connection strengths between the movies classified as "romantic" and the "romantic" attribute node are more weakly distributed than the connection strengths classified as "Alaskan Wilderness" and the "Alaskan Wilderness" attribute node, which indicates that movies set in the Alaskan Wilderness are more rare than romantic movies, which may indicate a stronger connection.

Figure 22:
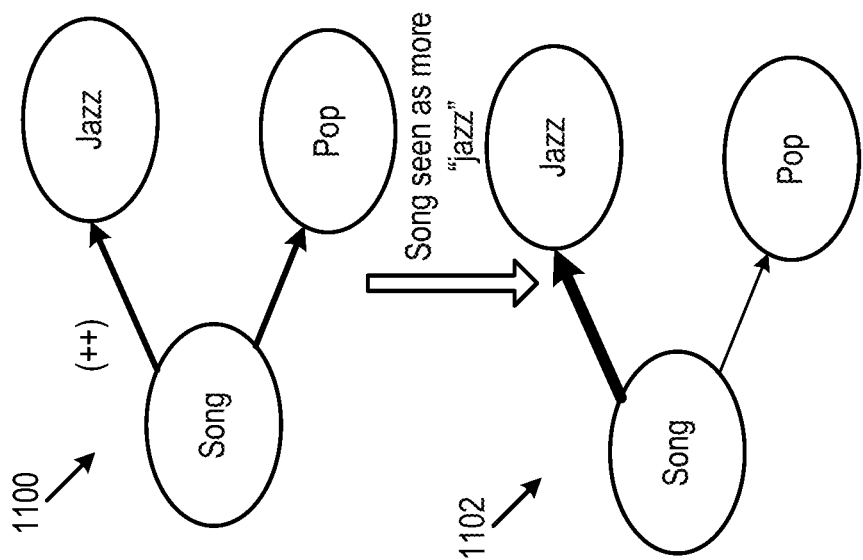
FIG. 22 is an exemplary diagram of a synaptic learning rule, according to one example.

FIG. 22 includes exemplary diagrams 1100 and 1102 of a heterosynaptic competition synaptic learning rule, according to one example. According to the heterosynaptic competition synaptic learning rule, a node has to make tradeoffs with respect to connection strength distribution so that increasing the strength of one of the node's connection to another node results in weakening the strengths of the other connections to the node. In addition, decreasing the strength of one of the node's connection to another node results in increasing the strengths of the other connections to the node. As shown in diagram 1100, a particular song node has connected attribute nodes of "jazz" and "pop." Increasing the connection strength between the song node and "jazz" node results in the connection strength between the song node and "pop" node being weakened, as is shown by the diagram 1102. In addition, if a restaurant is labeled as "French," "Italian," and "Pizza", and the system 100 collects additional data that results in the system 100 learning that the restaurant is more "French" than previously thought, then the connection strengths between the restaurant and the "Italian" and "Pizza" nodes are reduced.

Figure 23:
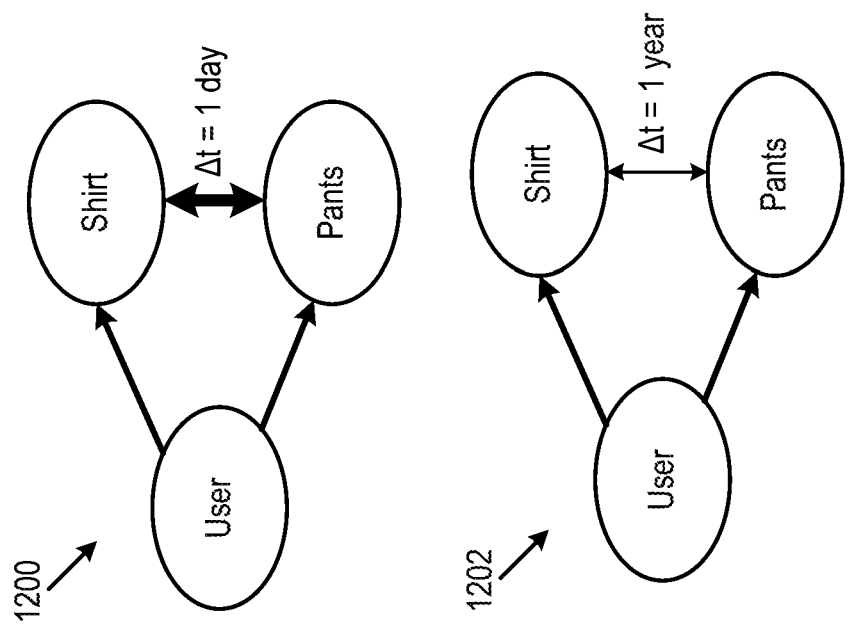
FIG. 23 is an exemplary diagram of a synaptic learning rule, according to one example.

FIG. 23 includes exemplary diagrams 1200 and 1202 of a timing relationship synaptic learning rule, according to one example. According to the timing relationship synaptic learning rule, nodal activations that occur closer together in time have a stronger connection than nodal activations that occur further apart in time. As shown in the diagram 1200, a connection strength between a shirt and a pair of pants purchased by a user in one shipment ($\Delta t=1$ day) is stronger than a connection between a shirt a user pair of pants purchased by a user in different calendar years ($\Delta t=1$ year) as shown in the diagram 1202.

Figure 24:
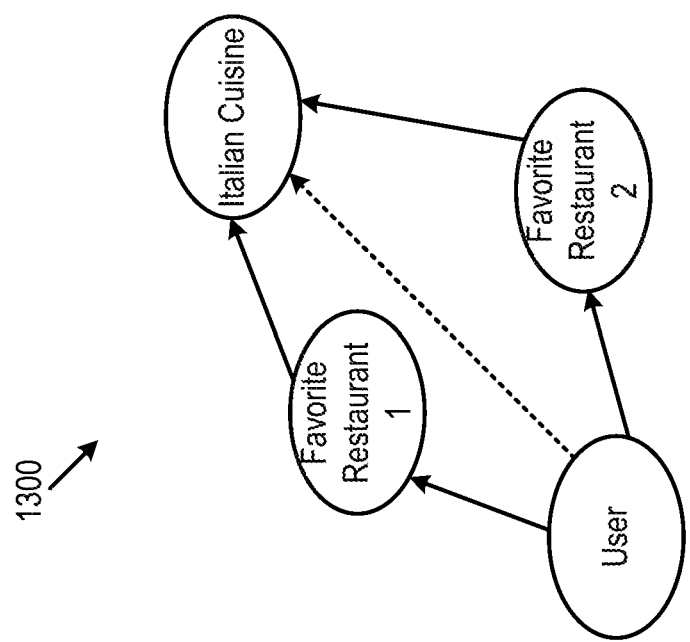
FIG. 24 is an exemplary diagram of a synaptic learning rule, according to one example.

FIG. 24 is an exemplary diagram 1300 of an inference and capture synaptic learning rule, according to one example. According to the inference and capture synaptic learning rule, the system 100 can consolidate nodes that are indirectly connected in chains into direct connections. As shown in the diagram 1300, if a user likes a favorite restaurant #1 and a favorite restaurant #2 and both of the restaurants are Italian restaurants, then the system 100 can establish a connection between the user and an "Italian" attribute node.

Figure 25:
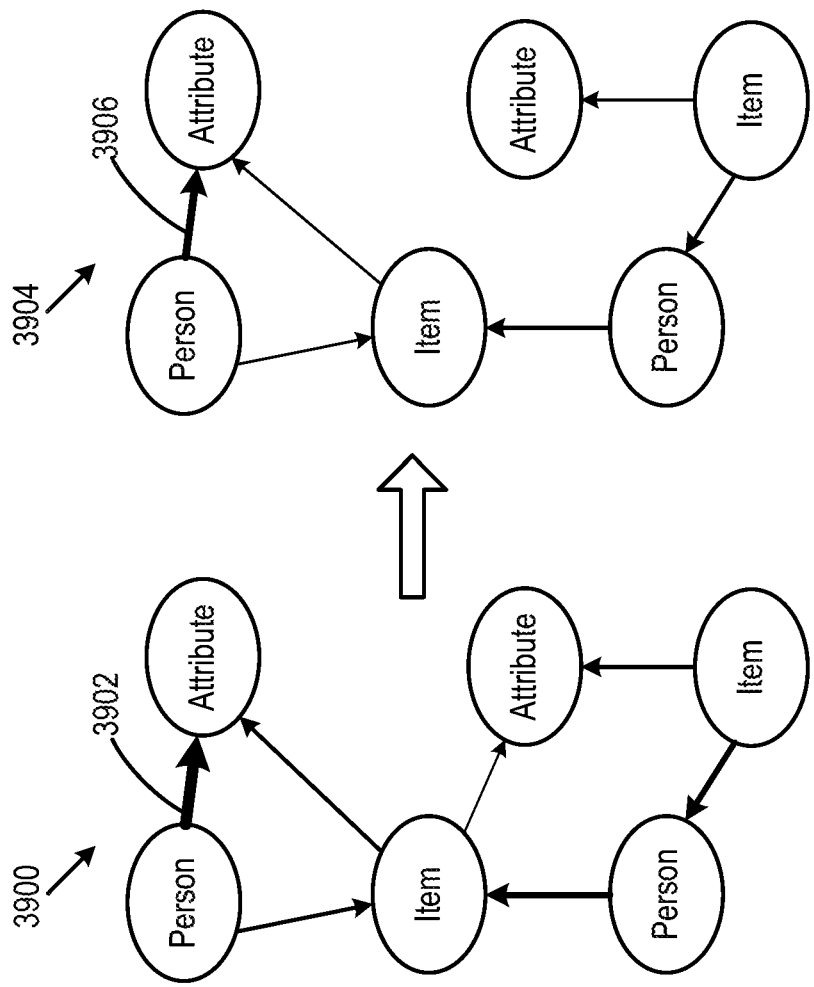
FIG. 25 is an exemplary diagram of a synaptic learning rule, according to one example.

FIG. 25 includes exemplary diagrams 3900 and 3904 of a global synaptic scaling synaptic learning rule, according to one example. According to the global synaptic scaling synaptic learning rule, if an average connection strength between two or more nodes becomes greater than a predetermined threshold or less than a predetermined threshold, then the connection strengths can be scaled down or scaled up the strengths of all synapses uniformly to preserve relative connection strengths between the nodes. In one example, the recommendation engine maintains a global counter that tracks a total number of activations within the synaptic network and scales the connection strengths between the nodes based on a current value of the global counter. If an item category exists with a number of nodal connections that is greater than the predetermined threshold which may be a percentage of the current value of the global counter with associated attributes and users, such as restaurants in New York City, then the connections for the item category can be scaled down in strength to balance the connections with respect to other category domains. For example, diagram 3900 shows that if a strength of a connection 3902 between a person and attribute becomes greater than the predetermined threshold, then one or more of the connections that are directly or indirectly associated with the connection 3902 are scaled down so that the strength of connection 3906 in the diagram 3904 is less than the predetermined threshold.

Figure 26:
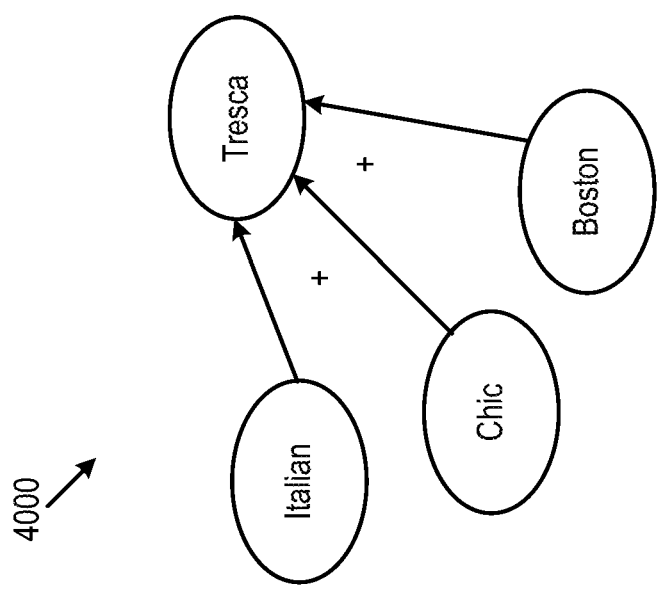
FIG. 26 is an exemplary diagram of a synaptic retrieval rule, according to one example.

FIGS. 26-29 are exemplary diagrams of synaptic retrieval rules applied at step S808 of the synaptic network recommendation process 800, according to one example. The system 100 can apply one, several, or all of the synaptic retrieval rules when identifying the items to recommend to the user. FIG. 26 is an exemplary diagram 4000 of an excitation/summation synaptic retrieval rule, according to one example. According to the excitation/summation synaptic retrieval rule, convergent inputs to a node for which a user has an affinity can be summed to amplify the results via an "AND" operation, which increases the connection strengths for the converging input nodes to the at least one recommended item. For example, if the user likes a wine bar that is classified as "chic" and the user also likes waterfront views, then the system 100 may recommend a wine bar that is classified as "chic" and also is on a cliff with waterfront views.

Figure 27:
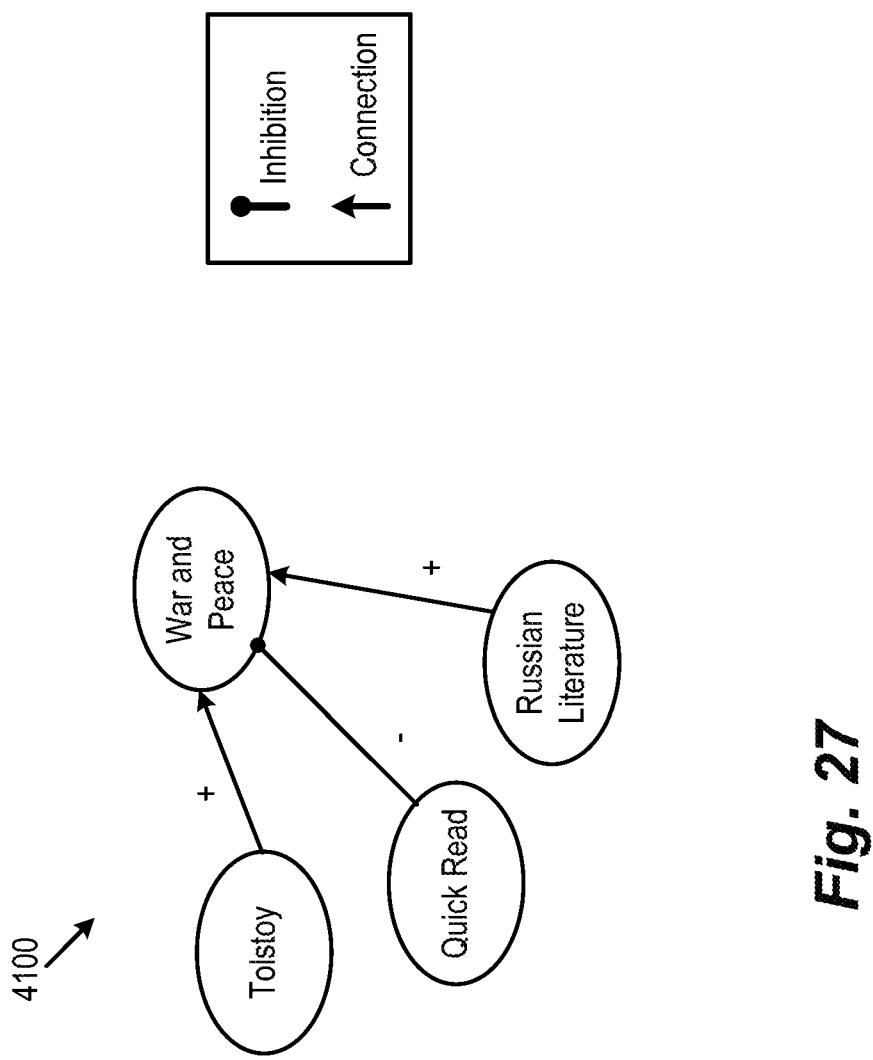
FIG. 27 is an exemplary diagram of a synaptic retrieval rule, according to one example.

FIG. 27 is an exemplary diagram 4100 of a subtractive inhibition/cancellation synaptic retrieval rule, according to one example. According to the subtractive inhibition/cancellation synaptic retrieval rule, one or more competing or contradictory connections to a recommended item are suppressed, which sharpens a set of recommended results. Also, one or more nodal groupings can cross-suppress one another to further refine the recommended results. For example, diagram 4100 shows a user prefers the book "War and Peace." Based on the subtractive inhibition/cancellation synaptic learning rule, a contradictory connection of "quick read" can be suppressed, which further amplifies the other attributes of "Tolstoy" and "Russian Literature" that describe the book. In addition, a restaurant that receives a five-star rating from a reviewer inhibits a restaurant that receives a one-star rating from the reviewer. Similarly, a restaurant that is "cheap" inhibits a restaurant that is "expensive."

Figure 28:
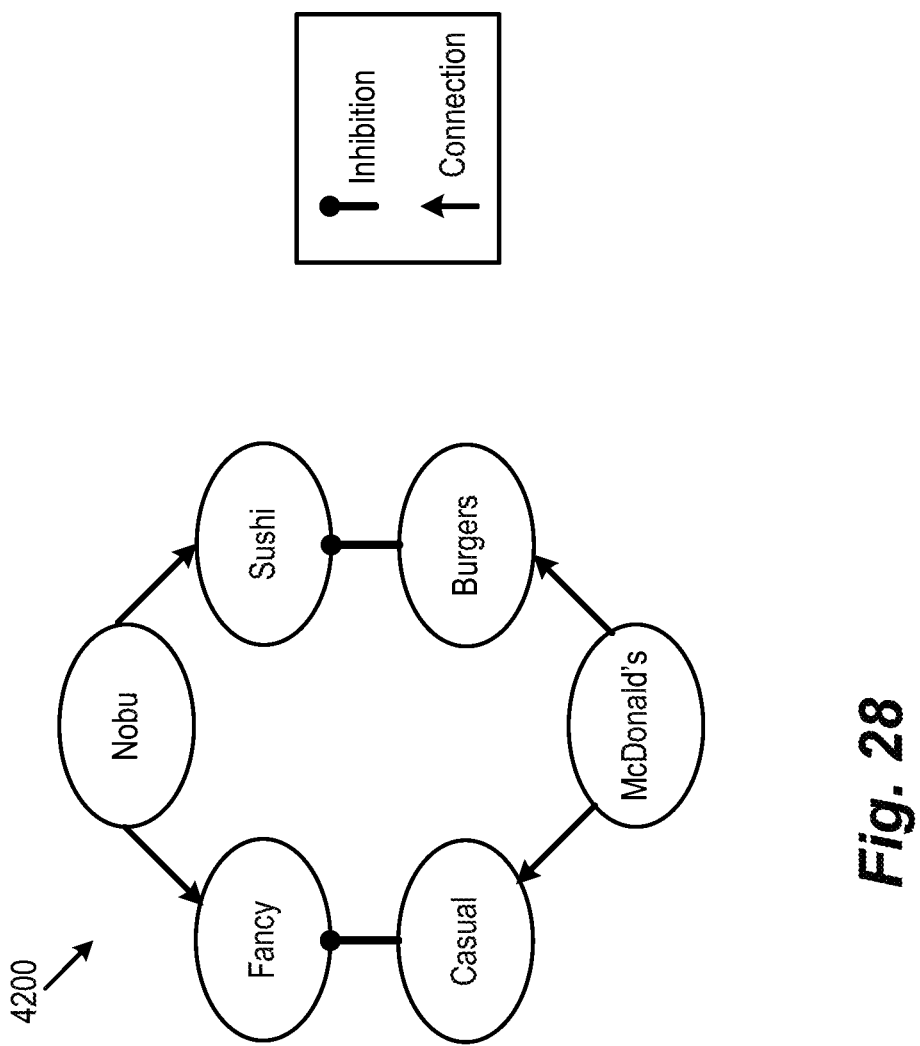
FIG. 28 is an exemplary diagram of a synaptic retrieval rule, according to one example.

FIG. 28 is an exemplary diagram 4200 of a lateral inhibition/competition synaptic retrieval rule, according to one example. According the lateral inhibition/competition synaptic retrieval rule, nodal sub-networks of two or more connected nodes are generated that cross-suppress other nodal sub-networks based on a number of activations of nodes within the nodal sub-networks. The more active one sub-network is, the more able the nodal sub-network is to suppress a competing sub-network and thus prevent cross-suppression. As shown in the diagram 4200, a set of recommendations for a user may converge on two nodal sub-networks such as "fancy sushi" versus "casual burgers," which compete to suppress one another based on the number of nodal activations within the nodal sub-network.

Figure 29:
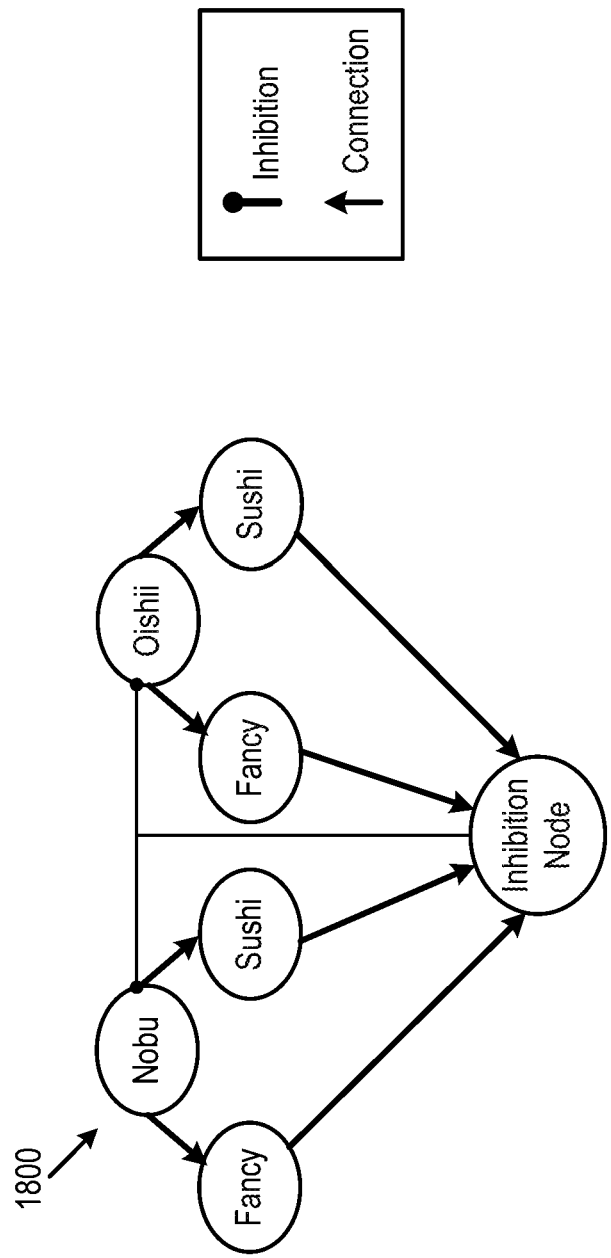
FIG. 29 is an exemplary diagram of a synaptic retrieval rule, according to one example.

FIG. 29 is an exemplary diagram 1800 of a divisive inhibition/normalization synaptic retrieval rule, according to one example. According to the divisive inhibition/normalization synaptic retrieval rule, an inhibition node connected to one or more of the nodes of the synaptic network normalizes a number of nodal activations to within a predetermined range by responding dynamically to activation. For example, if a user "likes" 500 movies and thus activates a large number of nodes, saturation of the synaptic network will be reduced due to dynamic inhibition from the inhibition node, which normalizes the effect of the 500 movie "likes." In addition, as shown in the diagram 1800, the inhibition node 1802 dynamically normalizes the "fancy sushi" restaurants "Nobu" and "Oishii" to within a predetermined range to reduce a likelihood of oversaturating the synaptic network with activations of the restaurants.

Distributed Representation Recommendation Model

In some implementations, recommendations can be generated for users with the recommendation engine that uses a distributed representation model of items and reviews. In some implementations, the distributed representation model is a computerized neural network implementation that can outperform alternating least squares (ALS) matrix factorization algorithms without numbers of items and reviews that correspond to the number of users. In addition, the recommendation engine can implement a hybrid of the distributed representation model that incorporates a probabilistic network of items and their attributes, such as the synaptic network described previously herein. The generation of the probabilistic network can also be referred to as associative learning. The hybridization model augments the synaptic network described previously with the distributed representation model of the computerized neural network that allows explicit representations of attributes of items to be maintained, which enables recommendations to be made for items that have not received any reviews. This hybridization model can be implemented in situations where there are large amounts of reviews or in cold start conditions where many items have no reviews. Unlike traditional neural network implementations, the distributed representation model and the hybridization model may not suffer from reduced performance in the presence of sparse input vectors. In addition, the distributed representation model can be implemented in both recurrent and non-recurrent networks of data and can be scaled based on an amount of data included in the network. Instead of representing a user by a unique vector of latent features like in the ALS matrix factorization algorithms, each item and review can be combined to represent a particular user. In addition, the representation model can outperform a conventional matrix factorization algorithm, particularly in low-dimensional or low-feedback settings.

Throughout the disclosure, the terms ratings and reviews can be used interchangeably. In some implementations, references to ratings refer to a numerical rating for an item on a predetermined scale that indicates a user's affinity for that item. For example, the ratings can be on a five-star rating scale where the user can provide a review for the item by assigning it a rating from zero stars to five stars. Also, the rating scale described herein is zero stars to five stars rating scale, but other rating scales can also be used.

In some aspects, a recommender problem can be defined such that a matrix of ratings $R = \mathbb{R}^{v \times k}$ where v is the number of users and k is the number of items, and scalar $R_{i,j}$ is a value of a review (rating) that user i gave item j, as shown by the following example:

$$R = \begin{bmatrix} 0 & 2 & 3 & 0 & \ldots \\ 0 & 0 & 0 & 1 & \ldots \\ 0 & 4 & 0 & 0 & \ldots \\ 5 & 0 & 1 & 0 & \ldots \\ \vdots & \vdots & \vdots & \vdots & \ddots \end{bmatrix}$$

In some examples, the matrix R is sparse as any given user may be unlikely to have given reviews for a large number of items. A goal of the distributed representation model or the hybridization model is to be able to use observed ratings in order to assign values to all unobserved ratings in the matrix R. In one example, observed ratings are items that a user has explicitly rated, while unobserved ratings are items that have no feedback (i.e. the zero entries in R). An estimated ratings matrix $\hat{R}$ can be obtained by assigning values to all of the entries of the matrix R that are zero. An entry $\hat{R}_{i,j}$ represents what user i would have rated item j had the user observed it, as can be shown by the following example:

$$\hat{R} = \begin{bmatrix} 4 & 2 & 3 & 5 & \ldots \\ 2 & 3 & 3 & 1 & \ldots \\ 4 & 4 & 3 & 5 & \ldots \\ 5 & 2 & 1 & 1 & \ldots \\ \vdots & \vdots & \vdots & \vdots & \ddots \end{bmatrix}$$

In addition, a function that a recommendation algorithm seeks can be described as:

$$f: R \to \hat{R}.$$

ALS algorithms attempt to find the function $f$ by factorizing the review matrix R to a user matrix $U \in \mathbb{R}^{v \times d}$ and an item matrix $M \in \mathbb{R}^{k \times d}$ where d is a hyper-parameter of the model denoting the number of latent features to use. Both the user and item matrices can be randomly initialized, and each row of the matrix U represents the d latent features of a user. Similarly, the row vectors in M represent latent features of the items. To solve a matrix factorization problem, the ALS algorithm treats the matrix U as a constant and optimizes a loss with respect to M. The ratings matrix R is used as an expectation in order to determine the loss (e.g., sum of squared errors). The matrix M is then used as a constant, and the loss function is sampled again in order to learn the matrix U, and the process is repeated.

Typically, the matrices U and M that are obtained without regularization overfit the data and do not allow for a generalizable function. This problem can be solved by adding a weighted regularization term to the cost function being optimized. One such cost function l mentioned can be defined for all single user-item pairs as:

$$l = \sum_{\forall ij | R_{ij} \neq 0} (R_{i,j} - u_i^T \cdot m_j)^2 + \lambda \left( \sum_i n_{u_i} \|u_i\|^2 + \sum_j n_{m_j} \|m_j\|^2 \right)$$

The addition of the regularization term can penalize solutions with large parameters U and M. For example, both $u_i$ and $m_j$ can represent the $i^{th}$ and $j^{th}$ row vectors of matrices U and M. The parameter $\lambda$ is a weight that can be fixed empirically be performing validation. Here, $n_u \in \mathbb{Z}^{1 \times v}$ is a vector where the value of $n_{u_i}$ is the number of items user i has rated. Similarly, $n_m \in \mathbb{Z}^{1 \times k}$ is a vector where $n_{m_j}$ the value of is the number of users that have rated item j.

In some implementations, a neural network recommendation algorithm can define a neural network that has a vector $x \in \mathbb{R}^{1 \times 32}$ as an input, a scalar expectation $y \in \{0,1\}$, and a hidden layer of size h. The neural network can use a sigmoid activation function $$\sigma(x) = \frac{1}{1 + e^{-x}}$$

and a learning rate, α, which is a hyper-parameter. The parameters can be initialized so that $\theta_0 \in \mathbb{R}^{h \times 32}$, $\theta_1 \in \mathbb{R}^{1 \times h}$, $b_0 \in \mathbb{R}^{1 \times h}$, and scalar $b_1$. Then, the feed-forward process can be described by the following equations:

$$f(x) = \sigma(x \cdot \theta_0^T + b_0)$$

$$g(f) = f \cdot \theta_1^T + b_1$$

With g as an output of the network, a squared error loss function can be defined by $$l(g) = \frac{1}{2}(g - y)^2.$$

Stochastic gradient descent can be used to solve for the parameters of the model by sampling the loss function l iteratively with either single training samples or mini-batches. The parameters are modified each time the loss function is sampled by taking a partial derivative of the loss l with respect to each parameter $\theta_0$, $\theta_1$, $b_0$, and $b_1$. An example of a weight change for $\theta_1$ and, $\theta_0$ can be described by:

$$\theta_1 \leftarrow \theta_1 - \alpha \frac{\partial l}{\partial \theta_1}$$

$$\frac{\partial l}{\partial \theta_1} = \frac{\partial l}{\partial g} \frac{\partial g}{\partial \theta_1}$$

$$\theta_0 \leftarrow \theta_0 - \alpha \frac{\partial l}{\partial \theta_0}$$

$$\frac{\partial l}{\partial \theta_1} = \frac{\partial l}{\partial g} \frac{\partial g}{\partial f} \frac{\partial f}{\partial \theta_0}$$

The computerized neural networks used in the distributed representation model can be trained with dropout which includes retaining only predetermined inputs to any layer of the neural network at random with a probability p. In a case of linear regression, a single observation model takes an input vector $x \in \mathbb{R}^{1 \times 32}$, parameters $\theta \in \mathbb{R}^{1 \times 32}$, a scalar bias b, and a scalar hypothesis y, where:

$$d \in \{0,1\}^{1 \times 32} \text{ where } Pr(d_i = 1a) = 0.5;$$

$$y = (d*x) \cdot \theta^t + b$$

In some implementations, the recommendation engine learns distributed representations, also referred to throughout the disclosure as embeddings, via back-propagation, as described by D. E. Rumelhart, G. E. Hinton, and R. J. Williams, "Learning representations by back-propagating errors," *Cognitive modeling*, 5(3):1, 1988, the entire contents of which is incorporated herein by reference. Distributed representations allow neural networks to learn representations of the data represented by the networks. In one example, the neural networks used by the recommendation engine learn representations by forming a look-up matrix. A representation of the input data (e.g., words, items, etc.) is a vector that can be looked up in the matrix and fed forward into subsequent operations and can be learned in the same fashion as other parameters within the neural network.

In order to compare the performance of the ALS matrix factorization algorithm to the performance of the distributed recommendation model of the computerized neural network, an analogous ALS matrix factorization algorithm can be described with corresponding terminology and parameters to the neural networks used in the distributed representation model. For example, a user embedding matrix $L_{user} \in \mathbb{R}^{y \times d}$ can be defined that is analogous to U and a parameter matrix $\theta_0 \in \mathbb{R}^{k \times d}$ that is analogous to M. In order to score users in a look-up matrix, a hypothesis for all items for all users can be described by $h(L_{user} \cdot \theta_0^T)$. In neural network terminology, both parameters $L_{user}$ and $\theta_0$ are learned at the same time with respect to a cost function l.

FIG. 30A is an exemplary flowchart of a distributed representation recommendation process 1900, according to one example, which can be performed by the recommendation engine 112 of the server 102. In some implementations, applying the distributed representation model to neural networks allows a network model to be constructed that may not include a large sparse vector that represents reviews for the user.

At step S1902, a neural network is constructed with embedding matrices $L_{item} \in \mathbb{R}^{k \times d}$ and $L_{review} \in \mathbb{R}^{s \times d}$ where there are k number of items and s number of unique reviews with embedded dimensionality d. With a hidden layer size h, weight and bias parameters can be defined as follows:

$$\theta_0 \in \mathbb{R}^{h \times d}, b_0 \in \mathbb{R}^{1 \times h}$$

$$\theta_1 \in \mathbb{R}^{k \times h}, b_1 \in \mathbb{R}^{1 \times k}$$

In addition, n represents a total number of explicit ratings for a user in review matrix R, and an input to the network takes the following form:

$$(l_1, r_1), (l_2, r_2), \ldots, (l_n, r_n),$$

where $i_j$ is the $j^{th}$ element of a vector of items and $r_j$ is the $j^{th}$ element of a vector of reviews, which can also be referred to as ratings. The row vectors for all items and reviews can be looked up in their respective look-up matrices and in order to form two matrices $X_{item}$, $X_{review} \in \mathbb{R}^{n \times d}$. Row vector $X_{item_j}$ represents item $i_j$, and $i_j$ is an index of the row in the look-up matrix $L_{item}$, which means that row vector $X_{item_j} \leftarrow L_{item_j}$. It is possible for $X_{review}$ to have repeated row vectors, as users may often have given different items, such as movies, the same ratings.

Figure 30B:
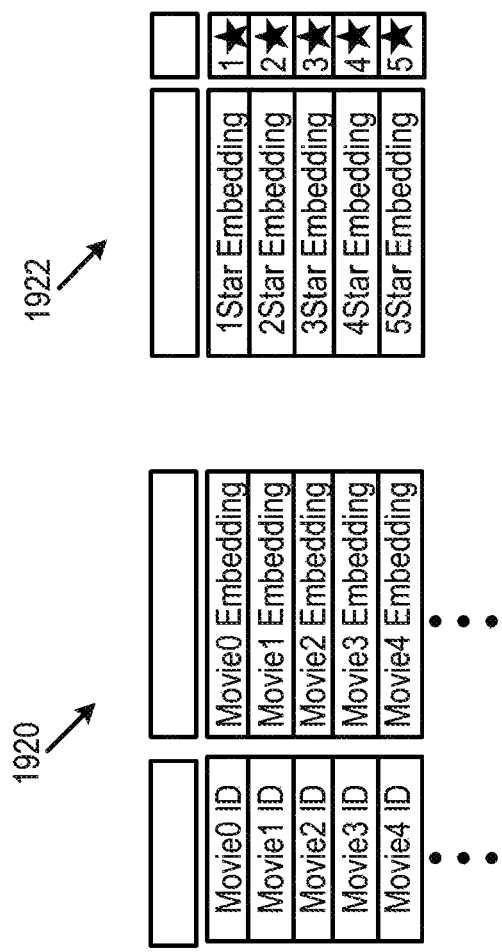
FIG. 30B is an exemplary diagram of embedding matrices, according to one example.

For example, FIG. 30B includes diagrams of an exemplary item embedding matrix 1920 and an exemplary review embedding matrix 1922. The item embedding matrix 1920 includes unique identification codes (Movie0 ID, Movie1 ID, Movie2 ID, Movie3 ID, Movie4 ID, etc.) for all possible items that can receive reviews from a user. In one implementation, the items represented in the item embedding matrix 1920 may be movies that can be selected for streaming, purchasing, or rating by a user at a web or application interface. The item embedding matrix 1920 also includes a look-up matrix, which is a square matrix that includes a learned representation vector for each of the movies. The look-up matrix can be initialized to random values that are updated and optimized through the application of machine learning methods such as back-propagation, and the representation vectors for the movies converge to a set of values discovered by the system 100 that may represent explicit or hidden features. For example, Movie® has a corresponding Movie® embedding vector, Movie1 has a corresponding Movie1 embedding vector, and so on.

Likewise, the review embedding matrix 1922 includes unique identification codes (1-star, 2-star, 3-star, 4-star, 5-star, etc) for all possible ratings that a user can give to an item so that the ratings represent labels for vectors of a look-up matrix of the review embedding matrix 1922. The look-up matrix of the review embedding matrix is a square matrix that includes a learned representation vector for each of the possible item ratings. The look-up matrix of ratings can also be initialized to random values that are updated and optimized through the application of machine learning methods such as back-propagation, and the representation vectors for the movies converge to a set of values. For example, a 1-star rating has a 1star representation vector, a 2-star rating has a 2start representation vector, and so on.

Referring back to FIG. 30A, at step S1904, a forward pass of the neural network is performed, and dropout is applied, which randomly applies stress to the neural network to improve learning and overall performance. The matrices $X_{item}$ and $X_{review}$ are multiplied together element-wise to determine an item-review context for a user. Then, dropout is applied so that approximately n/3 row vectors of the resulting matrix have zero values. In addition, the dropout vectors can be defined as follows:

$\hat{d}_0 \in \{0,1\}^{n \times 1}$ where $Pr(\hat{d}_{0_i}=1)=0.33$ $\hat{d}_1 \in \{0,1\}^{1 \times d}$ where $Pr(\hat{d}_{1_i}=1)=0.5$ $\hat{d}_2 \in \{0,1\}^{1 \times h}$ where $Pr(\hat{d}_{2_i}=1)=0.5$ The resulting item-review context matrix can be described by the following:

$u(X_{item}, X_{review}) = (X_{item} * X_{review}) * \hat{d}_0$

At step S1906, a column-wise average of the item-review context matrix is computed, which allows the neural network to accommodate variable length amounts of feedback (reviews) for each user. The column-wise average can be described as follows:

$$f(u) = \frac{j^T \cdot u}{n} \text{ where } j \in \{1\}^{n \times 1}$$

In some implementations, the vector $f$ can be a representation of a user.

Figure 30C:
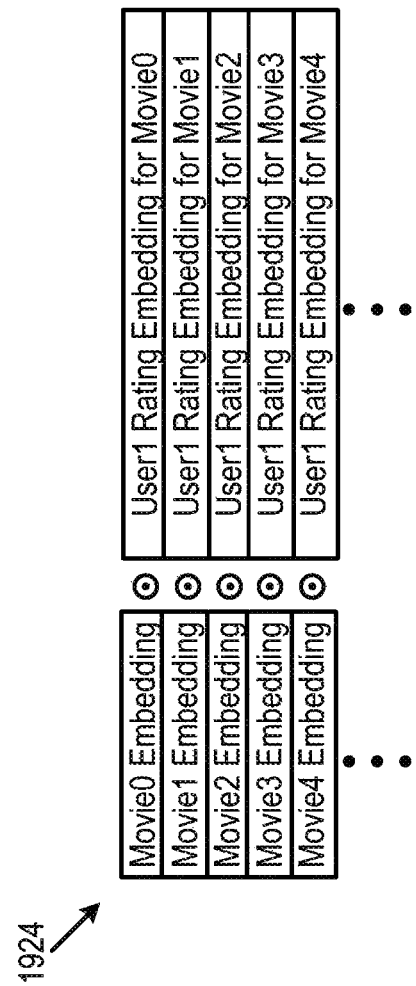
FIG. 30C is an exemplary diagram of an item-review context matrix computation, according to one example.

The item-review context matrix $f(u_i)$ represents a profile for a particular user and is a unique vector that incorporates information related to the movies the user has watched and the ratings the user gave those movies. The item-review context matrix can indicate which movies the user prefers or does not prefer as well as how critical the user is of movies in general. FIG. 30C is an exemplary diagram 1924 illustrating how the item-review context matrix is generated for a user referred to as User1. The representation vector for each movie reviewed by User 1 (Movie0, Movie1, Movie2, Movie3, Movie4, etc.) from the item embedding matrix 1920 is multiplied by a representation vector from the review embedding matrix 1922 that corresponds to the rating that User1 gave to a particular movie. For example, the representation vector for Movie® is multiplied by the representation vector for the rating that User1 gave Movie0.

Referring back to FIG. 30A, at step S1908, the user representation $f$ is passed to a hidden layer, and ReLu is used as a non-linearity along with the dropout. In some implementations, ReLu is a function that computes relu(x) =max(0,x). The resulting vector $g(f)$ can be described by:

$g(f) = \max(0,(f*\hat{d}_1) \cdot \theta_0^T + b_0)$.

The hidden layer enables further recombination of relationships between an output layer of the neural network and the item-context review matrix layer with relationships learned through techniques such as back-propagation. Therefore, nodes of the hidden layer do not explicitly represent movies or other types of items but do represent dependencies between the item-context review matrix layer and the output layer computed at step S1910.

At step S1910, the output of the distributed representation model is computed and can be described by as $h(g)=\max(0, (g*\hat{d}_2) \cdot \theta_1^T + b_1)$. The output is a vector $h \in \mathbb{R}^{1 \times k}_{>0}$ where an element hi represents the rating or review that the user assigns item i. The expectation of the model can be defined by $y \in \mathbb{R}^{1 \times k}$ where is a rating a user gave item i. In addition, the vector y provides a best performance when populated with all of the user's observed ratings. The loss 1 can be defined as the root mean square error (RMSE) in instances where there are explicit reviews from the user (only look at non-zero entries of y). The loss 1 can be described by the following:

$$i = \sqrt{\frac{1}{\beta} \sum_{\forall i | y_i \neq 0} (h_i - m_i)^2}$$

where $\beta$ is a number of non-zero entries of y. The RMSE can be optimized with Adam, a variant of stochastic gradient descent that takes advantage of first and second moments of gradients as described in D. Kingma and J. Ba. Adam: "A method for stochastic optimization," arXiv preprint arXiv: 1412.6980, 2014, the entire contents of which is incorporated herein by reference.

The output layer determined at step S1910 for the item-review context vector for User1 computed at step S1906 indicates movie recommendations for the User1. The output layer includes nodes for each possible movie to recommend that include a corresponding activation function h(g) that describe an amount of excitation for a movie based on the user profile. In other words, the activation function for each output node represents an amount of relevance of each recommendation to a user or an estimated rating for the movie by the User1.

The distributed representation recommendation process 1900 can be applied in online implementations because of an ability of the distribution model to shift a non-stationary distribution of ratings over items, which is a side effect of an assumption that the user who is interacting with the system 100 may only likely be exposed to a number of the recommendation engine's top choices. Because the user may be unlikely to rate items that he or she was not exposed to, an element of randomness can be introduced into the recommendations. For example, a temperature parameter with softmax normalization can be applied in order to induce diversity into the recommendation engine as described in R. S. Sutton and A. G. Barto, "Reinforcement learning: An introduction," MIT press, 1998, the entire contents of which is incorporated herein by reference. The softmax function can be used to define probabilities which are used to draw items from a multinomial distribution. For example, for an output vector $h \in \mathbb{R}^{1 \times k}_{>0}$, the softmax normalization with a temperature $t \in \mathbb{R}_{>0}$ can be described by softmax $$(h) = \frac{e^{h/t}}{\sum_{i=o}^{k} e^{h_i/t}}.$$

As the temperature parameter t→inf, the probabilities across all items are approximately equal. In addition, the recommendation engine can draw from a multinomial distribution of ñ trials, where each item is assigned a probability computed with the softmax function. A number of times each item was drawn during each of the h trials is counted, and the items are sorted so that they occur in order of how many times the items are drawn from the multinomial distribution.

In large scale online implementations, the number of users can be far greater than the number of items that can be recommended, which corresponds to the distributed representation model that has a number of parameters that are not proportional to the number of users. For example, in a MovieLens 20M dataset that includes ratings of movies by users, a number of users corresponds to u=138,000 and a number of items corresponds to k=27,000. With a representation dimensionality of d=8, a matrix factorization model has a number of parameters that is equal to approximately k*d+s*d+d*h+h*k=1,080,304 with a hidden dimensionality h=32 and a number of unique ratings of s=6.

To evaluate the ability of the distributed representation model to generalize in the presence of different amounts of data when compared with the ALS matrix factorization algorithm, the RMSE of the distributed representation model can be compared to that of weight-regularized ALS on the MovieLens 20M dataset. Each model can be evaluated when given either two, five, or ten pieces of feedback (reviews) per user, and each model's performance can be evaluated based on a set of 10 pieces of feedback per user. In one example, a rank of the item and review matrices for the ALS algorithm is set to eight, and the dimensionality d of the embedding matrices for the distributed representation model is set to eight. For the ALS implementation, the regularization parameters are shown below in Table 2.

TABLE 2

| Amount of Feedback per User | λ |
| --- | --- |
| 2 | 0.5 |
| 5 | 0.4 |
| 10 | 0.3 |

The neural network used with the distributed representation can be initialized with a learning rate of 0.1 with the following schedule: lr←lr/5 every two iterations. In one example, the neural network is trained using a mini-batch size of 1024, and the ALS and distributed representation algorithms are run for 20 iterations of optimization. Table 3 shows RMSE for both the ALS and distributed representation models.

TABLE 3

| Amount of Feedback per User | ALS | Distributed Representation |
| --- | --- | --- |
| 2 | 1.2281 | 1.0425 |
| 5 | 1.0441 | 0.9796 |
| 10 | 0.9573 | 0.9354 |

In addition, Table 4 shows that using dropout in the distributed representation model improves the overall performance by reducing the RMSE.

TABLE 4

| | RMSE |
| --- | --- |
| No Dropout | 0.977094330424 |
| Dropout | 0.93538048649 |

In some implementations, the recommendation engine can determine nearest neighbors of the item representations. Computing the nearest neighbors of the representations allows the items that have similar co-occurrence statistics to be identified. For example, a similarity matrix $A \in \mathbb{R}^{k \times k}$ can be computed where element represents a Euclidean distance between row vectors $L_{item_i}$ and $L_{item_j}$. Multiplying all of the item representations by row vector $L_{item_i}$ (i.e. the vector that represents the highest rating), the nearest neighbors of an item can be determined. For example, to determine the five nearest neighbors to the movie North by Northwest, all of the item vectors can be conditioned by the review vector $L_{review_i}$, which produces an output of the following five movies in order of relevance: Manchurian Candidate, Cool Hand Luke, Piano, Psycho, and Shawshank Redemption.

Figure 31A:
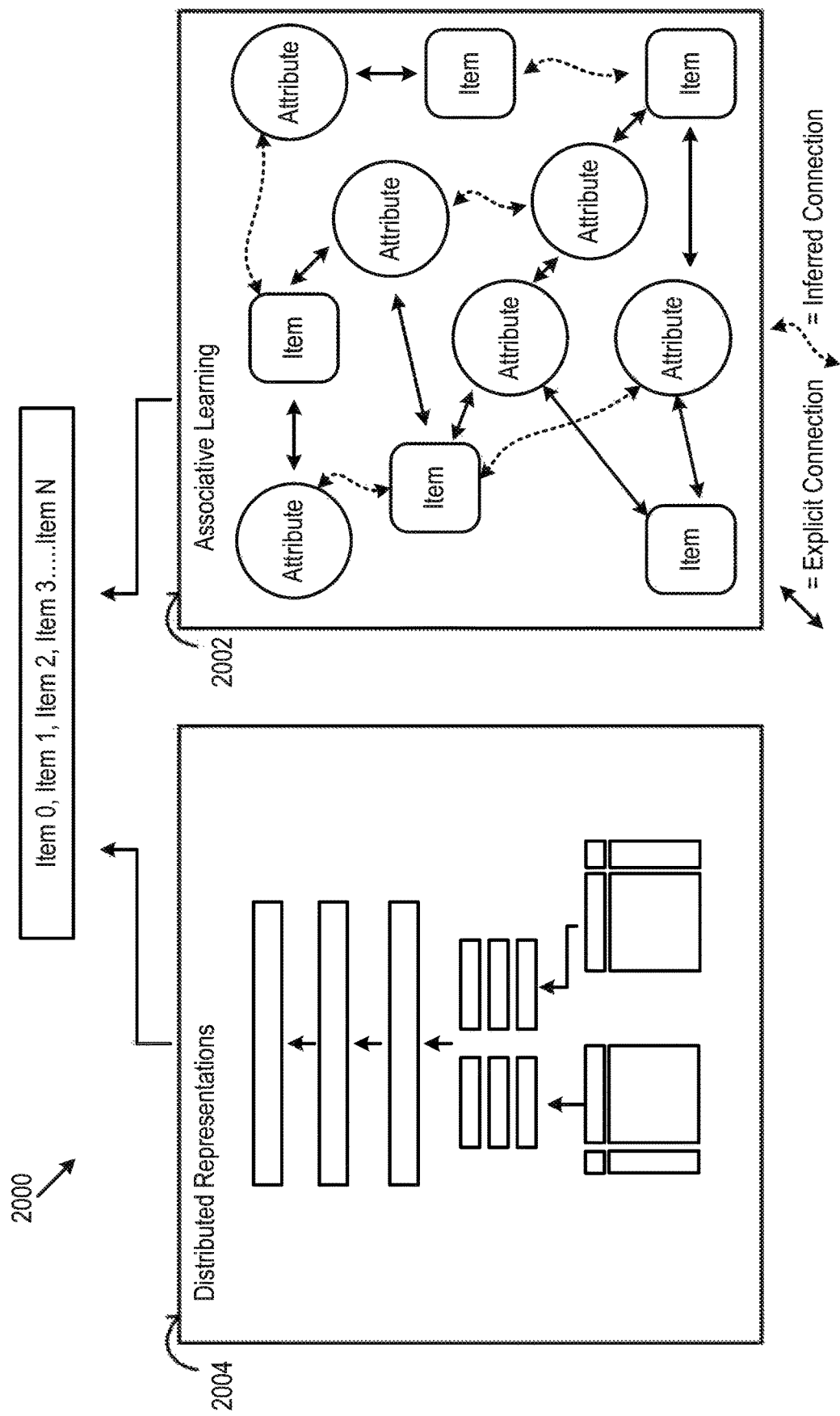
FIG. 31A is an exemplary diagram of a hybrid recommendation model, according to one example.

FIG. 31A is an exemplary diagram of a hybrid recommendation model 2000, according to one example. In some implementations, the hybrid recommendation model 2000 includes aspects of a distributed representation model 2004 as well as associative learning models 2002 and can be used to recommend items that have no feedback or reviews available. For example, the recommendation engine can determine that the hybrid recommendation model 2000 should be used when predetermined cold start criteria are met, such as when a number of ratings for a particular user is less than a predetermined threshold.

Both a traditional neural network and a matrix factorization model may have to add randomly initialized parameters in order to accommodate a new item that has no feedback. However, the recommendation engine can use the features of a new item with no ratings that is added to the network to predict how a user may rate the item. By using information about how frequently a user has interacted with features in the past, an associative learning model 2002 can be used to estimate a probability distribution for the user and item for all ratings. The associative learning model 2002 can include any type of probabilistic learning associated with neural networks, such as the synaptic learning rules described previously herein. In the associative learning model 2002, users, attributes, ratings (reviews), and items can be represented by nodes, and connection weights between the nodes can be assigned based on co-occurrence statistics of these nodes with each other. For item i, user u, and rating r: $P(r=5|i,u) \propto P(r=5|u)P(i,u|r=5)$, where $P(r=5|i,u)$ is a frequency that a user assigns an item a rating of 5. $P(i,u|r=5)$ can be modeled with a vector $z \in \mathbb{R}^{1 \times q}$, where q is a number of unique attributes for all items. In addition, each element $z_j$ denotes how many times a user interacted with the $j^{th}$ attribute out of the items that the user rated as a 5 in the past. A linear combination of the vector z can be computed, and the item vector $e \in \{0,1\}^{1 \times e}$ where the value $e_j=1$ denotes a presence of the $j^{th}$ attribute, and a probability that a given item for a particular user is given a rating of 5 is determined.

In addition to defining explicit probabilities between nodes in the neural network, the recommendation engine can also infer probabilities between the nodes. In one example, two nodes $node_1$ and $node_2$ both share an attribute $q_i$, and $q_j$ can be defined as an attribute that $node_2$ has that $node_1$ does not have. A connection can be formed between $node_1$ and $q_j$ where a connection weight is a function of how many times the features $q_i$ and $q_j$ co-occur across historical reviews from many users. Once the recommendation engine builds the relationships between the users and items based on the associative learning model 2002, the recommendation engine can apply the distributed representation model 2004 by applying the distributed representation recommendation process 1900 described previously herein.

In examples where the hybrid recommendation model 2000 is implemented, the recommendation engine of the system 100 determines the recommended movies for the user based on a first set of recommended movies generated with the synaptic network recommendation process 800 and a second set of recommended movies generated with the distributed representation recommendation process 1900. For example, the output layer of the distributed representation recommendation process 1900 includes the first set of recommended movies for a particular user that includes a numeric score indicating an amount of relevance that movie has to the user, which may be a representation of the activation function value, h computed at step S1910. The output of the synaptic network recommendation process 800 includes the second set of movie recommendations that are independent from the first set of movie recommendations associated with the distributed representation model that also include a score for each movie indicating an amount of activation of each recommended movie node. The amount of activation represents an amount of affinity the user may have for the movie based on other movies the user has rated that have similar attributes.

In some implementations, the numeric scores associated with the first set of recommended movies and the second set of recommended movies reflect a predetermined rating scale where each score represents a number of stars in a five-star rating scale, but other rating scales can also be used. For example, a recommended movie from either the distributed representation recommendation process 1900 or the synaptic network recommendation process 800 may have a numeric score of 4.75, which indicates that the user may rate the movie between 4 and 5 stars based on learned connections or representations of the users' preferences for movies. The recommendation engine combines the scores from the first set and second set of recommended movies by a straight average or weighted average and determines the recommended movies based on the combined scores where the highest scores reflect the most highly recommended movies. In some implementations, the recommendation engine can determine the weights to apply to the weighted average of the scores based on predetermined criteria, such as how much training data has been applied to the system 100. For example, during cold starts where little or no training data is available, the second set of numeric scores output from the synaptic network recommendation process 800 may be assigned weighting factors that are greater than weighting factor for the first set numeric scores output from the distributed representation recommendation process 1900. As the amount of training data goes up, the weight factors for the first set of numeric scores associated with the distributed representation model 2004 may increase and the weighting factors for the second set of numeric scores associated with the associative learning (synaptic network) model 2002 may decrease. The recommendation engine can also determine the weighting factors by determining how selected weighting factors predict past performance and setting the weighting factors that result in outputs that most closely predict past performance.

FIGS. 31B-31D are exemplary diagrams of movie recommendation results and activation function values for a particular user based on the user giving the movies The Lord of the Rings: The Two Towers and Star Wars: Episode 5 a rating of 5 stars, according to one implementation. The numeric scores for each of the recommended movies represent an amount of relevance that the movie may have to the particular user or a projected rating for the movie by the user. For example, FIG. 31B is an exemplary diagram of recommendation results and exemplary activation function values based on an ALS recommendation algorithm when trained with ten pieces of feedback per user. FIG. 31C is an exemplary diagram of recommendation results and exemplary activation function values based on the hybrid distributed representation model when trained with 10 pieces of feedback per user. FIG. 31D is an exemplary diagram of recommendation results and exemplary activation function values based on the hybrid distributed representation model in a cold start scenario with no training. The numeric scores associated with the recommended movies in FIGS. 31C and 31D reflect combined scores from distributed representation model 2004 and the associative learning model 2002.

Aspects of the present disclosure are directed to generating recommendations for users based on learned relationships between nodes of a synaptic network where the nodes represent users, items, and attributes that describe the users and items. Advancement in processing and computing technologies provides the ability to construct and manipulate complex data networks according to the implementations described herein. The synaptic learning rules described herein can be codified into an engineering framework that can be applied to computing systems in order to provide more accurate representations of relationships between items, attributes, and users. The implementations described herein improve the functionality of computerized neural networks and can be applied across a wide range of technologies that use neural networks to determine patterns and trends in data. For example, aspects of the implementations described herein can also be applied to fraud detection, pattern recognition algorithms, physical system modeling, biometric signal processing, student performance predictors, energy demand predictors, etc. In addition, the distributed representation model and hybrid model described herein improve the functionality of traditional neural networks by combining features of distributed representation neural networks and synaptic networks.

A number of embodiments have been described. Nevertheless, it will be understood that various modifications are optionally made without departing from the spirit and scope of this disclosure. Accordingly, other embodiments are within the scope of the following claims.

What is claimed is:

1. A method comprising:
accessing, by processing circuitry, data defining a plurality of objects and one or more features of each object of the plurality of objects;
accessing, by the processing circuitry, attribute data for the plurality of objects, the attribute data relating to a plurality of attributes of at least a subset of the plurality of objects;
generating, by the processing circuitry, a synaptic data network having a plurality of nodes, the plurality of nodes including at least a respective object node corresponding to each object of the plurality of objects and at least a respective attribute node corresponding to each attribute of the plurality of attributes, the synaptic data network further including a plurality of connections, wherein
each connection of the plurality of connections is between a respective pair of the plurality of nodes, each connection of the plurality of connections reflects a strength of an interrelationship between a given respective pair of nodes of the plurality of nodes, and generating the synaptic data network comprises:
  organizing the plurality of objects into two or more categories, each category comprising a plurality of sub-categories,
  initializing the plurality of connections between the respective pairs of the plurality of nodes based on relationships between the respective pairs of the plurality of the nodes, wherein the relationships between the respective pairs of the plurality of the nodes is identified from the object data and the attribute data, wherein the plurality of connections comprises
    a first number of connections, wherein each connection of the first number of connections is between a respective pair of nodes within each sub-category of the plurality of sub-categories of each category of the two or more categories,
    a second number of connections, wherein each connection of the second number of connections is between a respective pair of nodes selected from a first set of pairs of nodes, wherein nodes of each of the respective pairs of nodes selected from the first set of pairs of nodes are categorized in different sub-categories of the plurality of sub-categories of each category, and
    a third number of connections, wherein each connection of the third number of connections is between a respective pair of nodes selected from a second set of pairs of nodes, wherein nodes of each of the respective pairs of nodes selected from the second set of pairs of nodes are categorized in different categories of the two or more categories,
  accessing a framework comprising a plurality of synaptic learning rules, wherein the plurality of synaptic learning rules increase an accuracy of the relationships between the respective pairs of the plurality of nodes, and
  applying, to the plurality of connections, each rule of at least a portion of the plurality of synaptic learning rules to modify the strength of the interrelationship between at least a portion of the respective pairs of the plurality of nodes, wherein
    applying the portion of the plurality of synaptic learning rules comprises constructing a plurality of inhibition nodes that manage relative numbers of nodal activations among the two or more categories, thereby dynamically normalizing the nodal activations to within a predetermined range;
applying, by the processing circuitry and responsive to a user query submitted via a remote computing system, at least one retrieval rule of one or more synaptic retrieval rules to the synaptic data network to identify one or more affinities between the user query and the plurality of nodes;
determining one or more connections between the plurality of nodes and the user query that are most strongly connected; and
providing, to the remote computing system, one or more recommended objects of a plurality of relevant objects identified as pertaining to at least one affinity of the one or more affinities, wherein the one or more recommended objects have the determined one or more connections that are most strongly connected.

2. The method of claim 1, wherein applying the one or more synaptic retrieval rules comprises applying a learning model incorporating at least one of the one or more synaptic retrieval rules to estimate an affinity between the user query and at least one object node.

3. The method of claim 2, wherein applying the learning model comprises estimating a probability distribution for the user query and each object represented by the at least one object node.

4. The method of claim 3, wherein applying the learning model further comprises:
  identifying at least one node connected to a set of nodes of the synaptic data network lacking connections representative of the user query; and
  applying the learning model to the set of nodes to estimate an affinity of the user query to each respective node of the set of nodes.

5. The method of claim 1, wherein the user query is a request for recommendations related to one of: a category of the two or more categories; or a sub-category of a given category of the two or more categories.

6. The method of claim 1, wherein applying the at least one retrieval rule comprises suppressing one or more contradictory connections to a given relevant object of the plurality of relevant objects.

7. The method of claim 1, wherein determining the one or more connections between the plurality of nodes and the user query that are most strongly connected comprises determining, for each given object of the plurality of relevant objects, an object link value between the user query and an object node of the given object, and an attribute link value between the user query and attributes of one or more attribute nodes having a connection with the object node of the given object.

8. The method of claim 1, wherein providing the one or more recommended objects comprises providing reasons for recommending each recommended object of the one or more recommended objects.

9. The method of claim 1, further comprising:
  receiving, from a user via the remote computing device, feedback related to at least one recommended object of the one or more recommended objects; and
  for each respective object of the at least one recommended object, adjusting, by the processing circuitry and responsive to the feedback, a connection strength of a connection between an object node corresponding to the respective object of the at least one recommended object and another node of the plurality of nodes.

10. The method of claim 1, further comprising:
  obtaining, by the processing circuitry, new information related to at least one new object wherein the new information relates to at least one attribute of the plurality of attributes; and
  dynamically updating, by the processing circuitry, the synaptic data network to incorporate the at least one new object, wherein dynamically updating the synaptic data network comprises, for each respective new object of the at least one new object:
    creating a respective new object node,
    establishing, based on the new information, at least one new connection between the respective new object node and a corresponding attribute node of the plurality of attribute nodes in accordance with the new information, and
    applying at least one synaptic learning rule of the plurality of synaptic learning rules to calculate, for each connection of the at least one new connection between the respective new object node of the respective new object and one of the plurality of nodes, a respective connection weight.

11. The method of claim 1, further comprising:
obtaining, by the processing circuitry, new information related to at least one new object, wherein the new information relates to at least one object of the plurality of objects; and
dynamically updating, by the processing circuitry, the synaptic data network to incorporate the at least one new object, wherein dynamically updating the synaptic data network comprises, for each respective new object of the at least one new object:
creating a respective new object node,
establishing, based on the new information, at least one new connection between the respective new object node and a corresponding object node of the plurality of object nodes in accordance with the new information, and
applying at least one synaptic learning rule of the plurality of synaptic learning rules to calculate, for each connection of the at least one new connection between the respective new object node of the respective new object of the at least one new object and one of the plurality of nodes, a respective connection weight.

12. A method comprising:
accessing, by processing circuitry, data defining a plurality of objects and one or more features of each object of the plurality of objects;
accessing, by the processing circuitry, attribute data for the plurality of objects, the attribute data relating to a plurality of attributes of at least a subset of the plurality of objects;
generating, by the processing circuitry, a synaptic data network having a plurality of nodes, the plurality of nodes including at least a respective object node corresponding to each object of the plurality of objects and at least a respective attribute node corresponding to each attribute of the plurality of attributes, the synaptic data network further including a plurality of connections, wherein
each connection of the plurality of connections is between a respective pair of the plurality of nodes, each connection of the plurality of connections reflects a strength of an interrelationship between a given respective pair of nodes of the plurality of nodes, and
generating the synaptic data network comprises:
organizing the plurality of objects into two or more categories, each category comprising a plurality of sub-categories,
initializing the plurality of connections between the respective pairs of the plurality of nodes based on relationships between the respective pairs of the plurality of the nodes, wherein the relationships between the respective pairs of the plurality of the nodes is identified from the object data and the attribute data, wherein the plurality of connections comprises
a first number of connections, wherein each connection of the first number of connections is between a respective pair of nodes within each sub-category of the plurality of sub-categories of each category of the two or more categories,
a second number of connections, wherein each connection of the second number of connections is between a respective pair of nodes selected from a first set of pairs of nodes, wherein nodes of each of the respective pairs of nodes selected from the first set of pairs of nodes are categorized in different sub-categories of the plurality of sub-categories of each category, and
a third number of connections, wherein each connection of the third number of connections is between a respective pair of nodes selected from a second set of pairs of nodes, wherein nodes of each of the respective pairs of nodes selected from the second set of pairs of nodes are categorized in different categories of the two or more categories,
accessing a framework comprising a plurality of synaptic learning rules, wherein the plurality of synaptic learning rules increase an accuracy of the relationships between the respective pairs of the plurality of nodes, and
applying, to the plurality of connections, each rule of at least a portion of the plurality of synaptic learning rules to modify the strength of the interrelationship between at least a portion of the respective pairs of the plurality of nodes, wherein
applying the portion of the plurality of synaptic learning rules comprises constructing a plurality of inhibition nodes that manage relative numbers of nodal activations among the two or more categories, thereby dynamically normalizing the nodal activations to within a predetermined range;
applying, by the processing circuitry and responsive to a user query submitted via a remote computing system, at least one retrieval rule of one or more synaptic retrieval rules to the synaptic data network to identify one or more affinities between the user query and the plurality of nodes;
determining one or more connections between the plurality of nodes and the user query that are most strongly connected; and
providing, to the remote computing system, one or more recommended objects of a plurality of relevant objects identified as pertaining to at least one affinity of the one or more affinities, wherein the one or more recommended objects have the determined one or more connections that are most strongly connected.

13. The method of claim 12, wherein applying the one or more synaptic retrieval rules comprises applying a learning model incorporating at least one of the one or more synaptic retrieval rules to estimate an affinity between the user query and at least one object node.

14. The method of claim 13, wherein applying the learning model comprises estimating a probability distribution for the user query and each object represented by the at least one object node.

15. The method of claim 14, wherein applying the learning model further comprises:
identifying at least one node connected to a set of nodes of the synaptic data network lacking connections representative of the user query; and
applying the learning model to the set of nodes to estimate an affinity of the user query to each respective node of the set of nodes.

16. The method of claim 12, wherein the user query is a request for recommendations related to one of: a category of the two or more categories; or a sub-category of a given category of the two or more categories.

17. The method of claim 12, wherein applying the at least one retrieval rule comprises suppressing one or more contradictory connections to a given relevant object of the plurality of relevant objects.

18. The method of claim 12, wherein determining the one or more connections between the plurality of nodes and the user query that are most strongly connected comprises determining, for each given object of the plurality of relevant objects, an object link value between the user query and an object node of the given object, and an attribute link value between the user query and attributes of one or more attribute nodes having a connection with the object node of the given object.

19. The method of claim 12, wherein providing the one or more recommended objects comprises providing reasons for recommending each recommended object of the one or more recommended objects.

20. The method of claim 12, further comprising:
- receiving, from a user via the remote computing device, feedback related to at least one recommended object of the one or more recommended objects; and
- for each respective object of the at least one recommended object, adjusting, by the processing circuitry and responsive to the feedback, a connection strength of a connection between an object node corresponding to the respective object of the at least one recommended object and another node of the plurality of nodes.

* * * * *